Feb. 7, 1961 H. GANG 2,970,754
MULTIPLICATION CONTROL MEANS FOR TEN KEY CALCULATING MACHINES
Filed Oct. 25, 1956 23 Sheets-Sheet 1
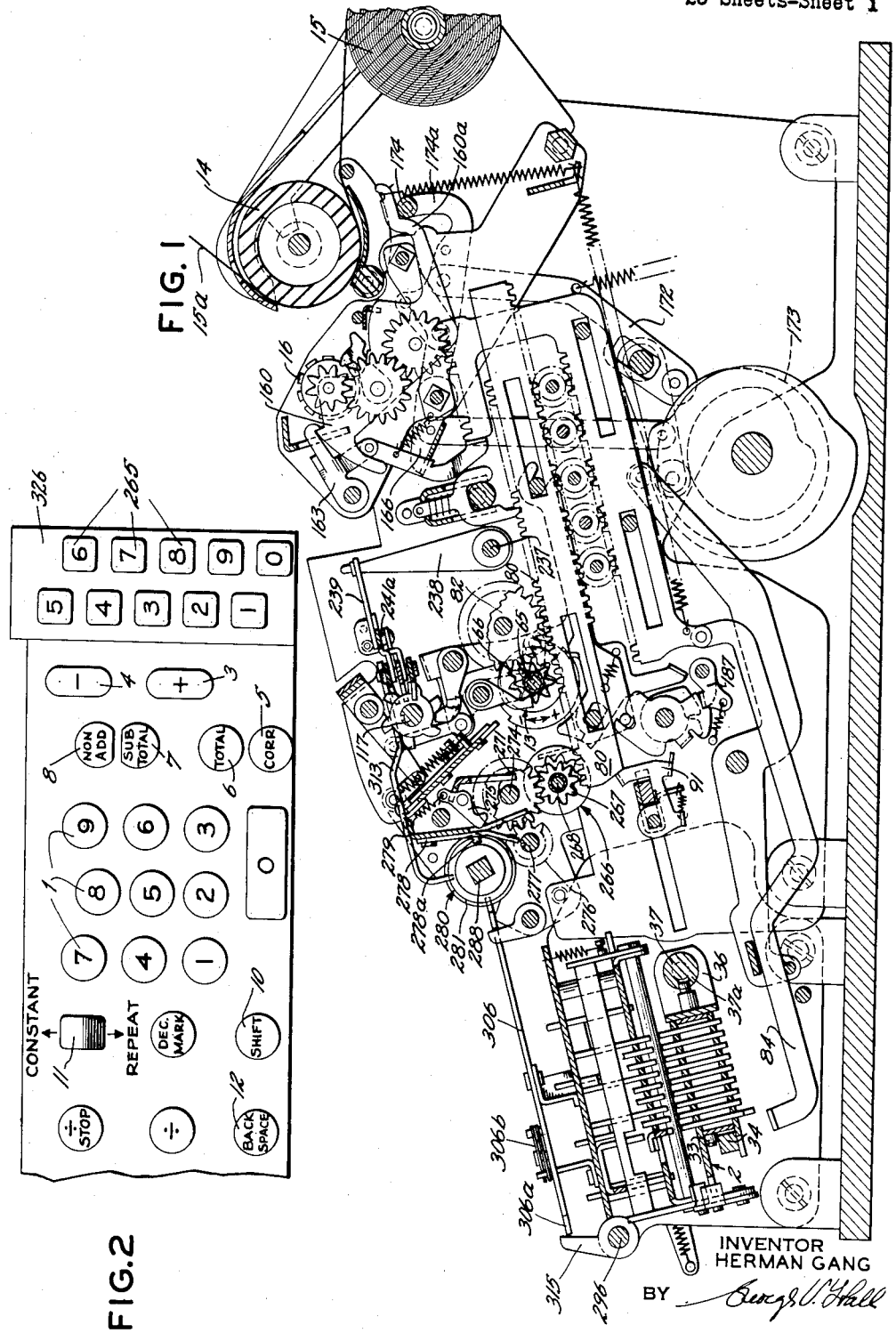
INVENTOR
HERMAN GANG
BY George V. Hall
ATTORNEY Feb. 7, 1961  H. GANG  2,970,754
MULTIPLICATION CONTROL MEANS FOR TEN KEY CALCULATING MACHINES
Filed Oct. 25, 1956  23 Sheets-Sheet 2

INVENTOR.
HERMAN GANG
BY George V. Hall
ATTORNEY

Feb. 7, 1961 H. GANG 2,970,754
MULTIPLICATION CONTROL MEANS FOR TEN KEY CALCULATING MACHINES
Filed Oct. 25, 1956 23 Sheets-Sheet 3

INVENTOR
HERMAN GANG
BY
ATTORNEY

INVENTOR.
HERMAN GANG
BY
ATTORNEY

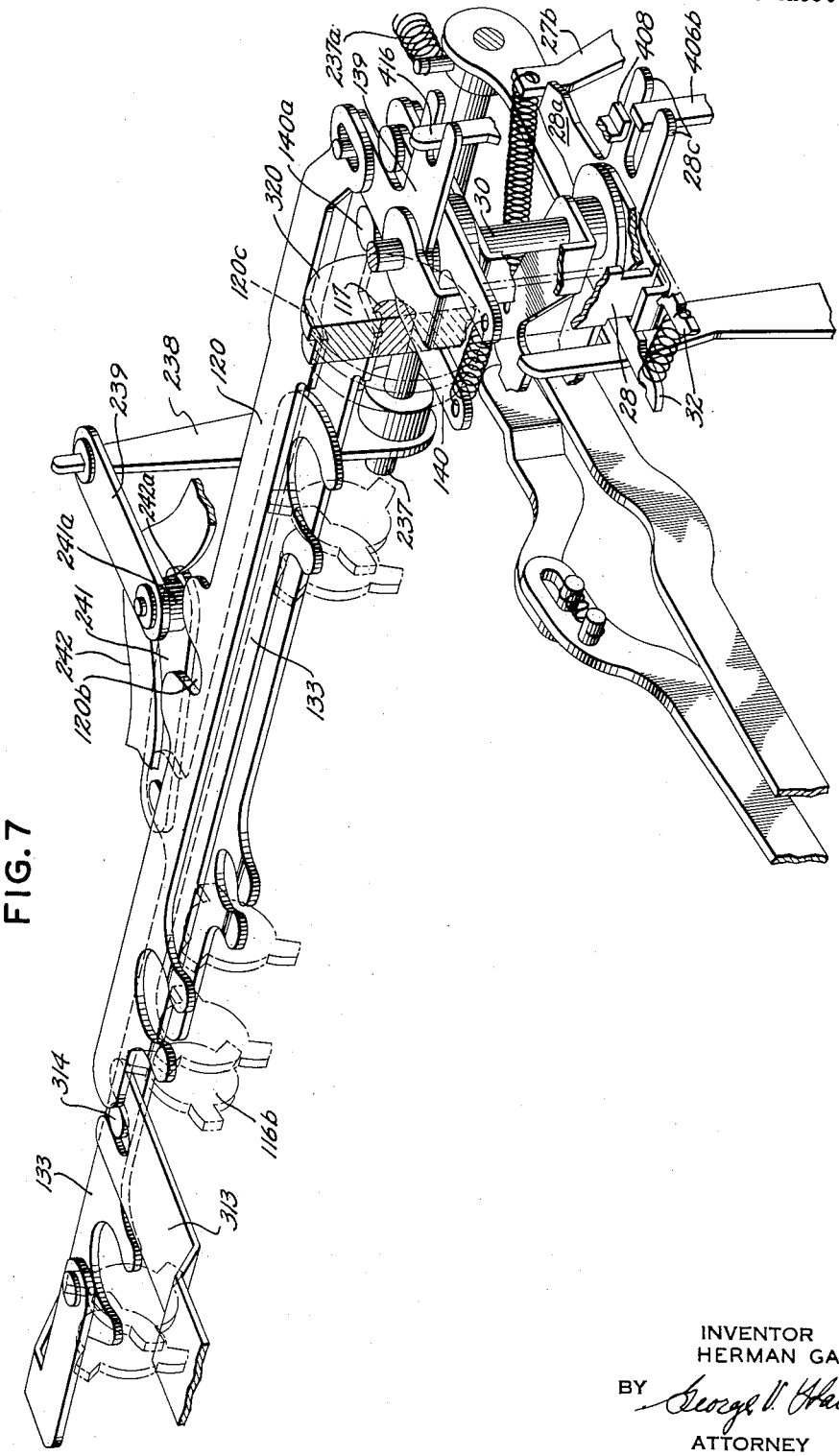

Feb. 7, 1961 H. GANG 2,970,754
MULTIPLICATION CONTROL MEANS FOR TEN KEY CALCULATING MACHINES
Filed Oct. 25, 1956 23 Sheets-Sheet 7
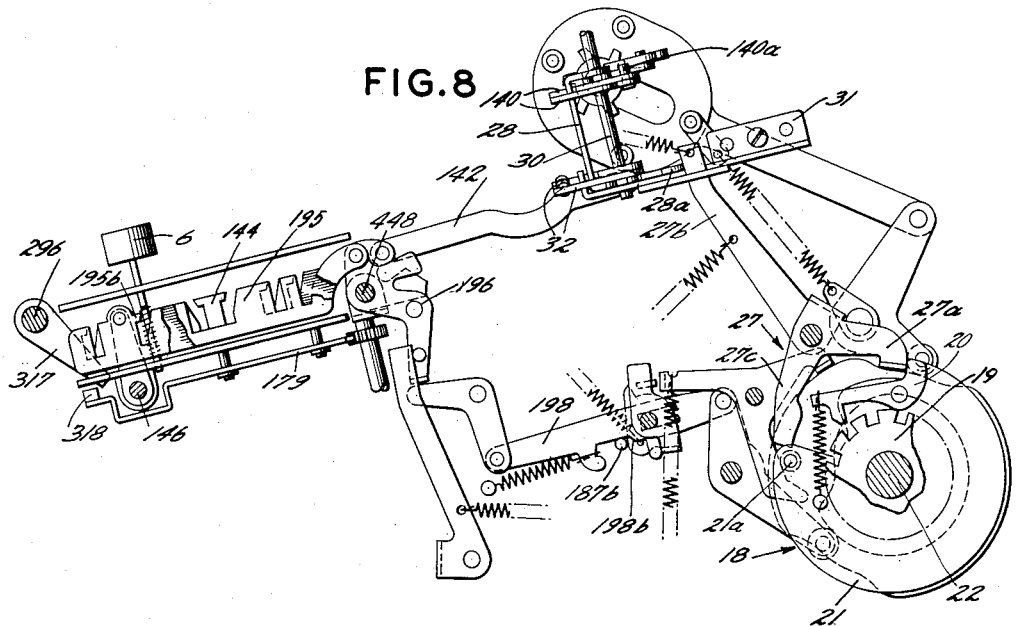
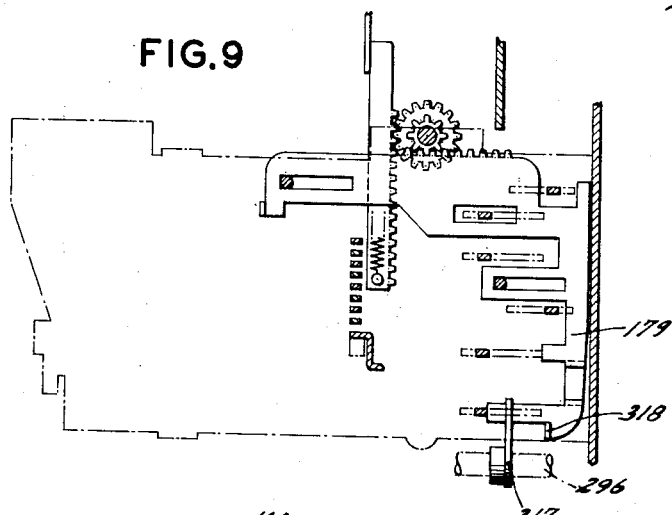
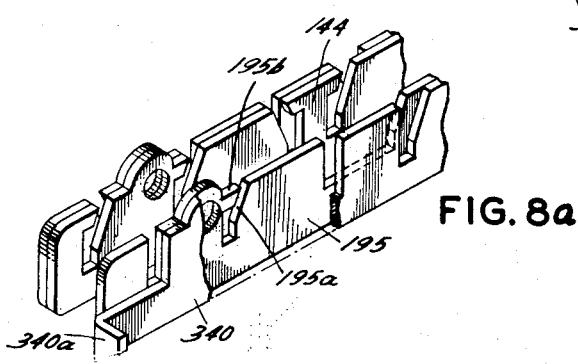
INVENTOR
HERMAN GANG
BY *George V. Hall*
ATTORNEY

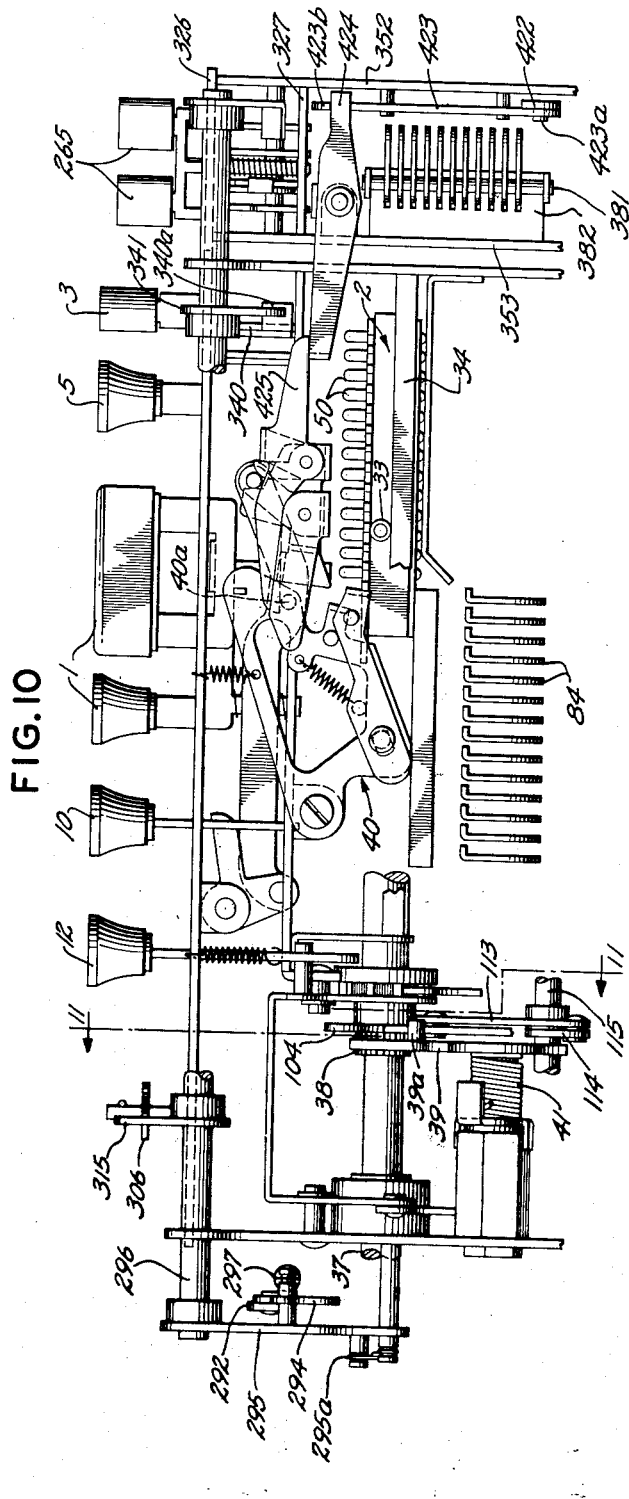

Feb. 7, 1961  H. GANG  2,970,754
MULTIPLICATION CONTROL MEANS FOR TEN KEY CALCULATING MACHINES
Filed Oct. 25, 1956  23 Sheets-Sheet 9

INVENTOR
HERMAN GANG
BY George V. Hall
ATTORNEY

Feb. 7, 1961  H. GANG  2,970,754
MULTIPLICATION CONTROL MEANS FOR TEN KEY CALCULATING MACHINES
Filed Oct. 25, 1956  23 Sheets-Sheet 10
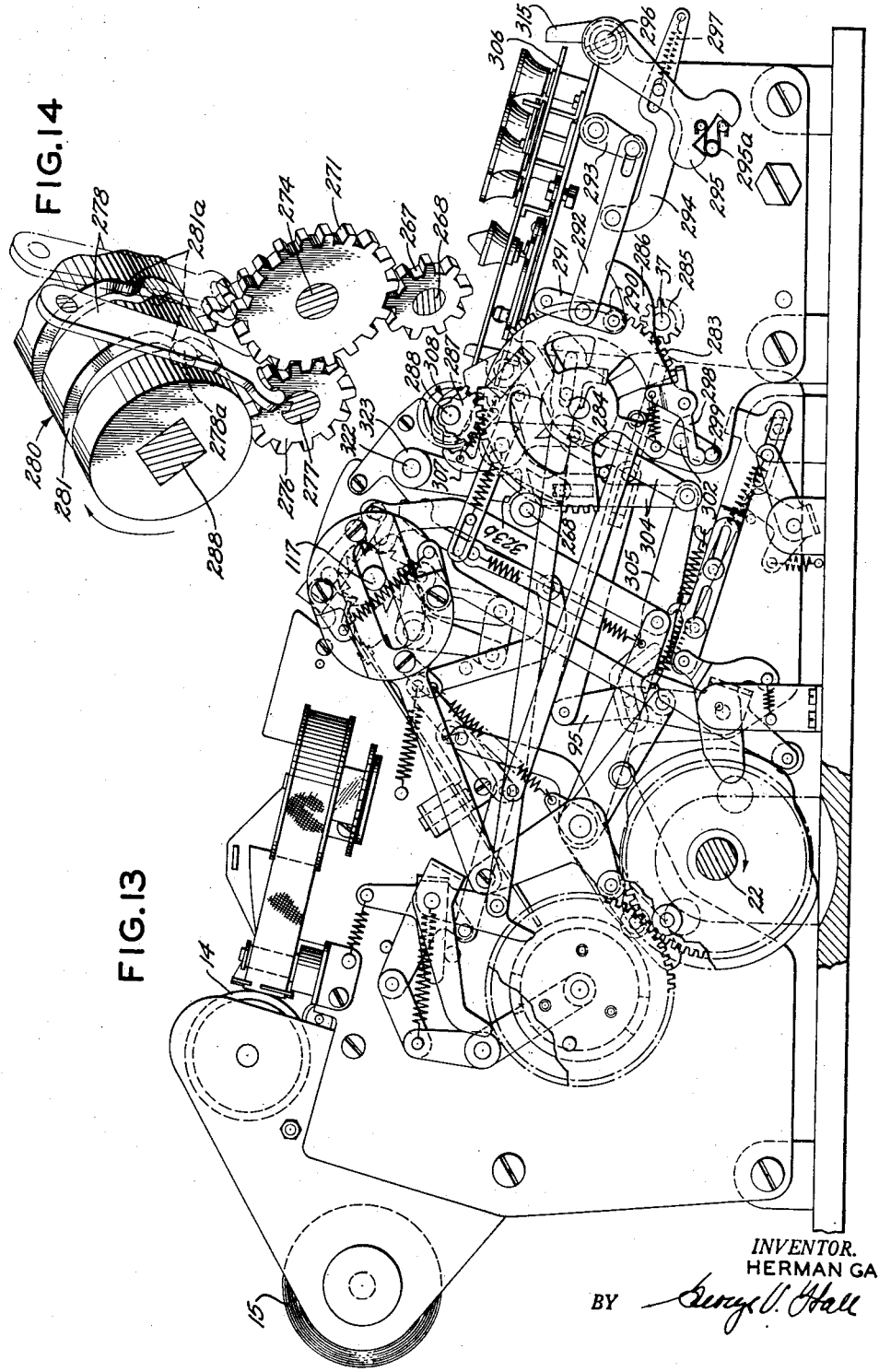
INVENTOR.
HERMAN GANG
BY *George V. Hall*
ATTORNEY Feb. 7, 1961 H. GANG 2,970,754
MULTIPLICATION CONTROL MEANS FOR TEN KEY CALCULATING MACHINES
Filed Oct. 25, 1956 23 Sheets-Sheet 11

INVENTOR
HERMAN GANG
BY *George V. Hall*
ATTORNEY

Feb. 7, 1961 H. GANG 2,970,754
MULTIPLICATION CONTROL MEANS FOR TEN KEY CALCULATING MACHINES
Filed Oct. 25, 1956 23 Sheets-Sheet 12
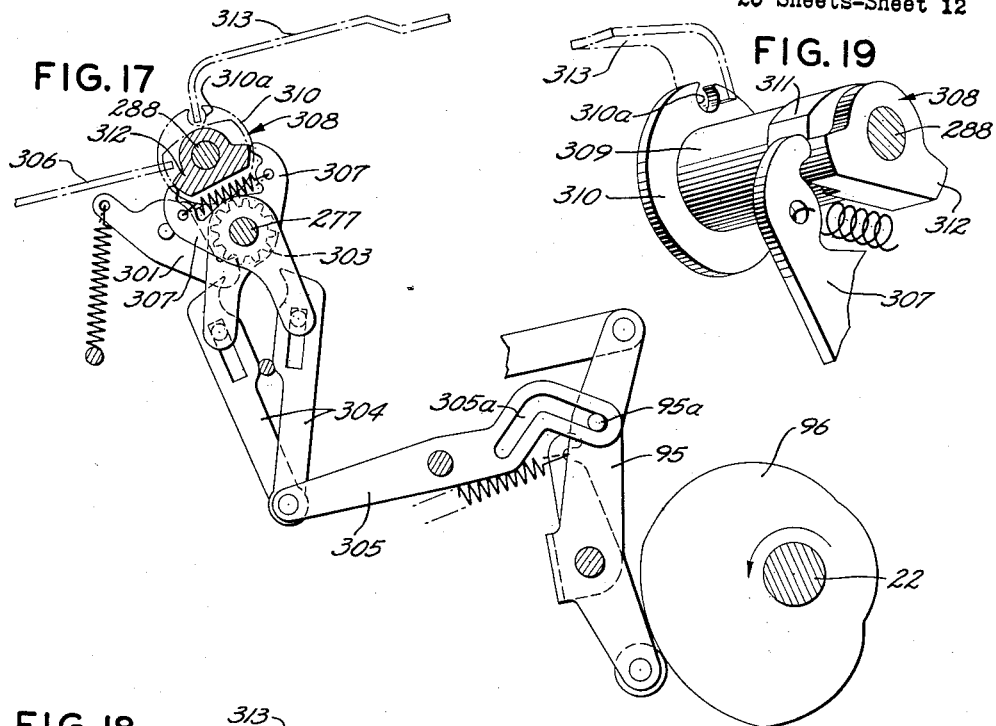
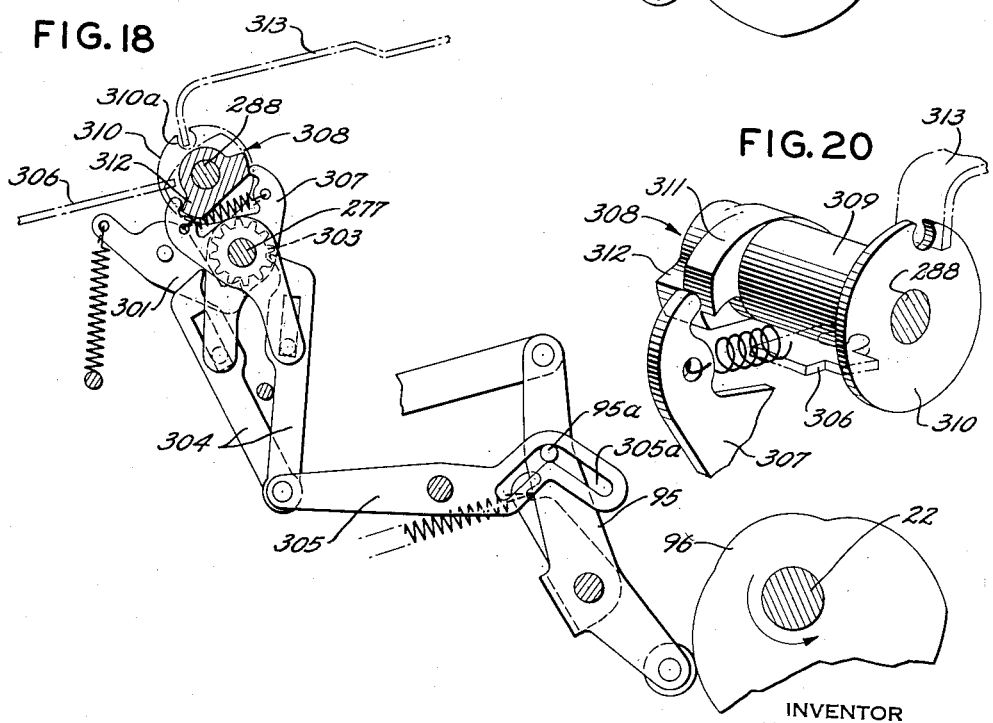
INVENTOR
HERMAN GANG
BY
George U. Hall
ATTORNEY Feb. 7, 1961 H. GANG 2,970,754
MULTIPLICATION CONTROL MEANS FOR TEN KEY CALCULATING MACHINES
Filed Oct. 25, 1956 23 Sheets-Sheet 13
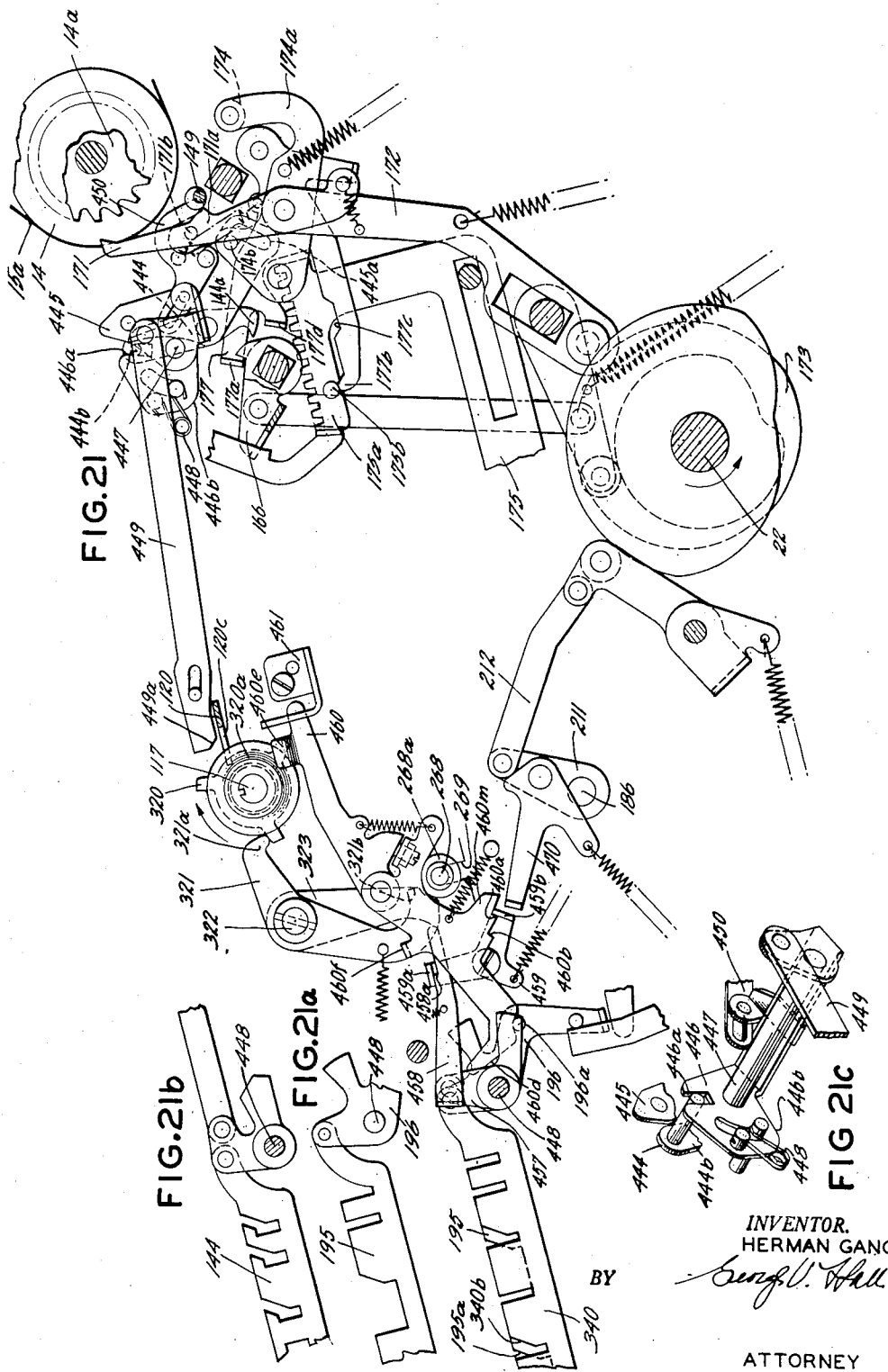
INVENTOR.
HERMAN GANG
BY
ATTORNEY Feb. 7, 1961  H. GANG  2,970,754
MULTIPLICATION CONTROL MEANS FOR TEN KEY CALCULATING MACHINES
Filed Oct. 25, 1956  23 Sheets-Sheet 14

INVENTOR
HERMAN GANG
BY
ATTORNEY

Feb. 7, 1961 H. GANG 2,970,754
MULTIPLICATION CONTROL MEANS FOR TEN KEY CALCULATING MACHINES
Filed Oct. 25, 1956 23 Sheets-Sheet 15
FIG.23
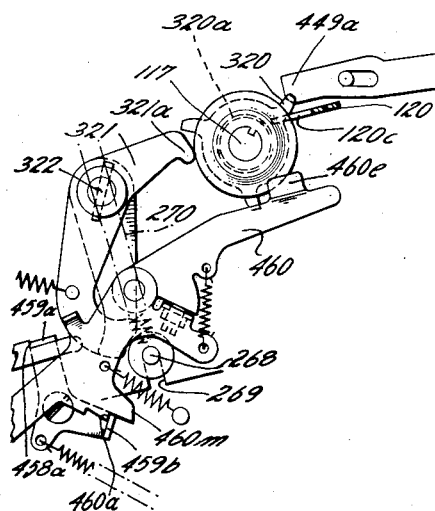
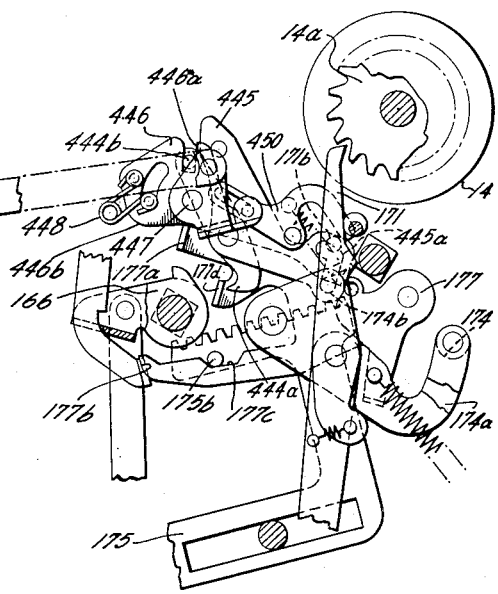
FIG.24
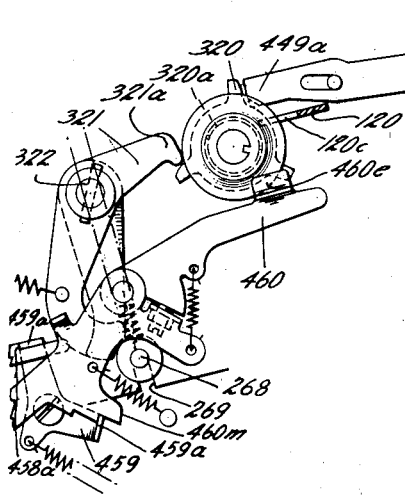
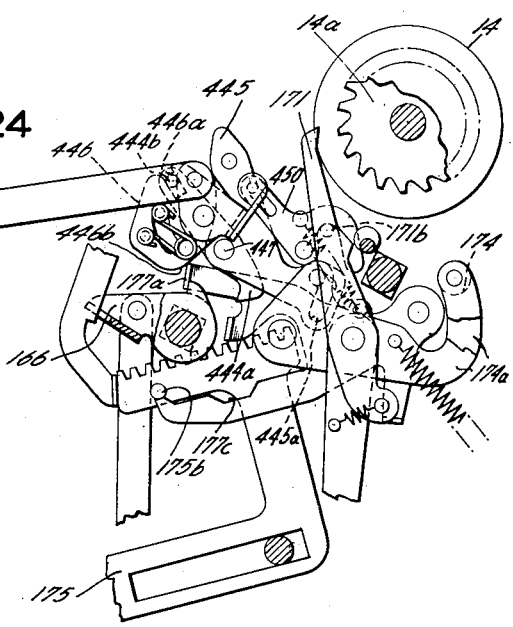
INVENTOR
HERMAN GANG
BY
ATTORNEY

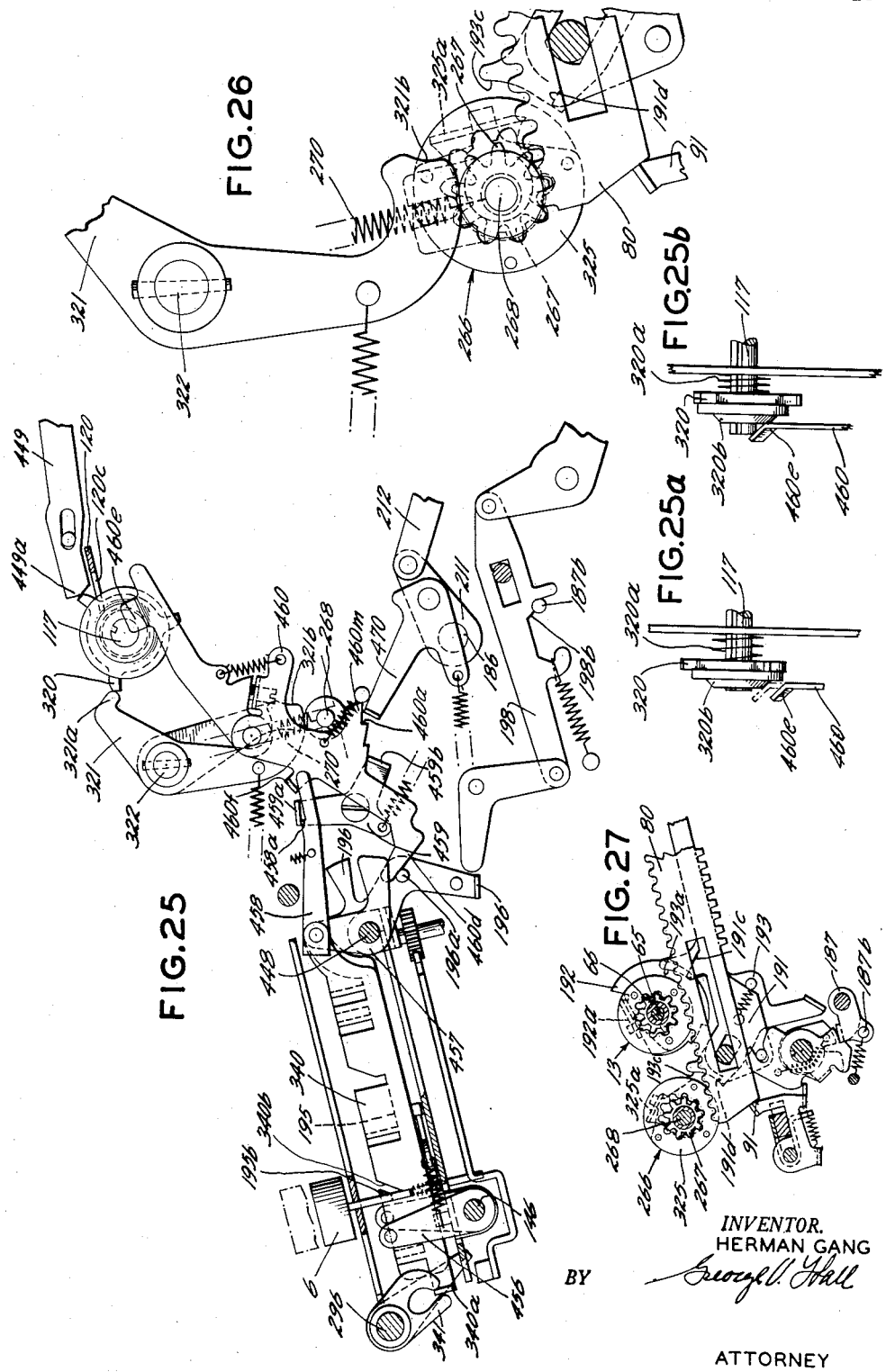

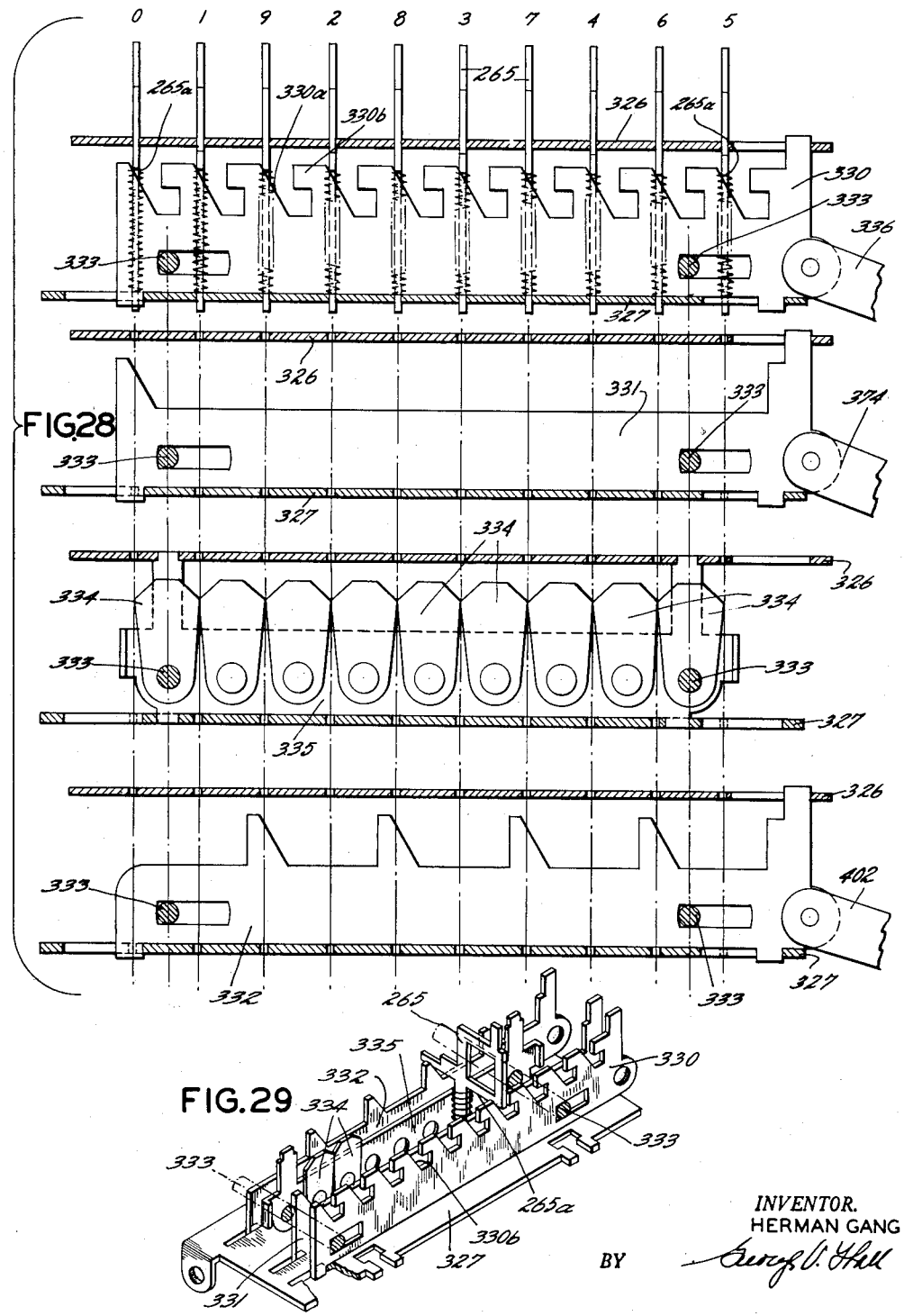

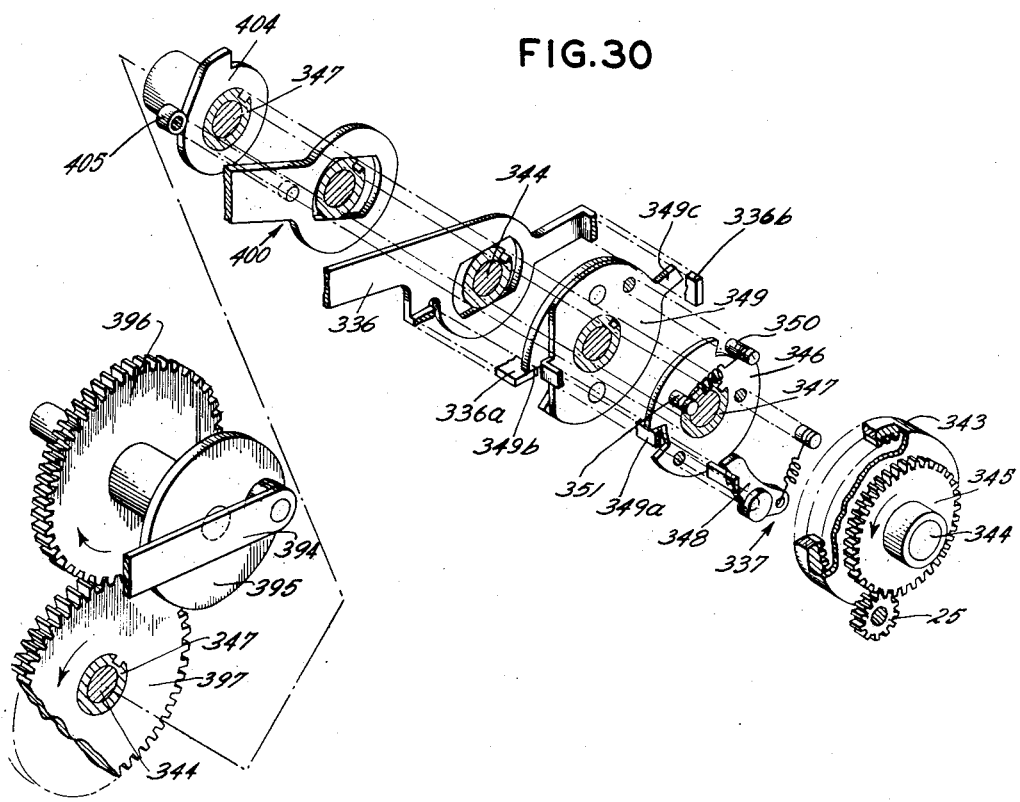
FIG.30
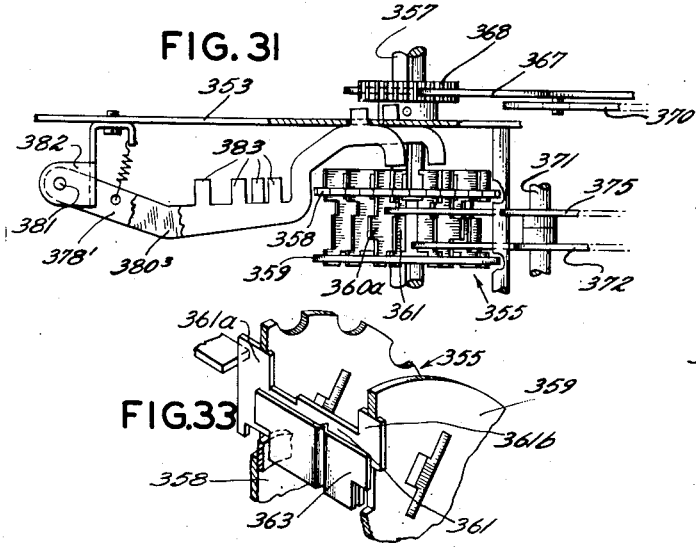
FIG.31
FIG.33
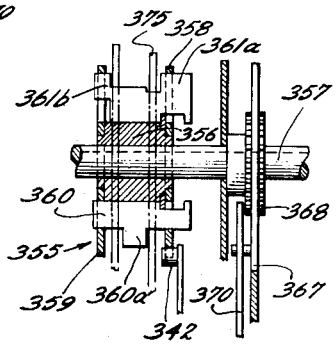
FIG.32
INVENTOR
HERMAN GANG
BY George U. Hall
ATTORNEY Feb. 7, 1961  H. GANG  2,970,754
MULTIPLICATION CONTROL MEANS FOR TEN KEY CALCULATING MACHINES
Filed Oct. 25, 1956  23 Sheets-Sheet 19
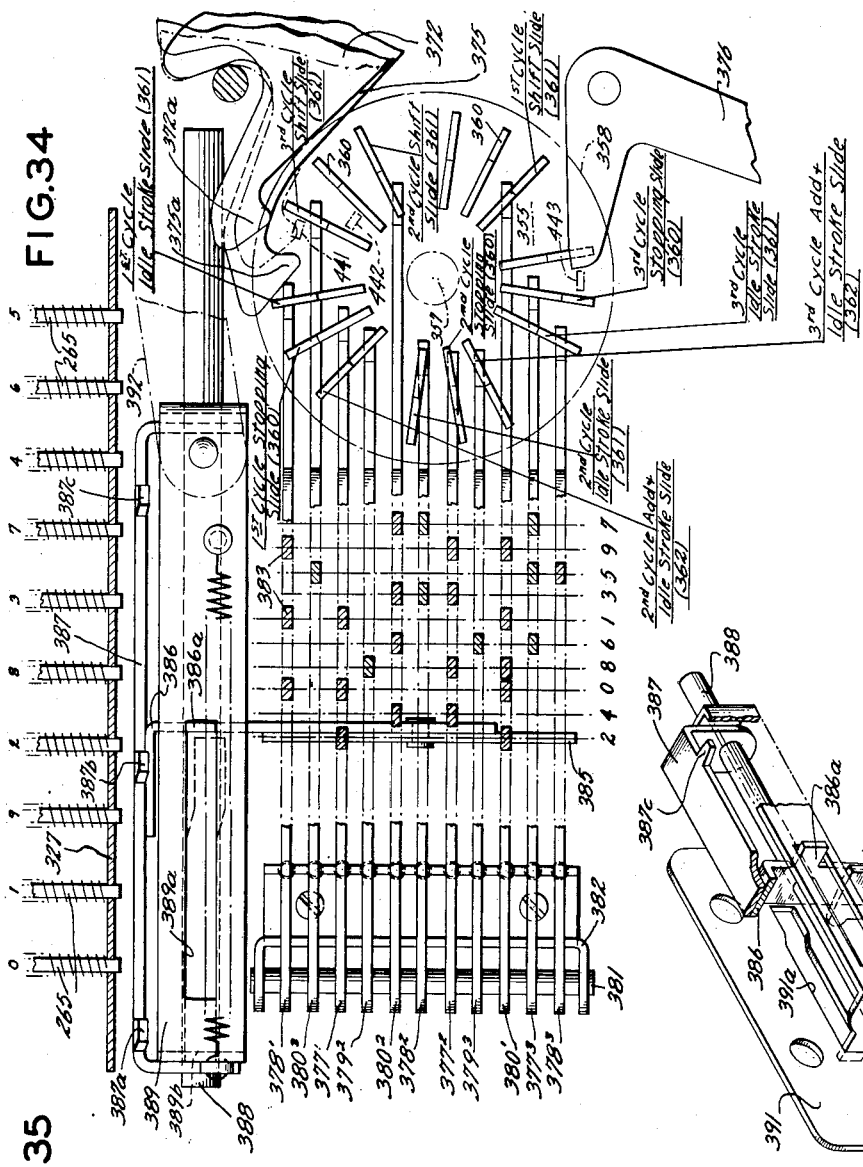
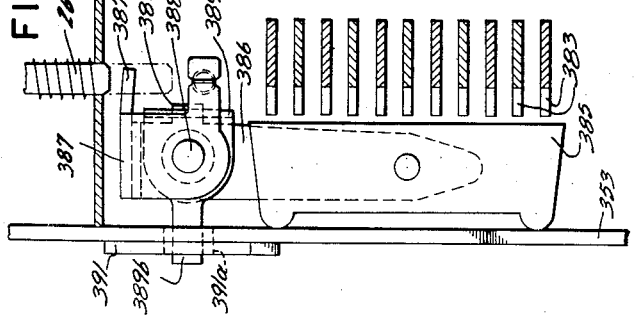
INVENTOR.
HERMAN GANG
BY
ATTORNEY

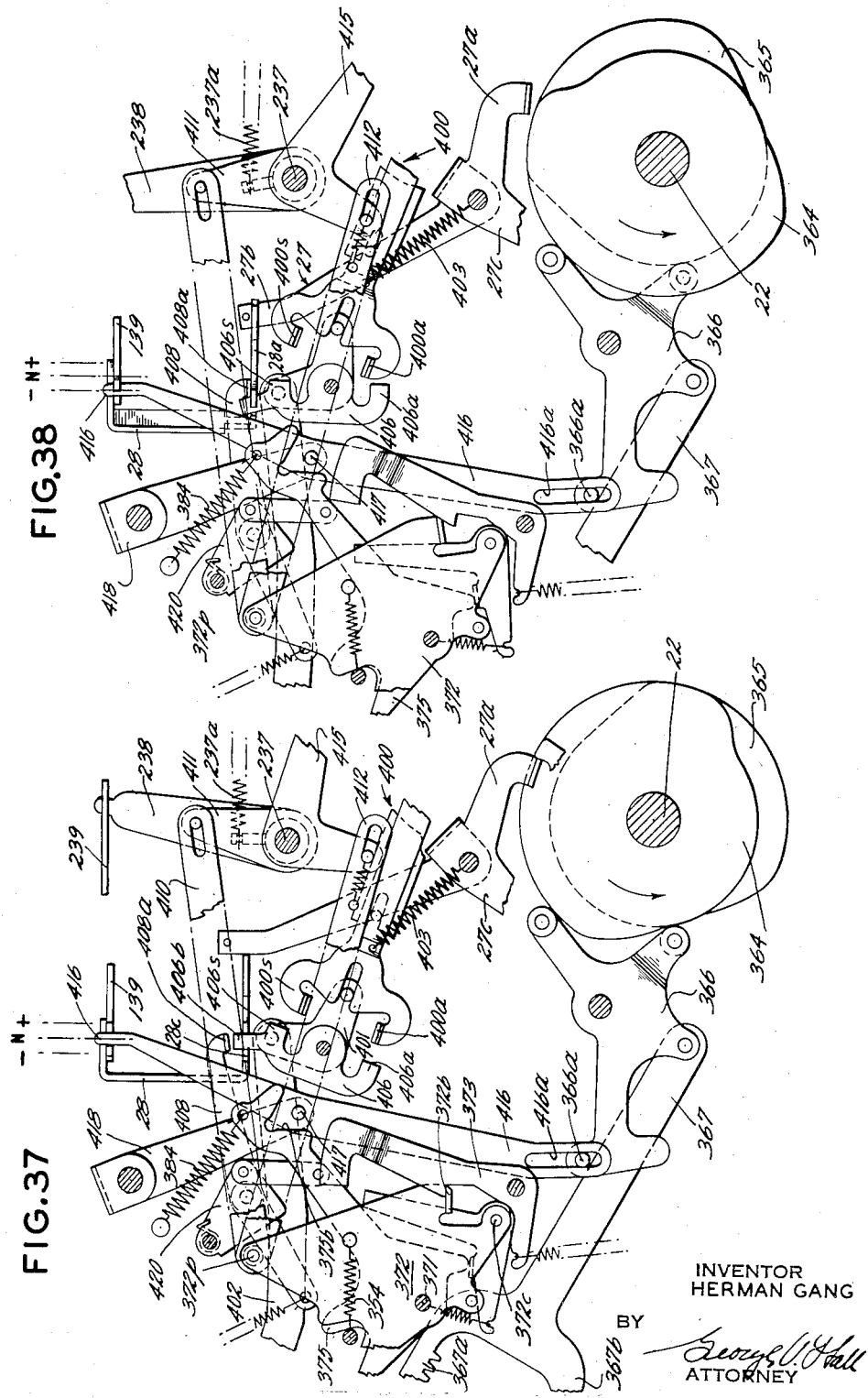
Feb. 7, 1961 H. GANG 2,970,754
MULTIPLICATION CONTROL MEANS FOR TEN KEY CALCULATING MACHINES
Filed Oct. 25, 1956 23 Sheets-Sheet 20
INVENTOR
HERMAN GANG
BY
ATTORNEY

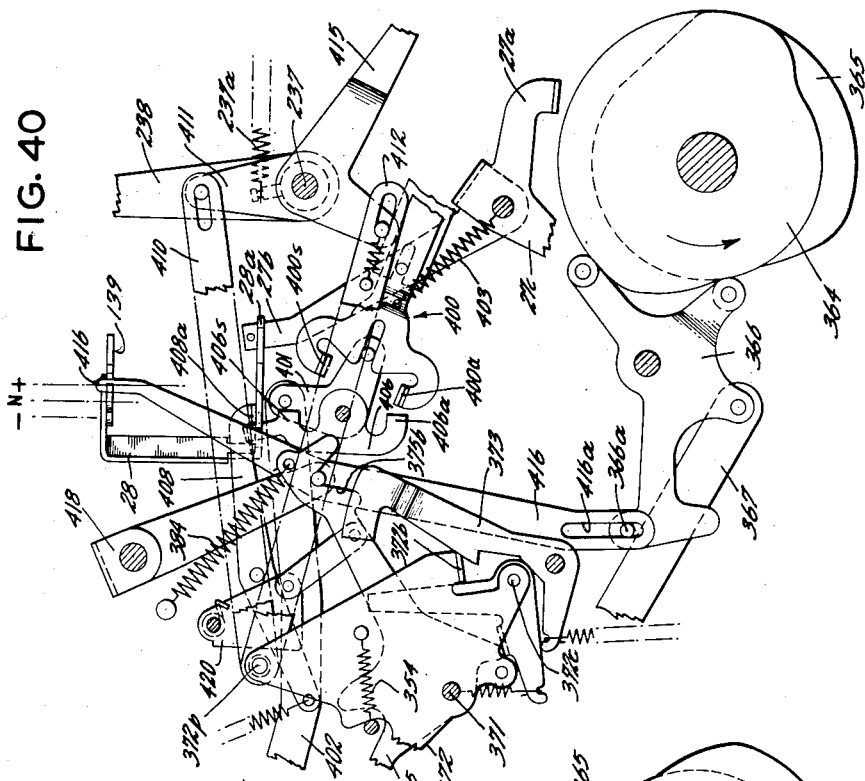
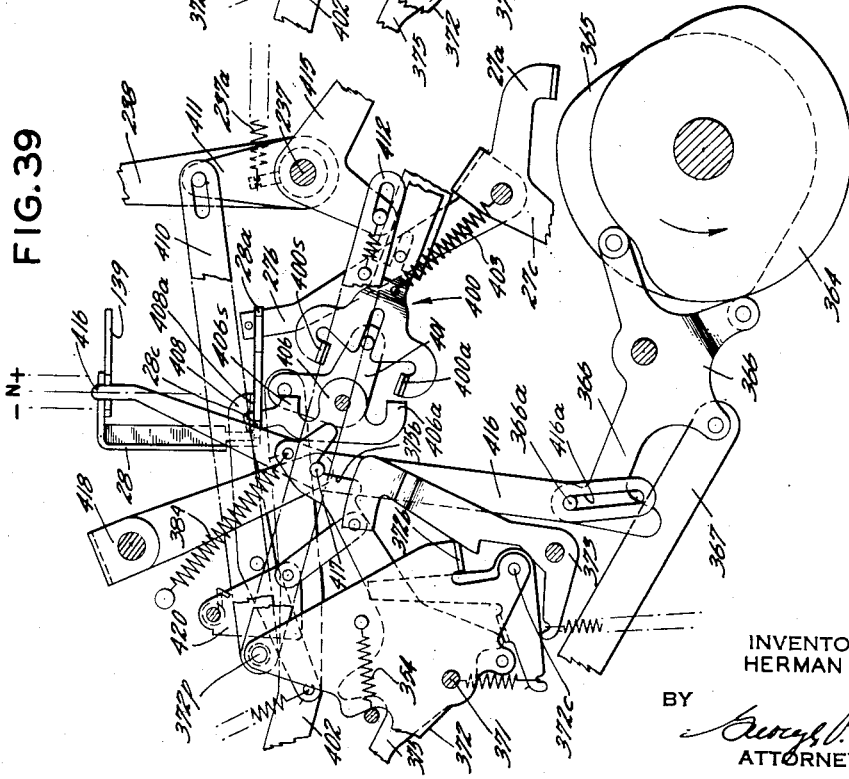

Feb. 7, 1961            H. GANG            2,970,754
MULTIPLICATION CONTROL MEANS FOR TEN KEY CALCULATING MACHINES
Filed Oct. 25, 1956            23 Sheets-Sheet 22
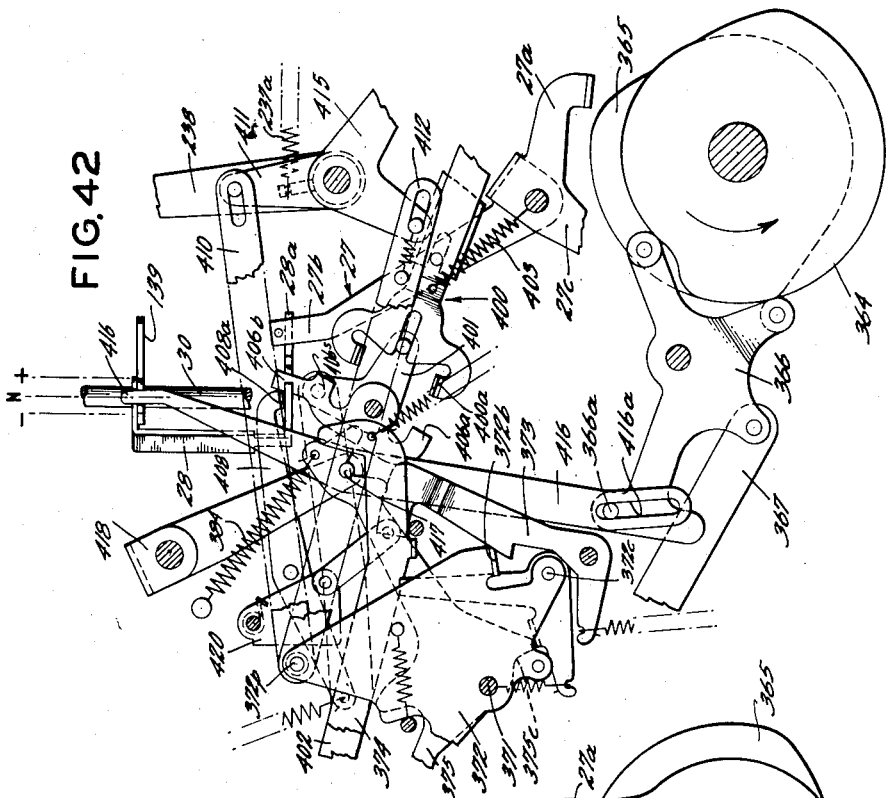
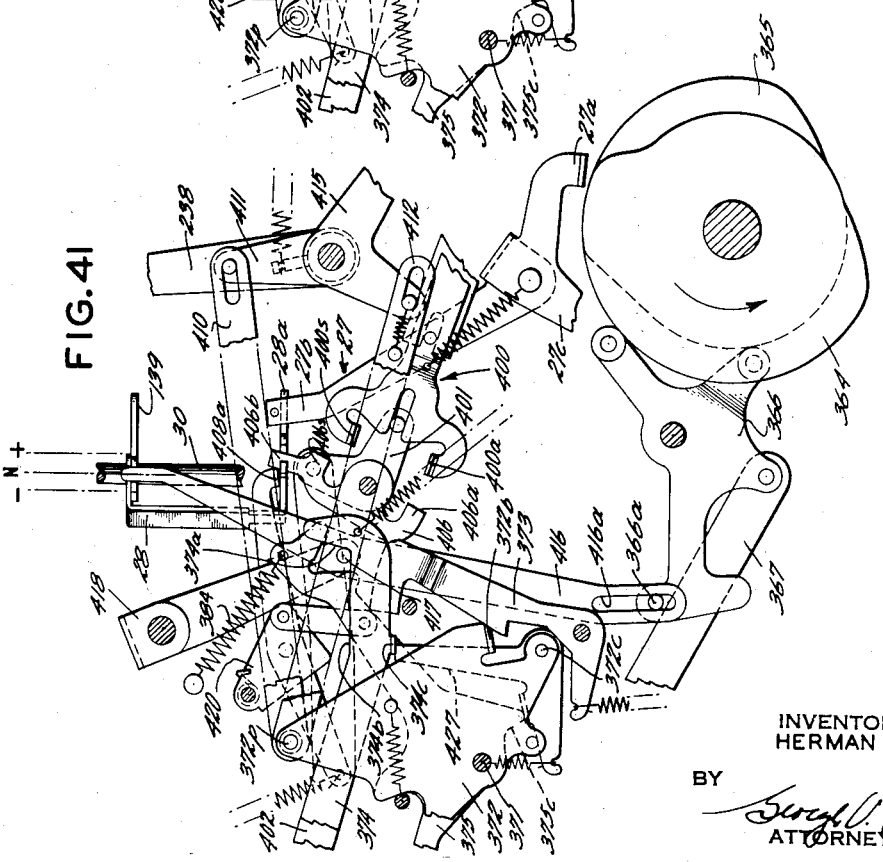
INVENTOR
HERMAN GANG
BY
ATTORNEY Feb. 7, 1961  H. GANG  2,970,754
MULTIPLICATION CONTROL MEANS FOR TEN KEY CALCULATING MACHINES
Filed Oct. 25, 1956  23 Sheets-Sheet 23

FIG. 43

| MULTIPLIER DIGIT KEYS 265 | 1ST CYCLE IDLE STROKE ARM 374 | 1ST CYCLE IDLE STROKE SLIDE 361 | 1ST CYCLE STOPPING SLIDE 360 | 1ST CYCLE SHIFT SLIDE 361 | 2ND CYCLE IDLE STROKE SLIDE 361 | 2ND CYCLE ADD+IDLE STROKE SLIDE 362 | 2ND CYCLE STOPPING SLIDE 360 | 2ND CYCLE SHIFT SLIDE 361 | 3RD CYCLE IDLE STROKE SLIDE 361 | 3RD CYCLE ADD+IDLE STROKE SLIDE 362 | 3RD CYCLE SHIFT SLIDE 362 | 3RD CYCLE STOPPING SLIDE 360 | RESULTING DOUBLE STROKE(80) REGISTRATION OF RACKS(2) + SHIFT OF PIN CARRIAGE |
|---|---|---|---|---|---|---|---|---|---|---|---|---|---|
| 0 | X | | | | | | | | | | | | IDLE, IDLE, SHIFT |
| 1 | | X | X | | | | | | | | | | +, IDLE, SHIFT |
| 2 | | X | X | X | | | | | | | | | +, +, SHIFT |
| 3 | | | | X | X | | | | | | | | +, +, +, IDLE, SHIFT |
| 4 | | | | | | | X | X | | | | | +, +, +, +, SHIFT |
| 5 | | | | | | | X | X | | | X | | +, +, +, +, +, SHIFT, IDLE |
| 6 | | | | | | X | | X | X | | X | | —, —, —, —, SHIFT, +, IDLE |
| 7 | | | | X | X | | X | | X | X | | X | —, —, —, IDLE, SHIFT, +, IDLE |
| 8 | | | | X | X | | | | | | | X | —, —, SHIFT, +, IDLE |
| 9 | | X | | | | | | | | | | | —, IDLE, SHIFT, +, IDLE |

INVENTOR
HERMAN GANG
ATTORNEY

United States Patent Office 2,970,754
Patented Feb. 7, 1961

2,970,754

MULTIPLICATION CONTROL MEANS FOR TEN KEY CALCULATING MACHINES

Herman Gang, Morris Plains, N.J., assignor to Monroe Calculating Machine Company, Orange, N.J., a corporation of Delaware Filed Oct. 25, 1956, Ser. No. 618,231

31 Claims. (Cl. 235—60)

This invention relates to multiplying mechanism, and more particularly to such mechanism adapted to control adding-subtracting listing type machines wherein registration is effected by reciprocatory rack type actuating means.

Calculating control means including multiplying mechanism have been embodied in prior art machines of this type. In these machines, the actuator racks are effective during either the initial or the return stroke of each cycle of operation, depending on the sign of registration, and are moved idly during the opposed stroke. During the initial stroke of the racks, the type members are moved to printing line position and then restored during the return stroke. The calculating speed of these prior art printing calculators is much slower than calculators having rotary type actuating means. This is primarily due to the relatively low speed of operation to which the reciprocatory actuator rack drive is inherently restricted.

It is therefore the primary object of the present invention to provide multiplication control mechanism which will effect relatively high calculating speed in a machine having reciprocatory actuating means for the registering mechanism.

A further object of the invention is to provide improved control mechanism which will control the printing mechanism to print the factors and results of the calculations in a most desirable relative position.

The machine in which the devices of the invention are herein disclosed is an adding-subtracting listing machine of the type fully disclosed in applicant's co-pending application Serial No. 618,230, filed on even date herewith. As fully disclosed in this application, the machine is adapted to perform the usual functions of an adding-subtracting listing machine. In this machine, the actuator racks of the registering mechanism are effective, in the usual manner, during one stroke and idle during the opposed stroke of each cycle of additive or subtractive registration. However, in certain other of the machine operations, the registering mechanism is rendered operable to effect a complete registering operation of like sign on both the initial and return strokes (hereinafter termed double stroke registration to distinguish from single stroke) of each cycle of operation. Reference is made to the above application for a complete disclosure of the mechanisms and operations referred to but not described in detail in the present application.

The present invention utilizes double stroke registration in the program of multiplication. Furthermore, a short cut system is included in the programs. The result of these operational characteristics is to greatly increase the calculating speed without increasing the operating speed.

The machine is of the ten key type wherein values are entered into a pin carriage in the usual manner upon successive depression of digital value keys 0 to 9. Multiplication is effected in response to successive depression of a grouping of multiplier keys 0 to 9. The multiplicand is entered in the pin carriage and then the multiplier keys corresponding to the digits of the multiplier from lower to higher orders are successively depressed. Operation of the machine is initiated in response to depression of each multiplier key; the arrangement being such that a second key may be depressed before the operation in response to the first key is completed. This permits depression of the keys as rapidly as is usually possible.

During the first cycle of registration in response to depression of the first multiplier key, the multiplicand is printed. Subsequent to completion of the complete sequence of multiplying operations, depression of a total key will result in the printing of the multiplier and then of the product. The multiplicand, the multiplier and the product are printed below each other in denominational relationship to facilitate marking of the decimals.

Normally, operation in response to depression of the total key will remove the multiplicand which is set in the machine. Selectively operable constant factor devices disable the means which is normally operable to remove the multiplicand.

In the following description with reference to the accompanying drawings, parts equivalent to those of said application Serial No. 618,230 are given the same reference numerals in so far as practical.

In the drawings:

Fig. 1 is a longitudinal section through the machine showing the registering and printing mechanism.

Fig. 2 is a plan view of the keyboard.

Fig. 5a is a fragmentary right-side view of parts of Fig. 5 is an operated position.

Fig. 7 is a perspective view of the main clutch engaging control means and sign control means for the single and double stroke registration.

Fig. 8 is a side elevation of the main clutch, the total key and slides controlled thereby.

Fig. 8a is a fragmentary perspective of the slides which are operated by the total key.

Fig. 9 is a fragmentary plan view of the symbol mechanism.

Fig. 10 is a front elevation of the pin carriage and associated mechanisms.

Fig. 13 is a left-side elevation of the machine.

Fig. 14 is a fragmentary rear view perspective of the devices for controlling operation of the counter register actuating mechanism.

Fig. 17 is a fragmentary right-side elevation of the counter register actuating means with the parts in normal position.

Fig. 18 is a view similar to Fig. 17 with the parts in an operated position.

Fig. 19 is a fragmentary perspective of the sign control devices for the counter register actuating means as viewed from the left rear of the machine.

Fig. 20 is a fragmentary perspective similar to Fig. 19 showing the parts as viewed from the right front of the machine.

Fig. 21 is a right-side elevation of details of the printing control mechanism with the parts in normal position and associated total taking control means.

Fig. 21a is a fragmentary side view of the total slide.

Fig. 21b is a fragmentary side view of the add-subtract slide.

Fig. 21c is a fragmentary perspective of the printing control mechanism.

Figs. 23, 24, 25 and 26 are detailed right-side elevations of parts shown in Figs. 21 and 22 in various operated positions.

Figs. 25a and 25b are fragmentary detail views of counter register adjusting means.

Fig. 27 is a fragmentary right-side view of the total taking mechanism in normal position.

Fig. 28 is a schematic side elevation of the multiplier control slides to show their operable relation to the multiplier key stems.

Fig. 29 is a perspective of the multiplier slides in assembled relationship.

Fig. 30 is an exploded perspective of the setting clutch.

Fig. 31 is a top-plan view of the multiplier storage magazine and setting means therefor.

Fig. 32 is a vertical section through the multiplier storage magazine.

Fig. 33 is a fragmentary perspective of one of the control slides of the storage magazine.

Fig. 34 is a mechanical schematic of the storage magazine, the setting means therefor, and part operated by the set slides of the magazine.

Fig. 35 is a front elevation of the setting mechanism multiplier storage magazine with parts in section.

Fig. 36 is a fragmentary perspective of parts of Figs. 34 and 35.

Fig. 37 is a fragmentary right side elevation of the mechanisms which are operable under control of the storage magazine with the parts in normal position.

Figs. 38 through 42 are views similar to Fig. 36 with the parts in various operated positions.

Fig. 43 is a chart indicating the control slides of the storage magazine which are set in response to depression of the digital value multiplier keys.

GENERAL ARRANGEMENT

Figure 3:
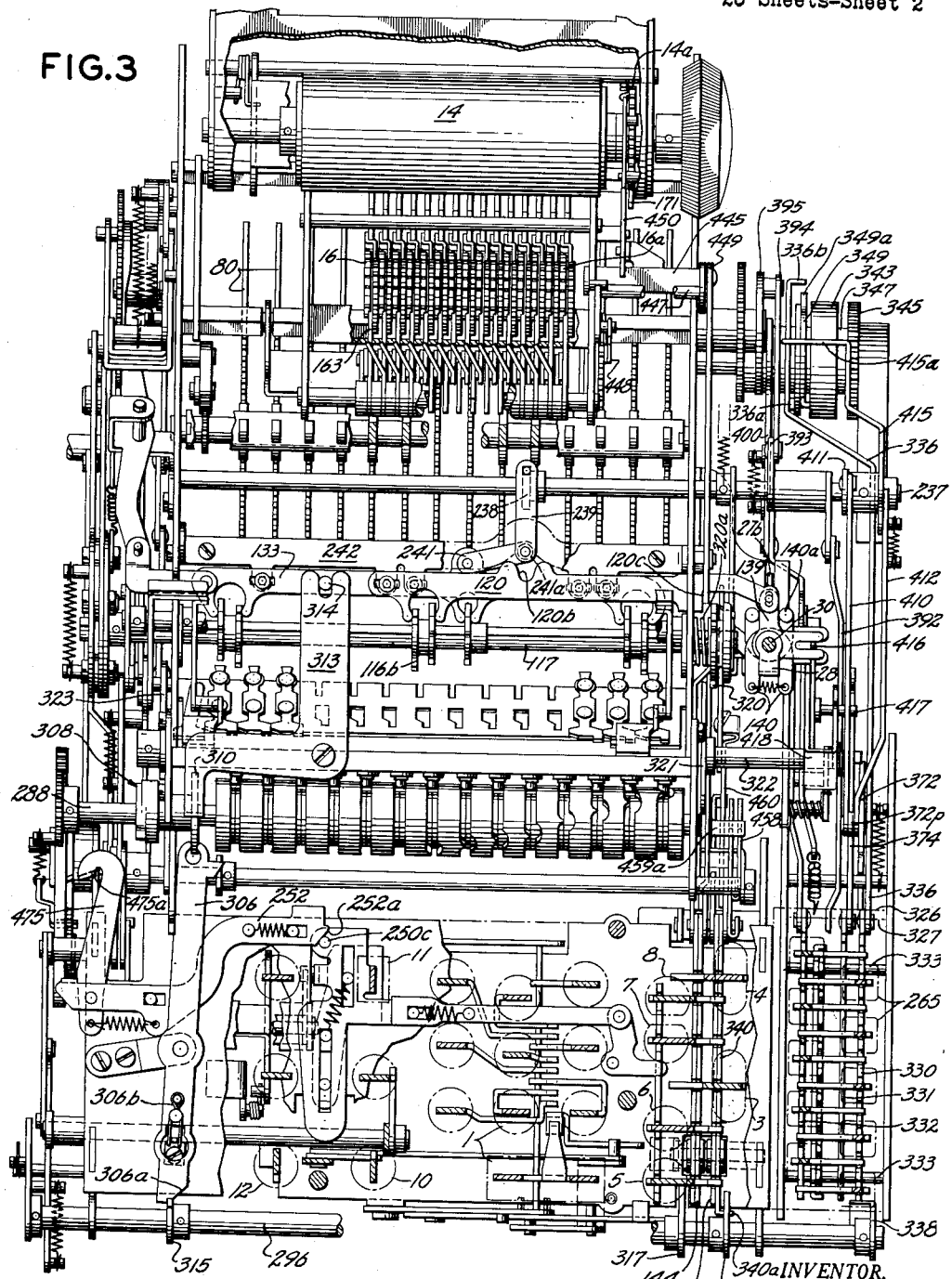
Fig. 3 is a plan view of the machine with the casing and keyboard removed and with parts in section.

The machine has, at its front, a keyboard (Figs. 1 and 2) including the usual grouping of numeral keys 1 of the digital values 0 to 9 inclusive for controlling entry of selected values into a conventional type pin carriage 2 which is located beneath the keyboard. The usual control keys are located at either side of the numeral keys. The control keys include an add key 3, a subtract key 4, a correction key 5, a total key 6, a subtotal key 7, a non-add key 8, a shift key 10, a key 11 which selectively controls a repeat or a constant factor operation, and a back space key 12. At the extreme right of the keyboard is a grouping of multiplier keys 265 of the digital values 0 to 9.

A crawl tens transfer type accumulator register designated generally by the reference numeral 13 (Figs. 1 and 4) extends transversely of the machine and is operated by rack type actuating mechanism, the excursions of which are controlled in accordance with values entered in the pin carriage.

A counter register designated generally by the reference numeral 266 extends transversely of the machine to the fore of accumulator 13. Drive means, hereinafter described, is operable to effect a single count in counter 266 during each effective stroke of the accumulator actuating mechanism in the registration of a product thereby registering the multiplier.

At the rear of the machine is the usual platen 14 and paper roll 15 (Figs. 1 and 3). Forwardly of platen 14 are type wheels 16 which are adjusted under control of the accumulator registering mechanism and operated in timed relation therewith.

MACHINE DRIVE

With reference to Figs. 4, 5, 6, 7 and 8, the machine is driven by a motor 17 through a main clutch 18 located outwardly of the machine right side frame. The motor may be continuously operated or it may be engaged in well-known manner upon closure of a switch in response to engagement of the clutch upon depression of the machine operating keys.

Clutch 18 is of well-known construction in which the driving member comprising a toothed wheel 19 is adapted for engagement by a spring urged pawl 20 mounted on the driven member 21 of the clutch. The driven member 21 of the clutch is fast on a main drive shaft 22 on which a plurality of cams for performing various of the machine functions are mounted.

Figure 5:
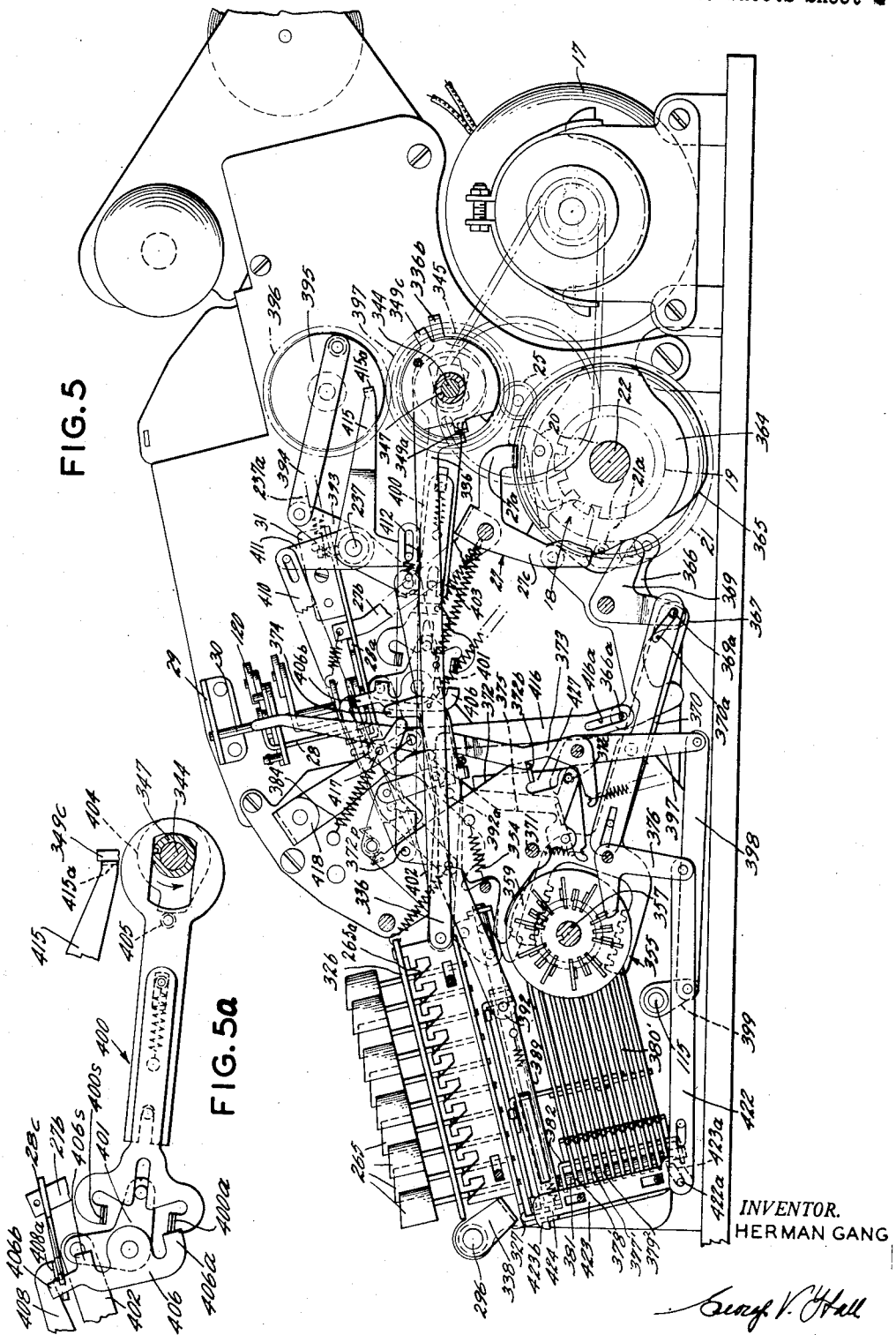
Fig. 5 is a right-side elevation of the machine showing the machine drive and the multiplication control mechanism with the parts in normal position.
Figure 6:
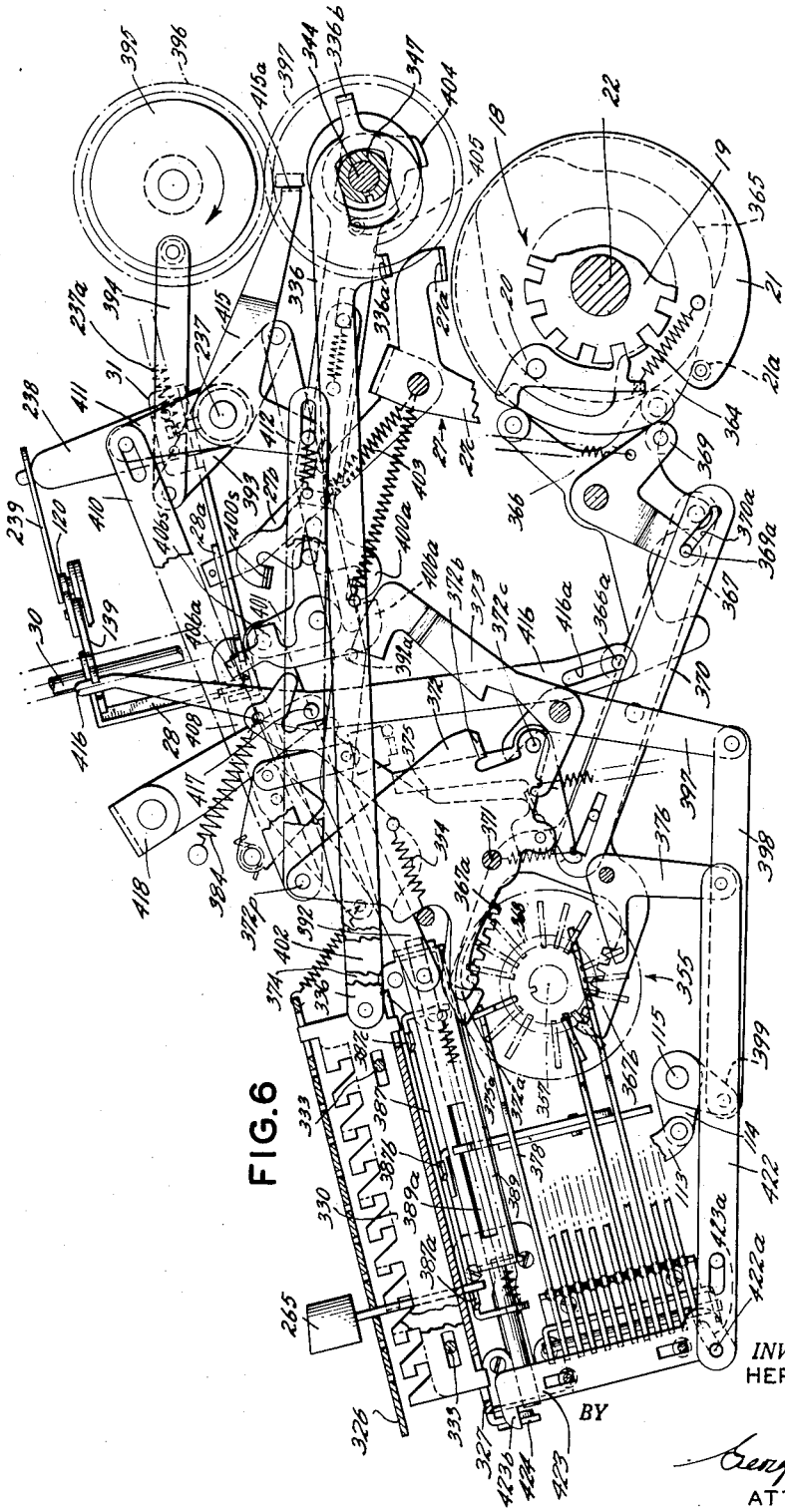
Fig. 6 is an enlarged right-side elevation of parts of Fig. 5 in an operated position.

Normally pawl 20 is held, against the tension of its spring, in clutch disengaging position by a lug 27a at the end of one arm of a three-armed lever 27 as shown in Figs. 5, 6 and 8. Lever 27 is spring urged counterclockwise and is normally restrained from such movement by engagement of the upper end of an upstanding arm 27b thereof with the end of a rearwardly extending lower arm 28a of a pivotally mounted U-shaped yoke 28 as best shown in Figs. 7 and 8.

Yoke 28 is pivotally mounted on a vertical shaft 30 which extends through lower arm 28a and through the opposed upper arm, and which is supported by an upper bracket 29 and a lower bracket 31 on the machine right-side frame. A pair of scissor arms 32 have common pivotal mounting on shaft 30 adjacent the upper face of arm 28a of yoke 28 and normally are spring urged one toward the other to engage the opposite sides of an upstanding lug of bracket 31. The vertical portion of yoke 28 connecting its two horizontal arms is of the same width as the lug of bracket 31 and normally is engaged by the inner edges of the opposed arms of scissors 32 as they engage the sides of said lug. Yoke 28 is therefore yieldably held in a centralized position by scissor arms 32. In the normal centralized position of yoke 28, the end of its arm 28a will be engaged by the end of arm 27b to hold lever 27 in clockwise clutch disengaging position as shown in Figs. 5, 7 and 8.

Clutch 18 will be engaged upon pivotal movement of yoke 28 in either direction (Figs. 3 and 7) by control means hereinafter described. Upon pivotal movement of yoke 28, the end of its arm 28a will be removed from engagement with arm 27b of lever 27. Lever 27 will then be moved counterclockwise to the position shown in Fig. 6 to remove lug 27a from engagement with pawl 20. Pawl 20 will then be moved into engagement with driving member 19 of the clutch to complete the drive to driven member 21. Means for rocking yoke 28 to engage the clutch drive is hereinafter described in connection with the various machine functions.

During operation of clutch 18, the counterclockwise positioned arm 27b of lever 27, by engagement with one side or the other of arm 28a, will restrain yoke 28 in rocked position. However, if yoke 28 is released by the control means which initially effected the rocking operation thereof, clutch 18 will be disengaged at the end of the current cycle of operation as follows:

As the clutch approaches full cycle position, a pin 21a on the driven member 21 will engage an arm 27c of lever 27 thereby rocking said lever clockwise to normal position. Clockwise movement of lever 27 will move arm 27b thereof from engagement with the side of arm 28a of yoke 28 which will then be centralized by scissor arms 32. As clutch 18 completes its cycle of operation, lug 27a will be engaged by pawl 20 to disengage the clutch drive. Furthermore, upon movement of the clutch to full cycle position, pin 21a will be moved beyond arm 27c as shown in Figs. 5 and 8 thus releasing lever 27. However, lever 27 will be restrained in normal clutch disengaging position by engagement of its arm 27b with the end of arm 28a of centralized yoke 28.

Should yoke 28, when released by arm 27b, be held in rocked position by the control means which effected the initial rocking operation, lever 27 will be immediately rerocked counterclockwise after release by pin 21a as the clutch moves to full cycle position. As a result, lug 27a will not engage pawl 20 and the clutch will not be disengaged but will remain continuously engaged until the end of a cycle of operation in which yoke 28 is released by the control means.

THE PIN CARRIAGE CONTROL

With reference to Figs. 1, 4, 10 and 11, pin carriage 2 is transversely shiftable beneath the keyboard of the machine. The carriage is supported at its front by a roller 33 which rides on a rail 34, and at its rear the carriage is supported by a bracket 36 which is slidably mounted on a worm shaft 37 of the carriage shifting mechanism. Worm shaft 37 is suitably journaled in the machine side frames, and fixed thereon inwardly of the left-side frame is a pinion 38. Engaging pinion 38 is a segmental drive gear 39 which is pivotally mounted forwardly of worm shaft 37. A torsion spring 41 biases gear 39 counterclockwise (Fig. 11) thereby urging pinion 38 and worm shaft 37 clockwise. At the rear of carriage 2 is a pin 42 (Figs. 1 and 4) which engages the worm 37a of shaft 37. Worm 37a is directionally threaded so that clockwise movement of shaft 37 will shift pin carriage 2 toward the left.

Normally pin carriage 2 is held in its right end position (Figs. 4 and 10) against the urge of worm shaft 37 by an escapement 40 which is spring retracted in counterclockwise position (Fig. 10). Upon each depression of a digital value key 1 to set a corresponding value in a pin row of carriage 2, escapement 40 is rocked clockwise; and upon release of the depressed key, the escapement is restored and the carriage is escaped one ordinal position toward the left. Escapement 40 is operated in connection with the program of multiplication hereinafter described.

After the actuator racks have completed their forward excursions under control of the pin carriage in each registering operation, means is operable to restore pin carriage 2 to its right-end home position. Such means comprises an arm 104 (Fig. 11) which is moved toward the rear of the machine. Upon rearward movement of arm 104, a hooked end 104a thereof will engage a pin 39a on gear segment 39. This will rock segment 39 clockwise thereby rotating worm shaft 37 to restore the carriage. Means is provided to disable carriage return arm 104. Such means comprises a crank 114 fast on a shaft 115. A link 113 connects crank 114 and arm 104. To disable arm 104, shaft 115 is rocked clockwise to raise arm 104 through crank 114 and link 113. Hooked end 104a will therefore move ineffectively above pin 39a upon rearward movement of arm 104. This disabling means is controlled in connection with the program of multiplication hereinafter described.

THE ACCUMULATOR REGISTER

The crawl tens transfer accumulator 13 (Figs. 1, 4 and 27) is of the type disclosed in Patent No. 1,829,180 as modified by Patent No. 2,450,787. The ordinal units of the accumulator, each including a digital input gear 66, are rotatably mounted on a shaft 65. Shaft 65 of the accumulator is supported by an adjustable linkage which is controlled to effect relative adjustment between the actuating mechanism (hereinafter described) and said accumulator to determine the sign of registration and the type of registration (single or double stroke).

THE ACTUATING MECHANISM FOR THE ACCUMULATOR REGISTER

The digital actuators include a rack 80 (Figs. 1, 4 and 27) positioned below and in the vertical plane of each accumulator gear 66. To the rear of each gear 66 and meshed with the associated rack 80 is a reversing gear 82 rotatably mounted on a cross shaft 83. Normally gears 66, as shown in Fig. 1, are disengaged from both racks 80 and reversing gears 82.

Racks 80 are normally positioned to the rear (Fig. 1). During the first half of each registering machine cycle, racks 80 are moved forwardly in excursions determined by values set in pin carriage 2 and during the second half of the cycle the racks are restored. Each registering machine cycle has an initial dwell before racks 80 are moved forwardly, a midcycle dwell before said racks are moved toward the rear, and a terminal dwell after said racks are restored to the rear. During these dwells of the actuator rack drive, selectively adjustable devices are operable to engage and to disengage accumulator gears 66 with racks 80 and reversing gears 82 in certain predetermined sequences to determine the sign of registration and the type of registration (single or double stroke). Briefly the adjustable devices effect the following operations.

For additive single stroke operation, racks 80 are moved idly in their forward initial strokes and reversing gears 82 are idly rotated. During the midcycle dwell, accumulator 13 is lowered to engage wheel gears 66 with racks 80. Therefore, during the return strokes of the racks, wheel gears 66 will be rotated in additive counterclockwise direction to effect one complete digital registration in accordance with the values set in pin carriage 2. During the terminal dwell, accumulator 13 is raised to normal thereby disengaging wheel gears 66.

For additive double stroke operation, accumulator 13 is moved to the rear during the initial dwell of the drive to engage wheel gears 66 with reversing gears 82. Therefore, during the initial forward strokes of racks 80, reversing gears 82 will rotate gears 66 counterclockwise to effect one complete additive registration. During the midcycle dwell, gears 66 will be disengaged from reversing gears 82 and engaged with racks 80. Thus, a second complete additive registration will be effected during the return strokes of the racks after which the accumulator will be raised to normal during the terminal dwell.

For subtractive single stroke operation, accumulator 13 is lowered during the initial dwell of the drive to engage wheel gears 66 with racks 80. Therefore, during the forward initial strokes of the racks, wheel gears 66 will be rotated in subtractive clockwise direction to effect one complete digital registration in accordance with the values set in pin carriage 2. During the midcycle dwell, accumulator 13 is raised to disengage wheel gears 66. Therefore, racks 80 will be restored idly and reversing gears 82 will be rotated idly.

For subtractive double stroke operation, accumulator 13 is lowered during the initial dwell of the drive to engage wheel gears 66 with racks 80. Therefore, during the forward initial strokes of the racks, wheel gears 66 will be rotated to effect one complete digital registration. During the midcycle dwell, gears 66 will be disengaged from racks 80 and engaged with reversing gears 82. Thus, a second complete subtractive registration will be effected during the return strokes of the racks after which the accumulator will be moved forwardly to normal disengaged position during the terminal dwell.

The adjustments of the devices to perform the above-described sign and registration control operations are effected by a pair of slides 120 and 133. Slide 120 is adjusted from a normal centralized position to control single stroke registration, and simultaneous adjustment of slide 120 and 133 will control double stroke registration. Slide 120 is adjusted upon movement of yoke 28 (Figs. 3, 6, 7 and 8) which, as heretofore described, is rocked in either direction to engage clutch 18 of the machine drive.

To adjust slide 120, a bell crank 139 is mounted on shaft 30 adjacent the upper end of yoke 28. A pair of spring urged centralizing scissors 140 have a pair of studs 140a which yieldably locate crank 139 in centralized position with respect to yoke 28. The right end of slide 120 has pin and slot connection with crank 139. Upon counterclockwise movement of yoke 28 (Fig. 7) to engage clutch 18, crank 139 will move slide 120 to the left. This adjustment will provide for additive single stroke registration. Conversely upon clockwise movement of yoke 28, slide 120 will be moved to the right to provide for subtractive single stroke registration.

Means is operable to couple slide 133 for adjustment with slide 120. This will provide for additive or subtractive double stroke registration in accordance with the adjustment of slide 120. The coupling means comprises a link 241 (Figs. 3 and 7) attached at one end to the rear of slide 133. The opposite end of link 241 has connection through a roller 241a with the forward end of a rearwardly extending link 239. At its rear, link 239 has connection with the end of an upstanding arm 238, which at its lower end is fast on a rock shaft 237.

Normally, shaft 237 and arm 238 are urged to clockwise position by a light spring 237a (Fig. 7) thereby holding link 239 to the rear. This will locate roller 241a in a cam recess 242a in the forward edge of a fixed rail 242. With the parts in this position, slide 133 will be located by link 241 in an inactive central position. However, upon counterclockwise movement of shaft 237 and arm 238, roller 241a will be moved forwardly to engagement with a cam recess 120b at the rear edge of slide 120. This will couple slide 133 through link 241 for adjustment in accordance with the adjustment of slide 120.

It will be appropriate at this time to note that slide 120 may be adjusted independently of the adjustment effected by yoke 28. This is made possible by the yieldable centralizing connection comprising scissors 140 between crank 139 to which slide 120 is attached and yoke 28. This adjustment is effected in connection with the multiplying program and supersedes the adjustment initially effected by yoke 28 as hereinafter described. The means which effects the superseding adjustment of the sign control devices will be termed the secondary setting means as distinguished from the primary setting means including yoke 28 which effects the initial setting operation.

THE COUNTER REGISTER

The counter register 266 (Figs. 1, 4, 26 and 27) is of the same crawl tens transfer type as accumulator 13 and comprises the same number of ordinal units. The ordinal units of the counter, each including a digital input wheel gear 267, are rotatably mounted on a shaft 268. The ends of shaft 268 are mounted in vertical slots 269 (Fig. 22) in the machine framing, and are normally held in yieldable raised position by a pair of springs 270. With shaft 268 in normal raised position, wheel gears 267 are each engaged with an intermediate drive gear 271 (Fig. 1) and are each located above and disengaged from the ordinally corresponding actuator rack 80 of accumulator register 13. Intermediate drive gears 271 are rotatably mounted on a cross shaft 274 and each is positively located by a spring urged detent 275. In a total taking operation to print a multiplier, as later described, counter register 266 is lowered to disengage wheel gears 267 from intermediate gears 271 and to engage them with actuator racks 80.

ACTUATING MECHANISM FOR THE COUNTER REGISTER

Actuating means for the counter register comprises a drive gear 276 (Figs. 1 and 14) associated with each intermediate drive gear 271. Gears 276 are splined for axial adjustment on a cross shaft 277. Adjusting means normally locates each gear 276 in disengaged position to the right (Fig. 14) of the associated intermediate gear 271. The adjusting means for each gear 276 comprises a depending arm 278 which is pivotally mounted at its upper end to a transversely extending bracket 279 (Figs. 1 and 3). The lower end of arm 278 comprises a fork engaging the opposed side walls of gear 276.

Forwardly of arms 278 is a cam drum 280. On cam drum 280 are a series of axially spaced concentric cam grooves 281. Each cam groove comprises an operating lobe 281a at one side wall and an opposed recess in the opposite side wall. Engaging each cam groove 281 is a pin 278a on one of the adjusting arms 278. Cam lobes 281a are spirally arranged so that upon clockwise rotation of drum 280 (Figs. 1 and 14) said lobes will successively engage and then disengage pins 278a respectively from lower to higher orders. When the parts are in normal position, drum 280 is located counterclockwise from the position of Fig. 14 to a position wherein the lowest order cam lobe 281a is one step of rotation from engagement with the associated pin 278a. Upon engagement of each pin 278a by the associated lobe 281a, its arm 278 will be rocked clockwise by the leftmost arm, as shown in Fig. 14, to engage the connected gear 276 with the related intermediate gear 271. Thus the orders of counter register 266 from lower to higher will be connected successively, upon rotation of cam drum 280, into driven engagement with respect to shaft 277.

Means is provided to rotate drum 280 (Figs. 1 and 14) an initial step of movement to engage the lowest order cam lobe 281a with the associated pin 278a thereby adjusting the lowest order drive gear 276 to engaged position. Simultaneously with this step of movement, means is operable to couple drum 280 into driven relationship with worm shaft 37 (Figs. 1 and 4) of the shifting mechanism of pin carriage 2. The arrangement is such that upon each subsequent step of movement of the carriage toward the left, cam drum 280 will be rotated a step of movement to engage the next higher order cam lobe 281a with the associated pin 278a. The successive higher orders of the counter register will therefore be connected for operation by drive gears 276 respectively as said carriage is shifted toward the left.

The simultaneous stepping and coupling means comprises a segmental gear 283 (Figs. 11, 13, 15 and 16) mounted on a stub shaft 284 exteriorly of the left-side frame. Engaging gear segment 283 is a pinion 285 fast on worm shaft 37 of the carriage shift drive. Mounted on a stub shaft 284 adjacent gear segment 283 is a second gear segment 286. Gear segment 286 engages a pinion 287 fast on a shaft 288 on which cam drum 280 is also fast.

Figure 15:
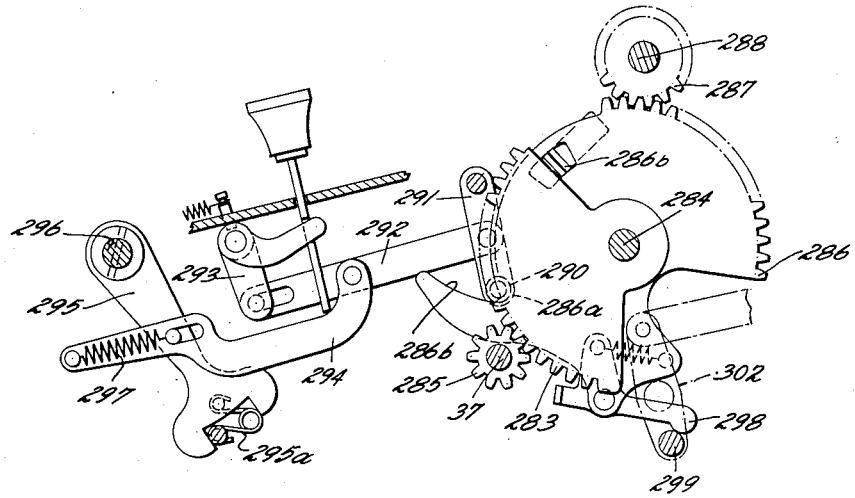
Fig. 15 is a fragmentary right-side view, with the parts in normal position, of the means for coupling the counter register actuating mechanism for adjustment with the carriage shifting mechanism.
Figure 16:
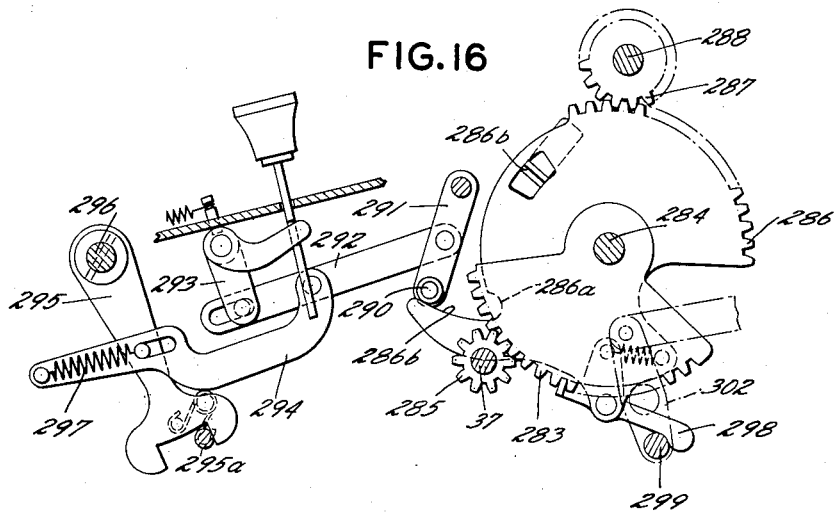
Fig. 16 is a view similar to Fig. 15 with the parts in an operated position.

Means is provided to locate gear segment 286 in the normal uncoupled position shown in Figs. 13, 15 and 16. This means comprises a roller 290 at the lower end of a depending arm 291 which is pivotally mounted at its upper end. A forwardly extending link 292 is connected at its rear end intermediate the ends of arm 291, and at its forward end is supported by pin and slot connection with a crank 293, the operation of which is not concerned with the present invention. Intermediate the ends of link 292, the rear end of a forwardly extending operating link 294 is pivotally connected. Link 294 has pin and slot connection adjacent its forward end with a depending arm 295 which is fast on a shaft 296. Normally arm 295 is held counterclockwise as shown in Fig. 15 by a toggle spring 295a. Normally link 294 is held toward the rear with respect to arm 295 to the limit of its slot and pin connection by a spring 297. This provides a yieldable connection which permits independent forward adjustment of link 294 in an operation not concerned with the present invention. With the parts in the normal position shown in Fig. 15, arm 291 will be in counterclockwise position and roller 290 will engage a cam recess 286a in the peripheral edge of gear segment 286. This locates segment 286 and entrained cam drum 280 in home position.

The coupling means comprises a coupling pawl 298 pivotally mounted at the lower edge of segment 286. Pawl 298 is spring biased clockwise and a tooth at its left end is adapted to engage a tooth space of gear segment 283 upon clockwise movement, thereby coupling said segment 283 and segment 286. Normally a cam face on the underside of the right end of pawl 298 is engaged by a pin 299 thereby holding said pawl in counterclockwise disengaged position (Figs. 13 and 15). Pin 299 is located at the lower end of a lever 302. This lever, however, is not operated in connection with the devices of the present invention and therefore pin 299 may be considered fixed.

As later described, shaft 296 is rocked clockwise to the position shown in Fig. 16 in response to depression of any one of the multiplier keys 265. Upon clockwise movement of shaft 296, arm 295 will move links 294 and 292 toward the front of the machine thereby rocking arm 291 clockwise. Upon clockwise movement of arm 291, roller 290 will be removed from engagement with locating cam recess 286a and will engage a forwardly extending cam surface 286b connected therewith. Engagement of cam surface 286b by roller 290 will rotate gear segment 286 one step of movement counterclockwise with respect to gear segment 283 as shown in Fig. 16. This operation will remove the cam surface at the right end of pawl 298 from engagement with pin 299 thereby permitting clockwise movement of said pawl to engage the tooth at its left end with a tooth space of segment 283 thereby coupling segment 286 for subsequent rotation with said segment 283. At this time, a multiplicand will have been entered in pin carriage 2, and therefore gear segment 283 will be rotated to a counterclockwise position in dependence on the number of digits of the multiplicand. Furthermore, during this initial step of movement of segment 286, cam drum 280, entrained therewith, will be rotated a step of movement to engage the lowest order cam lobe 281a (Figs. 3 and 14) with the associated pin 278a thereby enabling the drive means for the lowest order of counter register 266.

Normally, disabled means is operable to rotate shaft 277 (Figs. 1, 14, 17 and 18) on which drive gears 276 are splined, either additively or subtractively. The drive means for shaft 277 is operable in time with the drive means of actuator racks 80 of accumulator 13. The timing is such that during each cycle of operation of racks 80, two steps of movement may be imparted to shaft 277. Thus, two counts may be registered in counter register 266 for each cycle of operation of actuator racks 80. With this arrangement, in the program of multiplication in which the double stroke registering operation of racks 80 is employed, the proper count for the registration of the multiplier will be effected in counter register 266.

The counter drive means includes a pinion 303 (Figs. 13, 17 and 18) fast on shaft 277 and yieldably held against rotation by a detent 301 exteriorly of the left-side frame. One or the other of a pair of oppositely disposed counting fingers 304 is adapted to engage and rotate gear 303. Counting fingers 304 comprise a pair of normally disabled arms each having an active upper end or nose oppositely opposed and normally below gear 303 as shown in Fig. 17. Enablement of the rightmost finger will result in additive registration in the counter register and enablement of the leftmost finger will result in subtractive registration.

At their lower ends, fingers 304 have common pivotal mounting at the forward end of a lever 305 (Figs. 13, 17 and 18). At its rear, lever 305 is provided with a cam slot 305a which engages a pin 95a on a spring-urged cam follower 95 of the drive means for actuator racks 80 (Fig. 1). Upon each cycle of operation of the actuator rack drive, follower 95 is rocked counterclockwise from the position of Fig. 17 and restored under control of a cam 96 fast on machine drive shaft 22.

Cam slot 305a is of obtuse inverted V-shape and normally pin 95a engages the rear end of said slot (Fig. 17). During the first part of the first half of a machine cycle, follower 95 will be rocked counterclockwise to engage pin 95a with the intersection of the legs of slot 305a as shown in Fig. 18. This will rock lever 305 clockwise to raise counting fingers 304 in their effective stroke of operation. During the last half of the first half of the machine cycle follower 95 will be rocked further counterclockwise from the position of Fig. 18 to engage pin 95a with the forward end of cam slot 305a. This will restore lever 305 counterclockwise and lower counting fingers 304. During the second half of the machine cycle, follower 95 will be restored thereby duplicating the operation of raising and lowering fingers 304.

Counting fingers 304 (Figs. 17, 18) are adjusted for operation under control of a pair of scissors 307. Scissors 307 are pivotally mounted on shaft 277 inwardly of gear 303, and at their lower ends have pin and slot connection with the respective counting fingers 304. Scissors 307 are operable to adjust fingers 304 under control of a sign determining device generally indicated by the reference numeral 308 (Figs. 3, 17, 18, 19, 20). Device 308 comprises a sleeve 309 which is rotatable and axially slidable on shaft 288 on which cam drum 280 is fast. An adjusting disc 310 is integral with sleeve 309 at its right end (Figs. 3, 30) at its left end (Fig. 19). At the opposite end of sleeve 309 and integral therewith is a pair of upper blocking wings 311 and a pair of lower blocking wings 312. Blocking wings 311—312 are displaced from each other axially on sleeve 309 but overlap at a central connecting area whereby the upper and lower wings provide a continuous blocking surface. Scissors 307 are spring urged inwardly at their upper ends and are therefore adapted to engage blocking wings 311 or 312 or are adapted to pass below or above said wings respectively in accordance with adjustment of sign control device 308.

When sign control device 308 is in normal axially centralized position, as shown in Figs. 19, 20, the upper ends of scissors 307 will engage the overlapping blocking opposed faces of wings 311—312. When the device is in this position, rotary adjustment thereof in either direction from a normal centralized angular position will be ineffective to remove either of the blocking surfaces of wings 311—312 from the inward path of movement of the engaging upper ends of scissors 307. The lower ends of scissors 307 will therefore be held outwardly and likewise hold counting fingers 304. Therefore, upon operation of said fingers, their operating ends will pass idly at opposite sides of gear 303. However, upon adjustment of device 308 axially in either direction and subsequent rocking adjustment, said device will be rendered effective to enable counting fingers 304 as follows.

Sign control device 308 is normally held in axially centralized position by a forwardly extending lever 306 (Figs. 1, 3, 17, 20). The rear end of lever 306 comprises a fork engaging adjusting disc 310 of device 308. Lever 306 is held in centralized position by a centralizing spring 306b (Fig. 3) of well-known construction. The front end of lever 306 terminates in a cam edge 306a adjacent shaft 296 which, as will be recalled, is rocked clockwise (Fig. 1) upon depression of any one of the multiplying keys 265. An upstanding arm 315 fast on shaft 296 is adapted, when said shaft is rocked, to engage cam edge 306a of lever 306 and rock said lever clockwise (Figs. 3, 20) to adjust device 308 toward the right, toward the left (Fig. 19).

Sign control device 308 is normally held in angular centralized position by a bell crank 313 (Figs. 3, 7, 17) comprising a rearwardly extending arm and a leftwardly extending arm. The leftwardly extending arm has a finger at its end which engages a notch 310a in the edge of disc 310 of control device 308. The rearwardly extending arm has a fork at its end which engages a pin 314 on double stroke registration control slide 133. When slide 133 is in centralized non-registration controlling position, crank 313 will adjust device 308 to its normal centralized angular position. In the multiplication program, later described, slide 133 (Figs. 3, 7) is adjusted toward the left to additive position in the usual product registration and toward the right to subtractive position in connection with the short cut registration. Movement of the slide to additive position will rock crank 313 counterclockwise and this will rock device 308 counterclockwise (Figs. 17, 18, 20), clockwise (Fig. 19). Conversely, movement of the slide to subtractive position will reverse the above adjusting operations.

Upon axial adjustment of device 308 toward the right (Figs. 3, 20), toward the left (Fig. 19) in response to depression of a multiplier key 265, wings 312 will be brought into controlling position with respect to scissors 307. With centralizing device 308 in this axial adjusted position but in centralized angular position, the oppositely disposed wings 312 will both be in blocking position with respect to said scissors and counting fingers 304 will be disabled. However, when said device is angularly adjusted, as above described, upon movement of slide 133 to additive position, the left wing 312 (Figs. 17, 20) will be lowered below the inward path of movement of the associated upper end of scissors 307 as shown in Fig. 18. This scissors 307, therefore, will be rocked clockwise to move the right counting finger counterclockwise, as shown in Fig. 18, to active position. With this adjustment however, the right wing 312 will remain in the path of its associated scissors 307 and therefore the left counting finger 304 will remain disabled. It will be noted that a limit pin controls the extent of inward movement of the enabled counting finger so that upon upward movement, it will engage gear 303 to effect one step of movement to effect an additive count in counter register 266. Upon movement of slide 133 to subtractive position, the reverse of the above operations will be effected and the opposite wing 312 will be lowered from blocking position and therefore the opposite counting finger 304 will be enabled. Thus, a subtractive count will be registered in counter 266 for the short cut operation.

By other appropriate axial and angular adjustments of device 308, the count in counter register may be controlled for sign like or unlike that of the registration in accumulator register 13 in machine operations not concerned with the present disclosure.

PRINTING MECHANISM

Each ordinal unit of the printing mechanism comprises a type wheel 16 (Figs. 1, 3) having peripherally spaced 0 to 9 type mounted on a spring charged hammer plate 160 which is restrained by a latch 163. A suitable gear train connects each type wheel 16 with the ordinally corresponding actuator rack 80 and operates to adjust the wheel in accordance with the excursions of the rack. During the midcycle dwell of the actuator rack drive, at which time the actuator racks have completed their forward excursions, a bail 166 which has been rocked counterclockwise from the normal position shown in Fig. 1 by a spring urged cam follower is restored and thereby trips the appropriate latches 163 to release the associated hammers 160 to effect the printing operation.

A bail 174 is operable to restore hammers 160. Bail 174 is normally held in raised position by a pair of followers 172 which are attached to arms 174a at opposite sides of said bail and extend downwardly to engagement with like cams 173 on main drive shaft 22. When in raised position, bail 174 engages the undersides of arms 160a which extend rearwardly from hammers 160. During the forward strokes of actuator racks 80, bail 174 is lowered by followers 172 so that hammers 160 may be fired; and during the return strokes after the printing operation, bail 174 is raised by said followers thereby restoring the hammers to latched position.

With each restoring operation of followers 172, a drive finger 171 (Fig. 21) is operable to rotate platen 14 one step of movement clockwise thereby advancing the paper strip 15a from roll 15. Finger 171 is pivotally mounted on the right hand follower 172 at its point of connection with arm 174a of restoring bail 174. Finger 171 extends upwardly and terminates in an operating end, adapted for engagement with a ratchet wheel 14a fast on the right end of platen 14. Finger 171 is spring biased clockwise and is normally restrained from engagement with ratchet wheel 14a by a cam lug 171a at its rear which engages a fixed stud 149. As follower 172 is lowered, cam lug 171a will be moved below stud 149 (Fig. 22) and finger 171 will be rocked clockwise to engage a tooth of ratchet 14a. As follower 172 and finger 171 are restored upwardly, the finger will advance ratchet wheel 14a and platen 14 one step and then be rocked to disengaged position by cam edge 171a upon re-engagement with stud 149.

The printing mechanism is normally disabled by a latch 177 (Figs. 21, 22) which restrains bail 166 from initial counterclockwise rocking operation. Therefore, unless released, bail 166 will not be afforded the restoring movement which operates to trip latches 163. Means operable in connection with symbol printing mechanism is operable to control latch 177.

The symbol printing mechanism includes a symbol wheel 16a (Fig. 3) having appropriate type to indicate the character of the machine operation and located to the right of numeral type wheels 16. Symbol wheel 16a is mounted on a hammer plate 160 restrained by a latch 163 which is adapted to be released upon rocking operation of bail 166 as described in connection with hammers 160 of type wheels 16.

A symbol rack 175a of a slide 175 (Figs. 21, 22) is adapted to adjust symbol wheel 16a for the printing operation. Normally, slide 175 is held toward the front of the machine against the bias of spring means which urges it toward the rear. During the initial stroke of the drive means for actuator racks 80, slide 175 is released for rearward movement to adjust symbol wheel 16a for the printing operation and after the operation the slide is restored.

A symbol plate 179 (Figs. 8, 9, 22) controls the extent of the rearward movement of slide 175 to thereby bring the appropriate type of wheel 16a to printing line position. Plate 179, which is slidably mounted for transverse movement below the keyboard, is entrained with slide 175 and is thereby normally held toward the right (Fig. 9). As slide 175 is moved toward the rear, plate 179 is moved toward the left until restrained from further movement by means adjusted into blocking position upon depression of the particular key which has initiated the machine operation. In this manner, plate 179 and entrained slide 175 are afforded predetermined degrees of movement to position the appropriate symbol type.

The excursion of plate 179 is controlled, in a multiplying operation by an arm 317 (Figs. 8, 9) fast on shaft 296 which, as noted before, is rocked clockwise upon depression of any multiplier key 265. Upon clockwise movement of shaft 296, arm 317 will be moved into the path of movement of a lug 318 at the forward edge of plate 179 to determine its excursion and the adjustment of symbol wheel 16a.

Latch 177 (Figs. 21, 22) comprises a bifurcated member having forwardly extending upper and lower arms, and is pivotally mounted at its rear. Latch 177, which is spring biased clockwise, is normally held counterclockwise (Fig. 21) by a pin 175b on symbol rack 175a engaging a nose 177b at the forward end of the lower arm of said latch. A lug 177a at the end of the upper arm of the latch will therefore be held downwardly at the front of a shoulder at the upper side of the right arm of bail 166 to block said bail against operating movement. Thus, the printing mechanism is normally disabled. However, upon one or more steps of rearward movement of symbol rack 175a, pin 175b will be removed from engagement with nose 177b and latch 177 will be rocked clockwise thereby raising lug 177a a step of movement and out of the path of the shoulder of bail 166. Upon further rearward movement of symbol rack 175a to the position associated with a multiplying operation (Fig. 22), pin 175a will be brought above a recess 177c in the upper edge of the lower arm of latch 177. This will permit latch 177 to be raised an additional step as later described in connection with printing control in a program of multiplication.

TOTAL TAKING

The total taking mechanism for accumulator 13 has been described only to the extent that is believed necessary to an understanding of the invention. Reference is made to applicant's copending application, Serial No. 618,230, filed on even date herewith for a complete description of the mechanism.

In a total taking operation for accumulator 13 (Figs. 1, 4), crawl carry wheels are rotated to zero position successively from lower to higher orders by subtractive operation of actuator racks 80. The total taking controls include an add-subtract slide 144 (Figs. 3, 8) adjustable in response to depression of total key 6 to engage the drive means for actuator racks 80 for single stroke subtractive operation, and control means conditioned by a total slide 195 simultaneously adjusted upon depression of said key which modifies the subtractive operation of the actuator drive means as follows:

Add-subtract slide 144 has link connection 142 (Figs. 7, 8) with yoke 28. Upon depression of total key 6, slide 144 will be moved forwardly thereby rocking yoke 28 clockwise (Figs. 3, 7) to adjust sign control slide 120 to the right to subtractive position and to engage main clutch 18. Slide 120 is operable to adjust a three-lobe cam 116b (Figs. 1, 3, 7, 8) which is splined for axial adjustment on a shaft 117. Upon movement of slide 120 is subtractive position, cam 116b will be moved from inactive position to active position with respect to an adjusting linkage which is spring biased to normally hold accumulator 13 disengaged from actuator racks 80 and reversing gears 82.

In a cycle of clutch 18, shaft 117 is stepped clockwise one 30° step of movement during the initial dwell of the actuator rack drive, two 30° steps of movement during the mid-cycle dwell of the drive and a final 30° step of movement during the terminal dwell of the drive. During the first step of movement of shaft 117 a lobe of cam 116b will be effective to operate the adjusting linkage to move and then to hold accumulator 13 in lowered position. This will engage wheel gears 66 (Fig. 1) of accumulator 13 with the respective actuator racks 80 for subtractive operation. In the total taking operation, however, the devices set upon adjustment of total slide 195 operate to interrupt operation of main clutch 18 before the actuator rack drive is effective to move racks 80 toward the front of the machine in their initial excursions. As an incident to the interruption of clutch 18, means is provided to release actuator racks 80 successively from lower to higher orders.

The means whereby successive release of actuator racks 80 is initiated includes a pin 187b of a latch 187 (Figs. 8, 27) of the lowest order of the total taking mechanism. Upon interruption of clutch 18, a link 198 (Fig. 8) will be moved toward the front of the machine thereby engaging a cam edge 198b with pin 187b to release lowest order latch 187. Release of latch 187 will result in operation of mechanism to release column latch 91 (Figs. 1, 27) of the lowest order actuator rack 80. Rack 80 then will be moved toward the front of the machine under the urgency of its spring and will rotate the lowest order of accumulator 13 subtractively toward zero. As the lowest order wheel approaches zero position, a lug 192a of a disc 192 thereof will engage a cam edge 193a of a plate 193, and then as it moves into zero position, said lug will engage a total hook 191c of a plate 191. Upon engagement of lug 192a with total hook 191c, means will be operated to trip the next higher order latch 187. Thus, the operation will be extended across the machine until the highest order actuator rack 80 is moved to rotate the highest order of the accumulator to zero. Upon movement of the highest order accumulator wheel to zero, means is operable to reengage clutch 18 so that it will complete its cycle of operation. As clutch 18 continues its operation, the actuator rack drive will move column latches 91 toward the front of the machine forwardly of the front ends of racks 80.

During the mid-cycle dwell of the drive, the total will be printed and shaft 117 (Figs. 1, 3, 7) will be given its two steps of movement. The first of these two steps will move the effective lug of cam wheel 116b from holding position with respect to the adjusting linkage of accumulator 13. The accumulator will, therefore, be raised to normal and disengage wheel gears 66 from racks 80. During the return stroke of the actuator rack drive, latches 91 will reengage the ends of racks 80 thereby restoring said racks to the rear. During the terminal dwell of the actuator rack drive, the fourth step of movement of shaft 117 will bring the next lobe of cam 116b into the position which was occupied by the lobe which was active at the beginning of the cycle. The above briefly described total taking operation from accumulator 13 is the usual operation performed in response to depression of total key 6 unless the mechanism has otherwise been conditioned.

A total taking operation from counter register 266 is performed by subtractive operation of actuator racks 80 controlled by auxiliary control means in conjunction with the primary control means described in connection with the total taking operation from accumulator register 13. The controls are conditioned in response to performance of a multiplying operation; and upon depression of total key 6 following said operation, a total will first be taken from counter register 266 and then a second total taking operation will automatically be initiated for accumulator register 13. The means whereby the total taking operations are sequentially performed will be described later in detail. The immediately following description will set forth the means operable to control a total taking operation from counter register 266.

Splined for axial adjustment on shaft 117 exteriorly of the right side frame is a three-lobe cam wheel 320 (Figs. 3, 7, 21, 22, 23, 24) having the same operating characteristics as described in connection with cam wheel 116b which is adjusted by slide 120 in the total taking operation for accumulator 13.

Figure 22:
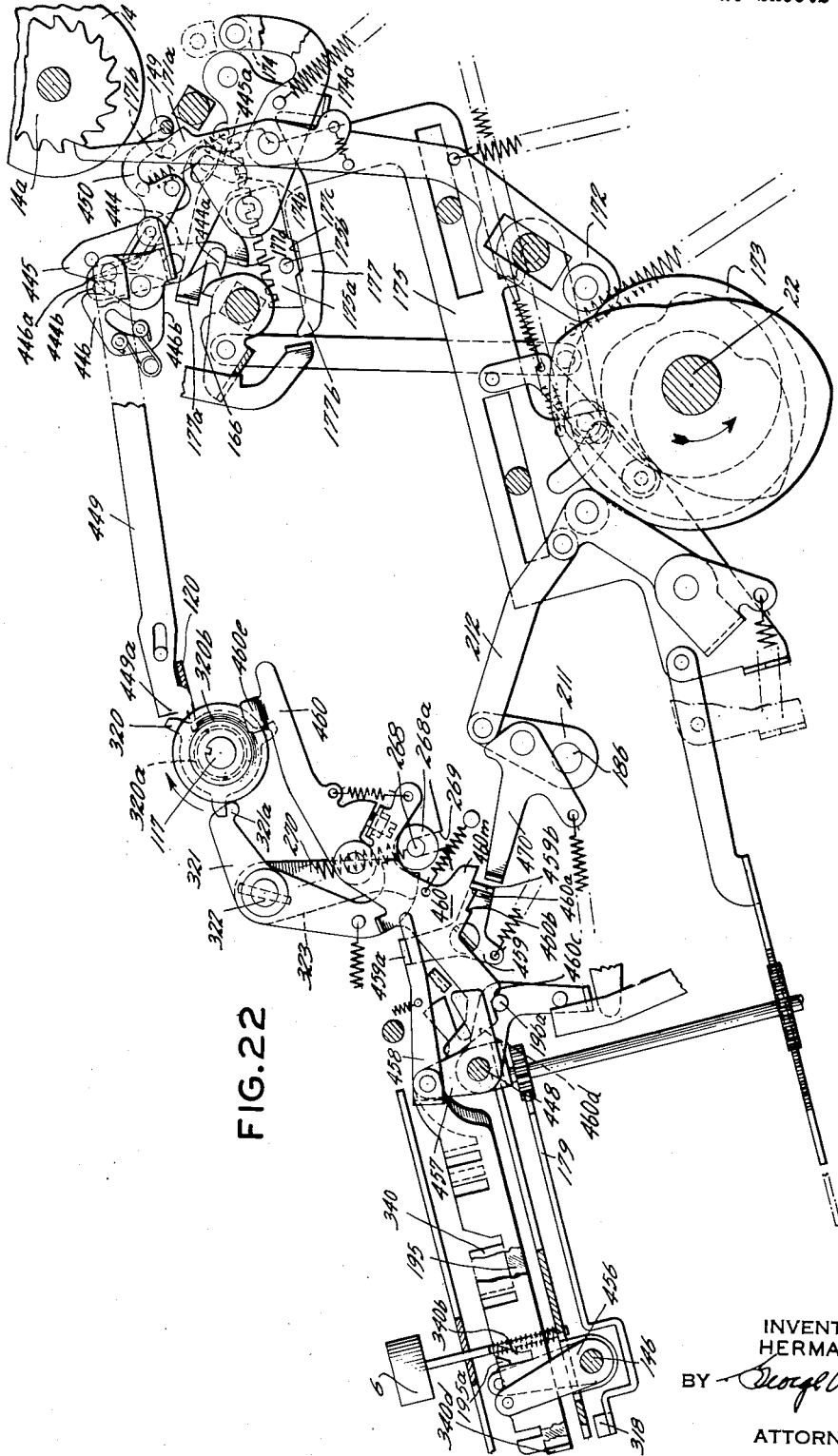
Fig. 22 is a right-side elevation similar to Fig. 21 with the parts in an operated position.

Cam wheel 320 is adapted to operate a lever 321 located exteriorly of the right side frame and fast on a cross shaft 322. One arm of lever 321 extends toward the rear and terminates in a nose 321a. Normally, cam wheel 320 is held axially on shaft 117 by a spring 320a in a plane outwardly of nose 321a. Therefore, as shaft 117 is rotated, cam 320 will rotate idly with respect to lever 321 as shown in Fig. 22. The other arm of lever 321 extends downwardly and terminates in a cam edge 321b located forwardly of a collar 268a on the end of shaft 268 on which counter register 266 is mounted. Shaft 322 which extends across the machine and exteriorly of the left side frame has fixed thereon a depending cam arm 323 (Fig. 13) similar to the arm of lever 321. Arm 323 terminates in a cam edge 323b adapted for engagement with a collar at the left end of shaft 268 of the counter register in the manner of cam edge 321b of the arm of lever 321. Normally, shaft 322, lever 321 and arm 323 are spring biased in clockwise position as shown in Fig. 21.

Slide 120 extends through a suitable slot in the right machine side frame and, as will be recalled, has connection with adjusting yoke 28 (Figs. 3, 7) through a yieldable crank 139. When slide 120 is adjusted toward the right to subtractive position in response to depression of total key 6, a shoulder 120c thereof will be moved immediately adjacent the inner face of cam wheel 320. As hereinafter described, means is provided to move cam wheel 320 inwardly on shaft 117 into the plane of nose 321a of lever 321. At this time yoke 28 will be rocked to subtractive position. However, shoulder 120c by engagement with cam wheel 320, will prevent slide 120 from being adjusted to subtractive position by yoke 28 and crank 139 will yield. Cam wheel 116b therefore will remain in inactive position and a total will not be taken from accumulator 13. During the first step of shaft 117 in the total taking operation, a lobe of cam wheel 320 will be effective to rock and then hold lever 321, shaft 322 and arm 323 counterclockwise as shown in Figs. 25 and 26. This will engage cam edges 321b and 323b with the collars at the ends of shaft 268 thereby moving counter register 266 downwardly to engage wheel gears 267 of each order of the register with the respective racks 80.

The total taking operation will progress as described in connection with accumulator 13 as actuator racks 80 operate to rotate the successive higher orders of the counter register to zero. Each order of the counter register includes a disc 325 (Figs 1, 26), having a lug 325a which is the equivalent of lug 192a (Fig. 27) of each order of the accumulator register. As each wheel of the counter register approaches zero, lug 325a engages a cam edge 193c on plate 193 which is similar to cam surface 193a on said plate which is engaged by a lug 192a. Furthermore, upon movement of the wheel to zero, lug 325a will engage a total hook 191d on plate 191 which is the equivalent of total hook 191c on said plate which is engaged by lug 192a. Thus plates 191 and 193 are acted upon in the same manner by both lugs 192a and 325a in the total taking operations. During the mid-cycle dwell of the actuator rack drive, cam 320 will be stepped to release lever 321 and thereby permit counter register register 266 to be raised to disengaged position.

From the foregoing it will be seen that cam 320 performs the same timing of engagement and disengagement of counter register 266 with racks 80 as cam 116b performs with respect to accumulator register 13. Furthermore, it will be seen that the lugs 325a of the respective orders of the counter register are operable in conjunction with cam surfaces 193c and total hooks 191d to operate parts 193 and 191 respectively in the same manner as lugs 192a of the accumulator wheels are operable in conjunction with cam edges 193a and total hooks 191c. It will be understood that otherwise the total taking operations for both counter and accumulator are effected in the same manner by the same mechanisms.

MULTIPLICATION (INITIAL SETTING OPERATIONS)

A multiplicand is entered in pin carriage 2 upon depression of numeral keys 1 (Figs. 1, 2, 3, 4, 10), corresponding to the digits of said multiplicand, successively from higher to lower orders in the usual manner. Then the multiplier keys 265, corresponding to the digits of the multiplier, are successively depressed from lower to higher orders. In response to depression of the first multiplier key, operation is initiated whereby the product of the factors comprising the multiplicand and the lowest order digit of the multiplier will be registered in accumulator register 13 and the lowest order multiplier digit will be registered in counter register 266. However, certain initial setting and conditioning operations are effected, in response to depression of the key, before operation is initiated to register the product multiplier digit. Until these initial operations are completed, the multiplier key is locked depressed, and until said key is released a second multiplier key cannot be depressed.

Upon conclusion of the initial setting and conditioning operations, a second multiplier key may be depressed. However, the initial setting and conditioning operations in response to this second key depression will be held in abeyance until the registration in response to said first key depression is completed. With this arrangement, the multiplier keys may be successively depressed as rapidly as is usual by the operator in this type of operation.

The operations responsive to depression of multiplier keys 265, will be later described in consideration of the digital value of said keys. However, there are certain of the initial operations common to all of the multiplier keys upon depression and these operations will now be described.

Multiplier keys 265 are arranged in two adjacent rows on the extreme right side of the keyboard (Figs. 2, 3, 10). The left key row comprises the 1, 2, 3, 4 and 5 keys and the right row comprises the 6, 7, 8, 9 and 0 keys. The stems of keys 265 extend downwardly through a top plate 326 of the keyboard and at their lower ends through a bottom guide plate 327 secured in spaced relationship to the top plate (Figs. 5, 6, 28, 29). Keys 265 are normally spring retracted and the stem of each has an operating edge 265a extending transversely above a group of three control slides located between the keyboard top plate 326 and the bottom guide plate 327 for the key stems.

The control slides from right to left (Figs. 3, 28, 29), comprise a common multiplier key slide 330, a zero multiplier key slide 331, and a short cut multiplier key slide 332. The slides are slotted and thereby are slideably mounted on a pair of shafts 333. Normally the slides are spring held toward the rear of the machine through attached linkage hereafter described. With reference to Figs. 28, 29, it will be seen that the common multiplier key slide 330 is moved toward the front of the machine upon depression of any one of the multiplier keys 265, zero key slide 331 is moved toward the front simultaneously with common slide 330 upon depression of 0 multiplier key 265, and short cut slide 332 is moved toward the front simultaneously with common slide 330 upon depression of any one of the 6 to 9 multiplier keys 265. The operations in connection with common slide 330 comprise the operations common to all of the multiplier keys.

Slide 330 (Figs. 28, 29) has an inclined cam edge 330a adapted for engagement by the operating edge 265a of the stem of each multiplier key 265. Upon depression of a key 265, the operating edge of its stem, by engagement with the associated cam edge 330a, will cam slide 330 toward the front of the machine. During this operation a lug 330b of the slide will pass through an opening in the key stem thereby latching the key depressed until retraction of the slide as later described.

Well known means is provided to prevent depression of a second multiplier key 265 until the first key is retracted. This means comprises a series of pairs of upstanding rockers 334 pivotally mounted at their lower ends on a plate 335 located between slides 331 and 332. The stem of a key 265, upon depression, is permitted passage between a pair of rockers 334. This will hold the adjacent edges of the remaining pairs of rockers in engagement thereby preventing passage of a key stem therebetween.

Movement of slide 330 toward the front of the machine will likewise move a link 336 (Figs. 5, 6, 30). This movement of link 336 will engage a setting clutch 337 for a single cycle of operation. The control of the operation of setting clutch 337 and the operations performed by the clutch will be described in detail later. Briefly, the setting clutch performs certain invariable conditioning operations, as determined by the digital value of multiplier key 265 which is depressed, and effects engagement of main clutch 18 of the machine drive. Furthermore, forward movement of slide 330 operates to rock shaft 296 clockwise from the position shown in Fig. 1 to the position shown in Figs. 5, 15 to the position shown in Fig. 16. The means for rocking shaft 296 comprises a depending arm 338 fast on said shaft and engaged at its lower free end by the front edge of slide 330 (Fig. 5). When shaft 296 is rocked, it is held so adjusted, until restored as later described, by the aforedescribed toggle spring 295a in conjunction with arm 295 which is fast on said shaft. Clockwise setting of shaft 296 will perform certain operations previously described and essential to the program of multiplication. These operations are briefly summarized as follows.

Sign and drive control device 308 for counter register 266 will be adjusted axially to the right (Figs. 3, 20). This will provide for registration in counter register 266 of like sign with respect to the sign of registration in accumulator register 13. The lowest order drive gear 276 (Figs. 1, 14) for counter register 266 will be adjusted to engaged position. Thereafter, each successive higher order gear 276 will be engaged and the next lower gear disengaged as pin carriage 2 is step shifted toward the left in the multiplying operation. The multiplier digits will therefore be registered in counter register 266 from lower to higher orders.

Arm 317 (Figs. 8, 9), on shaft 296 will be brought in the path of movement of lug 318 on symbol plate 179. Symbol wheels 16a will therefore be moved to the appropriate position for the multiplicand printing operation as hereafter described.

Another operation, not previously described, is effected upon setting of multiplier shaft 296. This operation comprises setting of an auxiliary total slide 340 (Figs. 3, 10, 25) for operation in connection with the total taking mechanism in response to depression of total key 6 after completion of the registration of a product and a multiplier as later described in detail. Auxiliary total slide 340 is mounted in like manner and adjacent the right side of total slide 195. A lug 340a at the front end of slide 340 is engaged by the forked end of a depending arm 341 fast on shaft 296. Therefore, when shaft 296 is in normal counter clockwise position, slide 340 will be held toward the rear of the machine, and upon clockwise setting of the shaft, slide 340 will be adjusted toward the front.

MULTIPLICATION (THE SETTING CLUTCH)

The driving member of setting clutch 337 (Figs. 5, 6, 30) comprises a drum 343 having an annulus of internal teeth. Drum 343 is rotatably mounted on a shaft 344 extending outwardly from the right side frame. Fast on the outer face of drum 343 is a gear 345 which meshes with gear 25 of the drive train for main clutch 18 which is driven at substantially a one to two ratio with respect to the setting clutch.

The driven member of setting clutch 337 comprises a plate 346 keyed on a sleeve 347 which is rotatably mounted on shaft 344. Plate 346 is contained within drum 343 with its peripheral edge inwardly of the annulus of teeth of said drum. Means for engaging and disengaging clutch 337 comprises a pawl 348 mounted on the face of plate 346 and spring biased counterclockwise toward engagement with the internal teeth of drum 344.

A control plate 349 comprises means operable to control pawl 348. Plate 349 is loosely mounted on sleeve 347 to the left of and adjacent plate 346. A pin 350 extends toward the right from plate 349 and through a cut out in the edge of plate 346. Pin 350 has spring connection with a pin 351 extending from the right of plate 346. Control plate 349 is therefore spring biased counterclockwise (Fig. 30) with respect to plate 346 which comprises the driven member of the clutch.

Extending toward the right from the edge of plate 349 and through a second cut out in the edge of plate 346 is a lug 349a. Means, described below, is adapted normally to hold plate 349 clockwise with respect to plate 346 against the tension of its spring connection. When plate 349 is in normal clockwise position, lug 349a will engage a shoulder at the underside (Fig. 30) of pawl 348 thereby preventing said pawl from moving counterclockwise and engaging the internal teeth of driving member 343. However, when control plate 349 is released, it will be moved counterclockwise with respect to plate 346 by its spring connection. This counterclockwise movement of plate 349 will remove lug 349a from engagement with the shoulder of pawl 348. As a result, pawl 348 will be moved to engage the teeth of driving drum 343 thereby engaging the clutch.

The means for normally restraining control plate 349 and thereby maintaining clutch 337 disengaged comprises a lug 336a of link 336. Link 336, as will be recalled, is moved forwardly by common multiplier key slide 330 (Figs. 28, 29) upon depression of any one of the multiplier keys 265. At its rear, link 336 is slidably supported on sleeve 347 which passes through a slot in said link. Lug 336a extends toward the right and normally is engaged by a shoulder 349b at the forward edge of plate 349. Plate 349 is therefore normally restrained in clockwise position thereby engaging pawl 348 to hold clutch 337 disengaged. However, upon forward movement of link 336, as an incident to depression of a multiplier key 265, lug 336a will be removed from engagement with shoulder 349b and plate 349 will be spring moved counterclockwise to release pawl 348 to engage the clutch.

When clutch 337 is engaged, the driven member comprising plate 346 and sleeve 347 to which it is keyed will be driven counterclockwise by driving member 343. During this rotation, control plate 349 will be likewise driven through its spring connection with plate 346. If the depressed multiplier key 265 is released before the clutch completes its cycle of operation, slide 330 and link 336 will be spring moved toward the rear. This will engage lug 336a with the periphery of plate 349 and therefore as the clutch approaches full cycle position link 336 will be permitted further rearward movement to engage its lug 336a with shoulder 349b. Plate 349 will therefore be blocked from further rotation. However, pawl 348 will still be engaged with the teeth of driving member 343. As a result, plate 346 will be rotated further counterclockwise which movement is permitted by the yield of its spring connection with restrained plate 349. This further rotation of plate 346 will bring the shoulder of pawl 348 into engagement with stationary lug 349a of plate 349 to rock said pawl clockwise (Fig. 30) from engagement with the teeth of driving member 343.

Means is provided to prevent plural cycle operation of setting clutch 337 if a multiplier key 265 is held depressed thereby holding slide 336 in forward position. This means comprises a lug 336b extending toward the right from the rear of link 336 and which is adapted for operation in connection with a lug 349c of plate 349. When the parts are in normal position, lug 336b is located clockwise (Figs. 5, 30) with respect to lug 349c and to the rear out of the rotary path of movement thereof. When link 336 is moved forwardly upon depression of the multiplier key 265, lug 336b will be brought into the path of rotation of lug 349c. Just before plate 349 reaches the position wherein shoulder 349b would be engaged by lug 336a if link 336 were retracted, lug 349c will engage lug 336b thereby blocking rotation of plate 349 and disengaging the clutch. Upon release of the multiplier key, lug 336b will release plate 349. The clutch will therefore be given a small step of movement and then be disengaged by operation of lug 336a and shoulder 349b. The above described clutch 337 is of the general type more fully disclosed in applicant's co-pending application Serial No. 496,642.

It will be observed that when setting clutch 337 is disengaged in full cycle position, link 336 and slide 330 will be fully retracted and the depressed multiplier key 265 will be released. A second multiplier key may therefore be immediately depressed to engage clutch 337 for another cycle of operation. However, at this time, the product registering operation of the machine which will have been initiated in response to the previous operation of the setting clutch will not be completed. For this reason, as hereafter described, the clutch will be engaged for only a short step of movement and thus its operation interrupted until completion of the registering operation.

MULTIPLICATION (THE STORAGE MAGAZINE)

The operations performed by setting clutch 337 (Figs. 5, 6, 30) include the setting of machine operation control slides of a storage magazine or drum indicated generally by the reference numeral 355 (Figs. 4, 5, 6, 31, 32, 34). This operation of the setting clutch is controlled in accordance with the digital value of the depressed multiplier key 265 as later described.

Storage magazine 355 comprises a hub 356 keyed on a shaft 357 which is journalled at one end in the machine right side frame. Shaft 357 extends outwardly from the right side frame and is journalled at its outer end and intermediate its ends respectively in plates 352 and 353 (Figs. 4, 31, 32) of a sub-framing between which hub 356 is located. Force fitted to the respective ends of hub 356 are inner and outer plates 358 and 359 of like diameter. Extending between plates 358 and 359 and radially disposed are five slide groupings each comprising three longitudinally settable slides as best seen in Fig. 34. As later described, magazine 355 is stepped clockwise to bring set slides successively into operating position. Various combinations of set slides and different numbers of clockwise steps of magazine 355 are utilized in control of the machine operations in response to depression of the different digit value multiplier keys 265.

Each slide grouping comprises a cycle stopping control slide 360 and a pair of dual purpose slides 361 and 362 which may be termed registration and shift control slides. Slide 360 of each grouping controls means for terminating operation of digital acutator racks 80 (Fig. 1) at the end of a predetermined number of cycles of operation. Slide 361 controls means which provides for an idle stroke of the actuator racks during the last half of a predetermined cycle of operation. Also slide 361 may control operation of the pin carriage shifting mechanism (Fig. 10). And slide 362 controls means which provides for an additive stroke of the actuator racks during the first half of a predetermined cycle of operation regardless of an initial setting for subtractive operation. This slide 362 also may control operation of the carriage shifting mechanism.

Slides 360 are angularly spaced at 72° and the two slides 361 and 362 of each grouping are spaced 18° clockwise and counterclockwise respectively from slide 360 of the group. Thus each slide grouping extends 36° and is spaced 36° from the slide grouping at either side. Slides 360, 361 and 362, when in normal unset position, are located inwardly toward sub-frame plate 353. Means, later described, is selectively operable to set the slides outwardly to their active positions. A friction plate 363 (Fig. 33) resiliently bears against the side of each of the slides and holds it in either adjusted position.

Means driven by the machine main drive is operable to step magazine 355 clockwise (Figs. 5, 6) in timed relation with the actuator rack drive means. Two steps of movement of magazine 355 is effected during each cycle of operation of the actuator rack drive. The first step of movement is effected during the mid-cycle dwell of the actuator drive and the second step is effected during the terminal dwell. Each of the two steps is 36°; and therefore during each cycle, the 72° of clockwise rotation will bring the slide groupings (360, 361, 362) successively to the same relative position with respect to control means cooperatively associated therewith as later described.

The drive means for magazine 355 comprises positive action cam elements 364—365 (Figs. 5, 6, 37, 43) fast on main drive shaft 22 between the machine right side frame and main clutch 18. A cam follower comprises a lever 366 having a pair of rearwardly extending upper and lower arms on each of which is a roller engaging cam elements 364—365 respectively. Pivotally attached at its rear end to a downwardly extending arm of follower 366 is a forwardly extending rack arm 367 of a pair of integral racks comprising an upper rack 367a and an opposed lower rack 367b. Racks 367a and 367b are adapted for alternate engagement with a gear 368 (Figs. 31, 32) fast on shaft 357 of magazine 355.

Means for controlling engagement and disengagement of racks 367a and 367b comprises a follower 369 (Figs. 5, 6) of the single cam element 364. Follower 369 comprises a bell crank spring urged counterclockwise and having a rearwardly extending arm at the end of which a roller engages cam 364. The other arm of crank 369 extends downwardly and at its end has pin connection 369a with a cam slot 370a at the rear of a forwardly extending lever 370 which is fulcrumed on the machine sub-framing. At its forward end, lever 370 has pin and slot connection with arm 367 adjacent racks 367a and 367b.

When the machine is in normal full cycle position, follower 366 is in counterclockwise position (Figs. 5, 37) thereby holding rack arm 367 toward the rear. Also, follower 369 will be counterclockwise thereby locating pin 369a at the rear of cam slot 370a. This locates lever 370 also counterclockwise to lower the forward end of rack arm 367 thereby engaging rack 367a with drive gear 368 of magazine 355.

During the first part of a cycle of operation of the drive for digital actuator racks 80 (Fig. 1), cam 364 will rock follower 369 clockwise as shown in Fig. 6. This will move pin 369a to the front of cam slot 370a thereby rocking lever 370 clockwise to raise the forward end of rack arm 367. This will disengage rack 367a and engage rack 367b. To hold magazine 355 against rotation during this time, a spring urged detent 342 engages the notched periphery of plate 358 of the magazine. Also during this time and during the forward stroke of the drive means for actuator racks 80, follower 366 will dwell on cams 364 and 365 as shown in Fig. 38. However, during the mid-cycle dwell of the actuator rack drive, follower 366 will be rocked clockwise to the position shown in Fig. 39. This will move rack arm 367 toward the front of the machine and therefore rack 367b will be effective to step magazine 355 clockwise 36°.

During the first part of the return stroke of the drive means for actuator racks 80, follower 369 will be restored counterclockwise. This will reengage rack 367a and disengage rack 367b. During the return stroke, follower 366 will dwell on cams 364 and 365 and therefore racks 367a and 367b will be held toward the front of the machine. However, during the terminal dwell of the actuator rack drive, follower 366 will be restored counterclockwise as shown in Fig. 40. This will restore rack arm 367 toward the rear, and rack 367a will be effective to rotate magazine 355 the second 36° step of clockwise movement.

Each of the cycle stopping control slides 360 of magazine 355 is provided with an operating lug 360a (Figs. 31, 32, 34) extending radially outward. Lug 360a of any set slide 360 is operable in conjunction with a cycle stopping control plate 372 (Figs. 5, 6, 34) to terminate cyclic operation of the registering mechanism. Plate 372 is pivotally mounted to the rear (Fig. 31) of magazine 355 on a shaft 371 extending between sub-frame plates 352 and 353. An arm of plate 372 extends toward the front and terminates in a nose 372a which is adapted for engagement by lugs 360a of slides 360. Plate 372 is biased counterclockwise by a strong spring 354 but is normally held clockwise (Figs. 5, 37) against the tension of said spring by a latch 373 which is spring biased counterclockwise to engage a shoulder thereof with a lug 372b of said plate.

Normally lugs 360a are inwardly of the vertical plane of nose 372a of plate 372 as shown in Figs. 31, 32, and nose 372a is radially outward from the rotational path of movement of said lugs as shown in Fig. 5 and the full line position of Fig. 34. However, when a slide 360 is set outward, its lug 360a will be moved into the vertical plane of nose 372a. Then if latch 373 is released, plate 372 will be rocked counterclockwise against a suitable limit pin to locate nose 372a downwardly and in the rotational path of movement of lug 360a as shown in Fig. 6 and the dot-dash position of Fig. 34. Consequently when lug 360a is rotated to engage nose 372a, plate 372 will be restored clockwise. This will terminate cyclic operation of the machine registering mechanism at the end of the current cycle of operation. These setting and stopping operations will all be later described in detail.

With the above, briefly described operating characteristics of slides 360 in conjunction with plate 372, the arrangement provides means for terminating operation of the registering mechanism at the conclusion of one, two or three cycles of operation. For example, with reference to Fig. 34, if the first slide 360 counterclockwise from nose 372a is set, the first clockwise step of magazine 355, which occurs during the mid-cycle dwell of the first registering cycle of the actuator rack drive will move lug 360a of the set slide 360 to a position immediately adjacent nose 372a of plate 372. During the second step of the magazine, which occurs during the terminal dwell of the actuator rack drive, lug 360a will engage and pass beyond nose 372a. This will restore plate 372 and the operation of the registering mechanism will terminate at the end of the first cycle. Thus, if the second slide 360 counterclockwise from nose 372a is set, the operation will terminate at the end of the second cycle; and if the third slide 360 is set, the operation will terminate at the end of the third cycle.

There is a maximum of three cycles of operation of the drive means for actuator racks 80 in response to depression of a multiplier key 265. This occurs, as later described, in response to depression of the 5, 6 or 7 multiplier digit keys 265.

Each of the five slides 360 may be in any one of five angular positions before initiation of operation of the actuator rack drive means. This is because magazine 355 is stepped clockwise in timed relation with the drive means and is not restored to a home position upon termination of operation of said drive. The particular slides 360 which, prior to operation of the actuator drive, are in position to be set to terminate subsequent operations of the actuator drive at the end of the first, second or third cycle respectively, are hereafter referred to as the first, second and third cycle stopping slides as indicated by the legends of Fig. 34.

Registration and shift control slides 361 and 362 (Figs. 31, 32, 33) are of like construction and each is provided with an operating lug 361a and 362a extending radially outward. Lug 361a or 362a of any set slide 361 or 362 is operable in conjunction with registration control plate 375 (Figs. 5, 6, 34). Plate 375 has common pivotal mounting on shaft 371 with cycle stopping plate 372 and inwardly thereof. An arm of plate 375 extends toward the front and terminates in a nose 375a which is adapted for engagement by lugs 361a and 362a of slides 361 and 362.

Plate 375 is normally in spring biased counterclockwise position against a suitable limit stop and nose 375a is radially inward with respect to the rotational path of movement of lugs 361a and 362a. Nevertheless, when slides 361 and 362 are in inward normal unset position (Figs. 31 and 32), lugs 361a and 362a are inward of the vertical plane of nose 375a, and said nose is therefore out of the path of movement of said lugs. However, when a slide 361 or 362 is set outwardly, its lug 361a or 362a is positioned so that nose 375a is in its path of movement. When lug 361a or 362a is rotated to engage nose 375a, plate 375 will be rocked clockwise. If this rocking operation is effected by a lug 361a, it will occur during the mid-cycle dwell of the drive for actuator racks 80. As a result, the following last half of the current cycle of operation of the actuator racks will be idle or ineffective. If this rocking operation is effected by a lug 362a, it will occur during the terminal dwell of the drive for racks 80. As a result, the following first half of the next cycle of operation of the actuator racks will be additive regardless of an initial setting for subtractive operation. These setting and control operations will all be described later in detail.

The above briefly described operational characteristics of slides 361 in conjunction with plate 375, provide means for effecting an idle stroke of actuator racks 80 during the last half of a first, a second, or a third cycle of operation. For example, with reference to Fig. 34, if the first slide 361 counterclockwise from nose 375a is set, its lug 361a will be immediately adjacent nose 375a. During the first clockwise step of magazine 355, which occurs during the mid-cycle dwell of the actuator rack drive, lug 361a will engage and pass beyond nose 375a. This will rock plate 375 clockwise and therefore the operation of actuator racks 80 will be idle during the following half cycle. Thus, if the second slide 361 counterclockwise from nose 375a is set, the operation of the second half of the second registering cycle will be idle; and if the third slide 361 is set, the operation of the second half of the third cycle will be idle. The particular slides 361 which, prior to operation of the actuator rack drive, are in position to be set to provide for an idle actuator stroke during the subsequent first, second or third cycles respectively, are hereafter referred to as the first, second and third cycle idle stroke slides as indicated by the legends of Fig. 34.

The afore-noted and briefly described operating characteristics of slides 362 in conjunction with plate 375 provide means for effecting an additive stroke of actuator racks 80 during the first half and an idle stroke during the second half of a second or a third cycle of operation. For example, with reference to Fig. 34, if the first slide 362 counterclockwise from nose 375a is set, the first clockwise step of magazine 355, which occurs during the mid-cycle dwell of the first cycle of the actuator rack drive, will move lug 362a of the set slide immediately adjacent nose 375a of plate 375. During the second step of magazine 355, which occurs during the terminal dwell of said first cycle of the actuator rack drive, lug 362a will engage and pass beyond nose 375a. This will rock plate 375 clockwise and therefore the operation of actuator racks 80 will be additive during the following first half of the second cycle of the actuator rack drive and idle during the second half. Thus, if the second slide 362 counterclockwise from nose 375a is set, the operation of the first half of the third registering cycle will be additive and the second half idle.

The particular slides 362 which, prior to operation of the actuator rack drive, are in position to be set to provide for an additive actuator stroke during the subsequent second and third cycle respectively, are hereafter referred to as the second and third cycle add and idle stroke slides as indicated by the legends of Fig. 34.

As noted before, registration control slides 361 and 362 may be set to control escapement of pin carriage 2 toward the left. This operation is performed by a lug 361b or 362b (Figs. 31, 33) of a set slide 361 or 362 which is operable to rock and then release a bell crank 376 (Figs. 5, 6, 34). Bell crank 376 is normally spring biased to clockwise position. As later described, when crank 376 is rocked and released, escapement 40 (Fig. 10) is also rocked and released. When escapement 40 is released, it will be restored and pin carriage 2 will escape one ordinal position to the left as previously described.

A leftwardly extending arm of bell crank 376 is in a vertical plane, adjacent outer plate 359 of magazine 355. Lugs 361b and 362b are at the outer ends of the respective slides 361, 362 and are normally inward of the plane of the arm of crank 376. However, when a slide 361 or 362 is set outwardly the arm of crank 376 will be in the rotary path of movement of the respective lug 361b or 362b.

If the first slide 361 counterclockwise (Fig. 34) from the arm of crank 376 is set, its lug 361b will engage and rock and hold crank 376 counterclockwise during the first clockwise step of magazine 355 which occurs during the mid-cycle dwell of the first cycle of operation of the drive of actuator racks 80. During the step of movement of magazine 355 which occurs during the terminal dwell of the drive, lug 361b will release crank 376. Therefore, pin carriage 2 will be shifted one ordinal step to the left as the first registering cycle is completed. Thus, if the second slide 361 counterclockwise from the arm of crank 376 is set, the carriage will be shifted as the second registering cycle is completed.

The third slide 361 counterclockwise from crank 376 cannot be set to provide for shift of pin carriage 2 as the third registering cycle is completed. This will be evident from an inspection of Fig. 34, wherein it will be seen that if the third slide 361 were set, a misoperation in connection with registration control plate 375 would first be effected. Therefore, to provide for shift of carriage 2 in connection with a third registering cycle, the second slide 362 counterclockwise from crank 376 is set. Lug 362b of this slide will engage and rock and hold crank 376 during the terminal dwell of the second cycle. However, the crank will not be released until the mid-cycle dwell of the third cycle; and therefore at this time the carriage will be shifted. This operation may be effected at this time as actuator racks will have completed their forward excursions under control of pin carriage 2 and stop arms 84 (Fig. 1) for actuator racks 80 will have been lowered from engagement with set pins 50 of the carriage.

The particular slides 361 which, prior to operation of the actuator rack drive, are in position to be set to provide for a step shift of carriage 2 near the end of the subsequent first or second cycle respectively are hereafter referred to as the first and second cycle shift slides; and the particular slide 362 which is in position to be set to provide for a step shift during mid-cycle of the third cycle is referred to as the third cycle shift slide as indicated by the legends of Fig. 34.

Set slides 360, 361, 362 must be restored after they have performed their functions. A cam lug 441 extends inwardly from sub-frame plate 352 adjacent the outer face of magazine 355 as indicated by the dot-dash lines of Fig. 34. Lug 441 is located clockwise from nose 372a of cycle stopping plate 372 and is in the rotary path of the outwardly projecting end of any slide 360 which may be set. After a set slide 360 has performed its function in connection with nose 372a, its end will engage cam lug 441 which will restore said slide inwardly. A similar cam lug 442 is located clockwise from nose 375a of plate 375 and performs a like restoring operation for registration control slides 361 and 362. Also a cam lug 443 is located clockwise from shift crank 376 and performs a like restoring function for shift slides 361 and 362.

SETTING THE MULTIPLIER STORAGE MAGAZINE

Means for setting the first, second and third cycle stopping slides 360 of magazine 355 (Figs. 5, 6, 34, 35) comprises respectively setting arms $377^1$, $377^2$, and $377^3$. Means for setting the first, second and third cycle idle stroke slides 361 comprises respectively setting arms $378^1$, $378^2$ and $378^3$. Means for setting the second and third cycle add stroke slides 362 comprises respectively setting arms $379^2$ and $379^3$. And means for setting the first and second cycle shift slides 361, and the third cycle shift slides 362 comprises respectively setting arms $380^1$, $380^2$ and $380^3$. The setting arms are of similar construction and have pivotal mounting one above the other on a vertical shaft 381 forwardly of magazine 355. Shaft 381 is supported at its ends by a bracket 382 which is fixed to plate 353 of the machine sub-framing inwardly of magazine 355.

Setting arms $377^1$—$380^3$ extend toward the rear (Figs. 5, 6, 10, 31, 34) and their free ends each terminate in a finger normally positioned inwardly of the inner ends of the respective slides 360—362 which they are operable to set. Each of the arms is supported adjacent its rear end by a lug evtending from its inner edge and engaging a guide slot in plate 353 of the sub-framing. Normally the arms are spring held counterclockwise with their rear edges engaging the outer face of plate 353.

Means for selectively operating predetermined combinations of arms $377^1$—$380^3$, in response to depression of the respective multiplier keys 265, comprises a vertically disposed setting blade 385 (Figs. 34, 35, 36) having an operating edge positioned inwardly of said arms. Blade 385 is pivotally mounted intermediate its ends at the lower end of a depending arm 386 which, at its upper end, is fixed to the underside of an index slide 387. Index slide 387 is slidably and rockably mounted, below the ends of the stems of multiplier keys 265, on a fixed shaft 388 which passes through a pair of downwardly turned ears at the ends of said slide and which extends from adjacent the front toward the rear of the machine. An actuating slide 389 for index slide 387 is also slidably and rockably mounted on shaft 388 which passes through a pair of ears at the ends of said actuating slide.

Means is provided to connect slides 387, 389 for simultaneous longitudinal movement on shaft 388. To connect said slides, a spring 390 is attached to the front of slide 387 and at the rear of slide 389 and urges said slides longitudinally on shaft 388 with respect to each other. This will normally engage the rear faces of the ears of slide 387 with the front faces of the respective ears of slide 389 and thus the slides are adapted for simultaneous longitudinal movement.

Slide 389 is disposed 90° clockwise (Figs. 35, 36) with respect to slide 387. Means is provided to maintain this angular relationship and yet permit relative longitudinal movement of the slides by the yield of spring 390. To this end, a lug 386a extends to the right from arm 386 and normally engages the rear end of a forwardly extending slot 389a in actuating slide 389.

As hereafter described, setting clutch 337, during each cycle of operation, is operable to move slide 389 toward the rear and restore it. Means is provided to rock slide 389 counterclockwise (Figs. 35, 36) near the end of this rearward movement and to restore it clockwise near the beginning of its return movement. Extending to the left from the front ear of slide 389 is a lug 389b which engages the forward end of a rearwardly extending cam slot 391a in a plate 391. Plate 391 is secured to the inner face of sub-frame plate 353 and an opening in the sub-frame plate of greater corresponding dimensions than cam slot 391a permits entry of lug 389b in said cam slot.

As best seen in Fig. 36, cam slot 391a, for its greater length from front to rear, comprises a dwell parallel to shaft 388. Near its rear end, the cam slot has a drop and then a short dwell. Therefore, if slide 389 is moved to the rear on shaft 388, lug 389b will engage the drop of cam slot 391a. Thus slide 389, slide 387, arm 386 and blade 385 for setting arms 378¹—380³ will be rocked counterclockwise, and then restored clockwise near the beginning of the return movement toward the front of the machine.

Means for moving slide 389 by setting clutch 337 includes a link 392 (Figs. 5, 6) which extends toward the rear and which at its front end is attached to the rear end of slide 389. At its rear end, link 392 is attached to the lower arm of an upstanding lever 393 which is loosely fulcrumed on shaft 237. Extending toward the rear from the upper arm of lever 393 is a link 394 which, at its rear end is attached to the outer face of a crank disc 395 which is rotatably mounted on a stud shaft extending outwardly from the machine right side frame. Disc 395 is connected by a hub with a gear 396 (Fig. 40) which is driven at a one to one ratio by a gear 397 which is keyed on sleeve 347 comprising the driven member of setting clutch 337.

When clutch 337 is in normal disengaged position, the point of attachment of link 394 to disc 395 is to the rear of the disc center (Fig. 5). Therefore crank 393 is normally held clockwise thereby locating link 392 and actuating slide 389 in normal forward position. During the first half of a cycle of clutch 337, operating slide 389 will be moved to the rear (Fig. 6) and rocked counterclockwise, and during the second half of the cycle said slide will be restored. At any time during the rearward excursion of actuating slide 389, the yieldable spring connection 390 and guide slot 389a will permit index slide 387 to be restrained from such movement therewith. Regardless, however, the rocking movement of slide 389 will be transmitted to arm 386 and blade 385 through lug 386a engaging guide slot 389a.

The stem of the particular depressed multiplier key 265 is operable to arrest index slide 387 in a predetermined position upon rearward movement with actuating slide 389 after which slide 389 will complete its rearward excursion. Extending to the right from the right edge of index slide 387 are lugs 387a, 387b and 387c. When the 0, 1 or 9 multiplier key 265 is depressed, the end of its key stem will be lowered into the path of rearward movement of lug 387a as best seen in Fig. 34. When the 2, 8, 3 or 7 multiplier key is depressed, the end of its stem will be lowered into the path of rearward movement of lug 387b. And when the 4, 6 or 5 multiplier key is depressed, the end of its stem will be lowered into the path of rearward movement of lug 387c. Consequently upon rearward movement of actuating slide 389, one of the lugs 387a, 387b or 387c of index slide 387 will engage the stem of a depressed multiplier key 265. This engagement will arrest index slide 387 from further rearward movement with actuating slide 389 which then will complete its rearward movement with the attendant rocking operation effected by the drop of cam slot 391a. In Fig. 6, slide 387 is shown arrested in its rearward excursion by the stem of 9 digit multiplier key.

Lugs 387a, 387b and 387c are initially positioned with respect to the stems of multiplier key 265 so that index slide 387 will be arrested from rearward movement in one of ten positions depending on the respective one of the 0–9 multiplier keys 265 which is depressed. This operation will locate setting blade 385 in one of ten vertical planes transversely of the machine. These ten vertical planes are indicated by the dot-dash vertical lines of Fig. 34 and are the positions in which setting blade 385 is operable to set the appropriate control slides 360—362 of storage magazine 355. These planes are identified from front to rear by digital notation of the plane in which setting blade 385 is arrested in response to depression of the corresponding digital value 0–9 multiplier keys 265. It will be observed that, for mechanical design reasons, the planes are not located in digital sequence from front to rear.

Extending inwardly intermediate the ends of each setting arm 377¹—380³ is one or more lugs 383 (Figs. 31, 34, 35). In each of the vertical operating planes of blade 385 are lugs 383 of the particular setting arms 378¹—380³ which are respectively operable to set the particular control slides 360—362 which will control the machine operations for the multiplier digit corresponding to that plane. Consequently, when operating slide 389 is rocked counterclockwise after blade 385 has been arrested in one of its operating positions, said blade will likewise be rocked to engage lugs 383 which are in the plane of its operation. This will rock clockwise the particular setting arms 378¹—380³ from which lugs 383 extend, and the rocked arms will engage and set the particular slides 360—362 which are in the path of their operating ends.

Referring to the chart of Fig. 43, the 0–9 multiplier digit keys 265 are indicated in a vertical line at the left side of the chart. In a horizontal line to the right of each multiplier digit key are indicated the particular control slides 360—362 of magazine 355 which will be set upon operation of setting clutch 337 in response to depression of the key, and the sequence of operation of said slides with respect to cyclic operation of the drive for actuator racks 80. And in the line to the right of the indication of the slide setting is indicated the resulting double stroke registering operation of actuator racks 80 and the timing of the step shifting of pin carriage 2.

Attention is directed to the first vertical column of the chart of Fig. 43 in connection with the 0 digit multiplier. The control of registration is not effected solely by the slides of magazine 355; but another control member comprising, what will be termed a first cycle idle stroke arm 374, is set upon depression of the 0 multiplier key 265. This setting and control operation will be described later in detail.

Setting clutch 337, by movement of link 392 (Figs. 5, 6) which operates slide 389, in setting magazine 355, is operable to release latch 373 which normally holds cycle stopping plate 372 in clockwise inactive position (Fig. 5) against the urge of its spring.

Latch 373, as before described, comprises an upstanding arm having an undercut shoulder intermediate its ends. Normally latch 373 is spring held counterclockwise (Figs. 5, 37) to engage its shoulder with a lug 372b at the right side of plate 372 thereby holding said plate clockwise. On link 392, which operates slide 389, a pin 392a is located at the front of the upper end of latch arm 373. As link 392 is moved toward the rear by clutch 337 in the setting operation for magazine 355, pin 392a will engage and rock latch 373 clockwise thereby releasing cycle stopping plate 372 which will be rocked counterclockwise by its spring to active position (as shown in Figs. 6, 38). This operation will occur immediately upon movement of link 392 and therefore before the setting operations of magazine 355 is effected. When plate 372 is moved to active position, its nose 372a will be lowered into the rotational path of movement of lug 360a of the particular cycle stopping slide which will be set as link 392 completes its movement to operate actuating slide 389.

Figure 11:
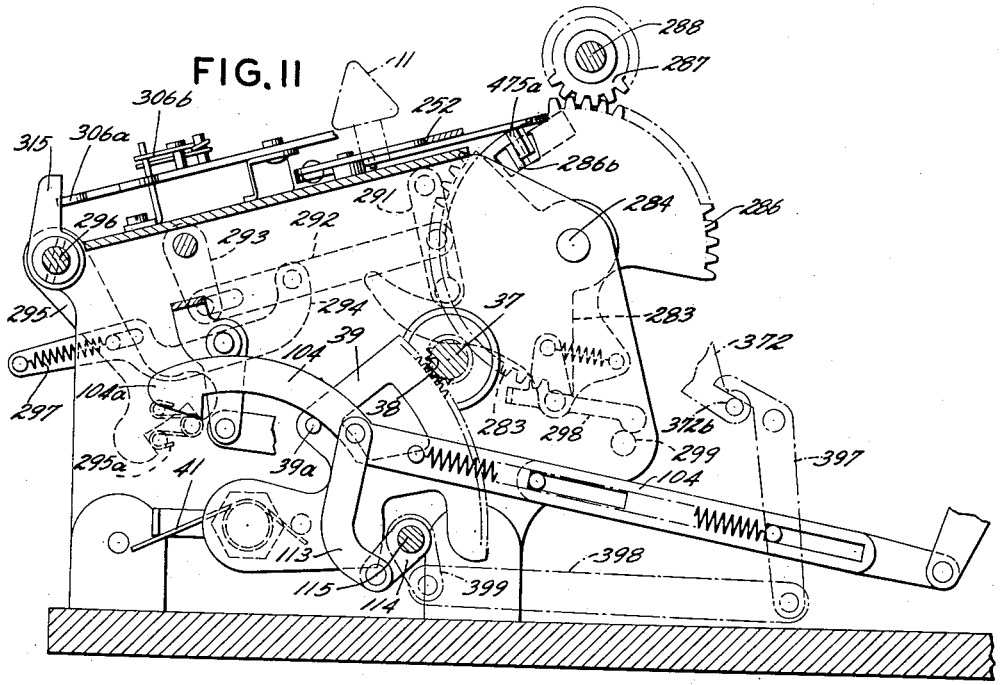
Fig. 11 is a fragmentary vertical section taken on the line 10—10 of Fig. 10.

Cycle stopping plate 372, upon counterclockwise movement to active position, disables the means which normally restores pin carriage 2 to its right end position during each machine cycle. The disabling means comprises a bell crank 397 pivotally mounted on the machine framing to the lower rear of plate 372 (Figs. 5, 6, 11). One arm of crank 397 extends forwardly and overlies a pin 372c on plate 372. The other arm of crank 397 extends downwardly and is connected to the rear end of a forwardly extending link 398. Link 398, at its front end is connected to a depending arm 399 fast on the right end of shaft 115 which extends across the machine (Figs. 10, 11). As before described, a crank 114 fast on shaft 115 is connected by link 113 to the return arm 104 for pin carriage 2.

Normally arm 104 lies on a pin 39a of gear segment 39 of the pin carriage return train. In the carriage return operation, hooked end 104a of arm 104 engages pin 39a thereby driving gear 39 clockwise to return the carriage. When plate 372 is rocked counterclockwise to active position (Fig. 6), pin 372c will rock crank 397 clockwise to move link 398 forwardly thereby rocking crank 399, shaft 115 and crank 114. This will raise link 113 and carriage return arm 104. Consequently in the carriage return movement of arm 104, its hooked end will pass ineffectively above pin 39a.

At approximately the time that cycle stopping plate 372 is released by setting clutch 337, said clutch is operable to engage main clutch 18. Plate 372, in its movement to active position, is operable to set means to prevent disengagement of main clutch 18 until the cycle wherein said plate is restored by the set cycle stopping slide 360. Furthermore, movement of the plate to active position is operable to set double stroke slide 133 (Figs. 3, 7) to active position. These setting operations, which may be approximately termed the primary set-operations, will be described in the following section in connection with the setting clutch operation to engage the main clutch.

INITIATION OF REGISTRATION AND CONCURRENT SETTING OPERATIONS

The means operable by setting clutch 337 to engage main clutch 18 comprises a horizontally disposed ram designated generally by the reference numeral 400 (Figs. 5, 6, 30). The ram comprises forward and rearward extensions which are joined by pin and slot connection to permit longitudinal relative movement. Normally, spring means holds the two extensions of ram 400 in relatively extended position to the limit imposed by the slot and pin connection. Sleeve 347 (Fig. 30) comprising a driven element of setting clutch 337 passes through a longitudinal slot adjacent the rear of ram 400. Thus the ram is slidably supported at its rear. A slot at the front of ram 400, is engaged by a pin at the end of a rearwardly extending arm of a bell crank 401 which is mounted on sub-frame plate 353. Thus the front end of ram 400 is slidably supported. The details of this structure are best seen in Figs. 37–42.

The other arm of bell crank 401 extends upwardly and is connected to the rear of a link 402 which at its front is attached to the rear of short-cut slide 332 (Figs. 28, 29). A spring 403 is attached at one end adjacent the front of ram 400 and extends downwardly and toward the rear. Consequently, the ram is normally held to the rear with its front in downward counterclockwise position (Figs. 5, 37). Bell crank 401 therefore will be held clockwise with connected link 402 and short cut slide 332 to the rear.

A cam 404 (Fig. 30) is fast on sleeve 347 of clutch 337 adjacent the inner face of ram 400. A pin 405 on the inner face of ram 400 normally is engaged by the low dwell of cam 404. Immediately upon operation of clutch 337, a rise of cam 404 will engage pin 405 and at about 70° of operation of the clutch the high dwell will engage the pin. The high dwell is of short duration and terminates in a drop to the low dwell. Ram 400, therefore, will be moved forwardly and restored by spring 403 during the first part of each cycle of setting clutch 337. Substantially at the same time that ram 400 is operated by the setting clutch, the previously described operation of the setting clutch is effected to release cycle stopping plate 372 for counterclockwise setting by its spring.

Ram 400, in its forward movement, upon operation of clutch 337 in response to 0–5 digit multiplier keys 265, is operable to rock clutch control yoke 28 counterclockwise (Fig. 7) to its additive position thereby engaging main clutch 18 and adjusting single stroke sign control slide 120 to the left to its additive position. In response to depression of 6–9 digit multiplier keys the ram is operable to rock yoke 28 clockwise to its subtractive position thereby engaging the main clutch and adjusting slide 120 to the right to its subtractive position. This latter operation provides for the short-cut multiplying operation.

It will be noted that main clutch 18 is engaged by the setting clutch operation of ram 400 before said setting clutch has been effective to complete the slide settings for magazine 355 which will control the subsequent main clutch operation. However, magazine 355 is not effective in its control operations until the midcycle dwell of the main clutch drive of actuator racks 80 and at this time the setting clutch will have completed the magazine setting operations.

To achieve the above operations, the front end of ram 400 is provided with an add finger 400a and a subtract finger 400s (Figs. 5, 6, 37, 43). The two fingers are equally spaced above and below the longitudinal axis of ram 400; add finger 400a being below and subtract finger 400s being above. To the front of fingers 400a and 400s, is a vertically disposed rocker 406 which has common pivotal mounting with bell crank 401. Rocker 406 has a lower add nose 406a adapted to be engaged by add finger 400a of the ram, and an upper subtract nose 406s adapted to be engaged by subtract finger 400s. Extending upwardly from rocker 406 is an extension 406b which engages the forked end of an outwardly extending arm 28c of yoke 28 (Fig. 7).

When the parts are in normal position (Figs. 5, 37), add nose 406a of rocker 406 is in the forward path of movement of finger 400a when ram 400 is operated. However, nose 406a is above the path of movement of finger 400s of the ram. When clutch 337 is engaged upon depression of one of the 0–5 multiplier keys 265, ram 400 remains in its normal adjusted position with respect to rocker 406. Therefore, upon forward movement of the ram, finger 400a will engage nose 406a and rock rocker 406 clockwise. Consequently, extension 406b of the rocker will rock yoke 28 counterclockwise to additive position as shown in Figs. 41 and 42.

Upon depression of any one of the 6–9 multiplier keys 265, to engage setting clutch 337, the lower end of its stem will engage a cam edge of short-cut slide 332 (Figs. 28 and 29). This will move the short cut slide 332 and connected link 402 forwardly. Link 402 will therefore rock the connected bell crank 401 counterclockwise as shown in (Fig. 6). This will raise the front of ram 400 so that the path of movement of its add finger 400a will be above add nose 406a of rocker 406 and subtract nose 406s will be in the path of movement of subtract finger 400s. Consequently upon forward movement of the ram, finger 400s will engage nose 406s and rocker 406 will be rocked counterclockwise to the position shown in Figs. 6 and 38. Extension 406b will therefore rock yoke 28 clockwise to its subtract position.

A latch 408 is operable to prevent yoke 28 from being restored to cause disengagement of main clutch 18 until the end of a cycle of operation during which cycle stopping plate 372 is restored by a set cycle stopping slide 360 of magazine 355. Latch 408 is set upon counter clockwise movement of plate 372 when said plate is released by operation of setting clutch 337.

Latch 408 comprises a horizontally disposed lever fulcrumed on sub-frame plate 353 to the upper rear of cycle stopping plate 372 and spring urged clockwise. Extending inwardly from plate 372 adjacent its upper edge is a pin 372p which overlies and engages the upper edge of the forwardly extending arm of latch lever 408. Thus when plate 372 is latched in normal clockwise position (Figs. 5, 37), pin 372p will hold latch 408 counterclockwise against the tension of its spring.

The rear end of latch lever 408 comprises a nose 408a which when said lever is held counterclockwise is directly above the end of extension 406b of rocker 406. However, when plate 372 is released and rocked counterclockwise as an incident to operation of setting clutch 337, pin 372p will be raised from the front arm of latch lever 408. Lever 408 will be released and rocked clockwise by its spring. At the time latch lever 408 is rocked, rocker 406 will be rocked in one direction or the other by clutch 337 in its operation of ram 400 to engage main clutch 18. Nose 408a therefore will be lowered to the front or to the rear of extension 406b of rocker 406. Therefore when clutch 18 approaches full cycle position, yoke 28 will be prevented from movement to clutch disengaging position unless cycle stopping plate 372 and latch lever 408 have been restored.

Double stroke sign control slide 133 (Figs. 3, 7) is set by cycle stopping plate 372 through a rearwardly extending link 410 which, at its front, is connected to said plate 372 by pin 372p. At its rear, link 410 has pin and slot connection with the end of an upstanding arm 411 fast on shaft 237. Shaft 237 is normally held clockwise by a relatively weak spring 237a and, as previously described, is rocked counterclockwise to couple double stroke slide 133 to single stroke slide 120. Upon counterclockwise movement of plate 372, link 410 will be moved forwardly thereby rocking arm 410 and shaft 237 counterclockwise. This operation is permitted by the relatively weak restore spring 237a of shaft 237, which is overcome by spring 354 of plate 372. When this coupling operation is effected, slide 133 will be adjusted for registration sign control in accordance with the adjustment of slide 120, and when coupled will be adjusted therewith. The pin and slot connection at the rear of link 410 with arm 411 permits adjustment of shaft 237 independently of plate 372 and link 410 in machine operations not concerned with the present disclosure.

Counterclockwise movement of cycle stopping plate 372 is operable to set means which will permit depression of a second multiplier key 265 and engagement of setting clutch 337 for a second cycle of operation before product registration in response to depression of a first multiplier key is completed. The front end of a rearwardly extending link 412 (Figs. 5, 6) has common pivotal mounting with link 410 on plate 372. The rear end of link 412 has a longitudinal slot which is engaged by a pin at the end of a depending arm of a bell crank 415 pivotally mounted on shaft 237. A spring attached on link 412 forwardly of its slot is connected to the pin of bell crank 415 to provide a yieldable connection. The second arm of bell crank 415 extends to the rear and terminates in a nose 415a normally above the path of movement (Fig. 5) of lug 349c of control plate 349 of setting clutch 337.

Upon counterclockwise movement of plate 372 when clutch 337 is operated in response to depression of a first multiplier key 265, link 412 will be moved forwardly thereby rocking crank 415 clockwise and lowering nose 415a into the path of rotation of lug 349c of control plate 349 of clutch 337. However, at this time, lug 349c will have rotated counterclockwise beyond nose 415a and clutch 337 will complete its cycle of operation. Now if a second multiplier key 265 is depressed before plate 372 has been restored to terminate registration in response to depression of the first multiplier key, clutch 337 will be engaged but will be interrupted in its second cycle of operation, after a step of movement, by engagement of lug 349c with nose 415a of crank 415. Further details of this operation and reengagement of the clutch to complete the second cycle will be later described.

REGISTERING AND CARRIAGE SHIFTING OPERATIONS (THE 1–5 DIGIT MULTIPLIER KEYS)

Reference is made to the chart of Fig. 43 which indicates the slides 360, 361 and 362 of magazine 355 which are set in response to depression of the respective digit multiplier keys 265 to control the registering operations of actuator racks 80 and shifting of pin carriage 2. The operations effected under control of the magazine slide settings for the 1 digit multiplier key will first be described.

A single cycle of actuator racks 80 (Fig. 1) during which only one of the strokes of the cycle will be effective is operable for registration in response to depression of the 1 digit multiplier key. Therefore the double stroke operation of actuator racks 80 must be disabled for one of the strokes of the cycle. To provide for this operation, the first cycle idle stroke slide 361 is set. Operation of the actuator rack drive will be terminated at the conclusion of the first cycle. Therefore, the first cycle stopping slide 360 is set. And pin carriage 2 will be shifted one ordinal position to the left after controlling the excursions of actuator racks 80. Therefore, first cycle shift slide 361 is set. The above operations will be controlled by the set magazine slides as follows:

Plate 375 is normally held counterclockwise (Figs. 5, 6, 34, 37, 38, 41) by a spring 384 against a suitable limit stop, and its nose 375a will be in the path of rotation of lug 361a of the set first cycle registration control slide 361. An arm extends upwardly toward the rear from plate 375, and in its lower edge adjacent its free end is a cam slot 375b in the form of an inverted V. A vertically disposed lever 416 is fulcrumed intermediate its ends on a floating pivot comprising a pin 417 at the lower end of a depending swinging arm 418 which at its upper end is pivotally mounted on sub frame 353.

The upper end of lever 416 terminates in a finger which engages a slot at the end of the right arm (Fig. 7) of bell crank 139. Bell crank 139, as before described, is yieldably connected by centralizing means, with respect to yoke 28 and is operable to adjust single stroke sign control slide 120 and double stroke slide 133 connected therewith. At the lower end of lever 416 is a vertical cam slot 416a which is engaged by a pin 366a at the end of an arm which extends forwardly from cam follower 366. When the machine is in normal full cycle position (Figs. 5, 37), cam follower 366 is in counterclockwise position. This will position pin 366a at the lower end of slot 416a of lever 416. With the upper end of lever 416 located by crank 139 and its lower end located by pin 366a of follower 366, floating pivot pin 417 will be normally located at the open end of cam slot 375b of plate 375. Follower 366 is rocked clockwise (Fig. 39) during the midcycle dwell of the actuator rack drive means to step magazine 355, and is restored counterclockwise (Fig. 40) during the terminal dwell of the drive to step magazine 355 a second time. This will move pin 366a from the bottom to the top of slot 416a and back to the bottom.

When fulcrum pin 417 of lever 416 is in its normal floating state, swinging movement of the lower end of said lever, attendant movement of pin 366a in slot 416a, obviously will have no effect on the position of its upper end which will be located by yieldable crank 139 in accordance with the setting of yoke 28. Consequently, the lower end of lever 416 will be swung with its upper end as a pivot. However if plate 375 is rocked clockwise to bring the apex of the inverted V cam slot 375b into engagement with fulcrum pin 417 (Figs. 39, 40, 42), said pin will be arrested from movement and become a fixed fulcrum for lever 416.

With pin 417 held as a fixed fulcrum by cam slot 375b and with pin 366a of follower 366 in normal position at the lower end of cam slot 416a (Fig. 40), lever 416 will be located clockwise from a central idle stroke control position to an additive registration control position. This will locate bell crank 139 counterclockwise from the position shown in Fig. 7 to locate slides 120 and 133 to add position. With pin 417 as a fixed fulcrum and with pin 366a raised to the top of cam slot 416a, lever 416 will be located in said central idle stroke position (Figs. 39, 42). This will locate bell crank 139 to the central position shown in Fig. 7 whereby slides 120 and 133 will be located in idle stroke position. It is significant to note that the secondary settings of crank 139 to the above add and idle stroke positions by lever 416 is permitted by yieldable centralizing members 140 regardless of the initial primary setting of said crank by sign control yoke 28.

In response to depression of the 1 multiplier digit key 265, yoke 28 will be set counterclockwise to add position and the subsequent initial stroke of actuator racks 80 will complete the registering operation. During the mid-cycle dwell of the actuator rack drive, magazine 355 will be stepped 36° clockwise. During the stepping operation, lug 361a of the first cycle blank stroke slide 361 will engage and pass beyond nose 375a of registration control plate 375. This will rock plate 375 clockwise (Figs. 39, 40, 42). A normally collapsed toggle 420, comprising a lower and an upper link, is connected between the rearwardly extending arm of plate 375 and sub-frame 353. When plate 375 is rocked clockwise, toggle 420 is straightened and set by a spring which urges the upper toggle link clockwise past dead center. Plate 375 is therefore held in rocked position. It will be noted that cycle stopping plate 372 will have been released by operation of setting clutch 337 and pin 372 of the plate will have been moved counterclockwise from the path of movement of the upper link of toggle 420 as it is rocked clockwise to set position.

Clockwise movement of plate 375 during the mid-cycle dwell of the actuator rack drive will engage cam slot 375b with fulcrum pin 417 and fix said pin as a fulcrum for lever 416. Substantially at the same time that plate 375 is rocked, cam follower 366 will raise pin 366a in cam slot 416a of lever 416. Consequently, lever 416 will be rocked counterclockwise from add to idle stroke position thereby rocking yieldable bell crank 139 from add to idle stroke position. The return stroke of actuator racks 80 will therefore be idle. At this time, yoke 28 will remain in its add position and will not be restored until main clutch 18 completes its cycle of operation as follows.

During the clockwise step of magazine 355, which occurs during the terminal dwell of the actuator rack drive, lug 360a of the set first cycle stopping slide 360 will engage and pass beyond nose 372a of cycle stopping plate 372 which is set counterclockwise as shown in Fig. 6. This will restore plate 372 clockwise to normal position (Figs. 5, 37) where it will be reengaged and held by latch 373. Upon clockwise movement of plate 372, pin 372p thereof will reengage the front arm of latch lever 408 thereby restoring said lever counterclockwise and removing nose 408a from restraining position with respect to extension 406b of rocker 406. Therefore yoke 28 will be permitted to be restored to centralized position and main clutch 18 will be disengaged at the end of the cycle.

Certain normalizing operations are effected when plate 372 is restored. During the clockwise movement of plate 372 to restored position, pin 372p will engage the upper link of toggle 420 thereby breaking said toggle and permitting registration control plate 375 to be restored counterclockwise by its spring. Also, restoring movement of plate 372 will move link 410 to the rear thereby permitting shaft 237 to be spring rocked clockwise to normal (Fig. 7) to disconnect double stroke slide 133 from single stroke slide 129. Furthermore, restoring movement of plate 372 will release crank 397 and the disabled linkage normally operable during each machine cycle to return pin carriage will be reenabled.

Escapement 40 is rocked during the mid-cycle dwell of the actuator rack drive and released during the terminal dwell of the drive. This will escape pin carriage 2 in ordinal position to the left. During the step of magazine 355 during the mid-cycle dwell of the actuator rack drive, lug 361b of the set first cycle shift slide 361 will rock and then hold bell crank 376 counterclockwise from the positions of Figs. 5, 6, 34. The rear end of a forwardly extending slide 422 is attached to a depending arm of crank 376. Thus as the crank is rocked, slide 422 will be moved to the rear. A pin 422a at the front of slide 422 engages a cam slot 423a at the lower end of a vertical slide 423 which at its upper end has a lug 423b which overlies the right arm of leftwardly extending lever 424 which is fulcrumed to the framing at the front of the keyboard (Fig. 10). The left arm of lever 424 underlies the right arm of a second left-wardly extending lever 425, the left arm of which overlies a pin 40a at the front of escapement 40. Consequently as slide 422 is moved to the rear, pin 422a will, by engagement with cam slot 423a, move slide 423 downwardly. Lug 423b will rock lever 424 clockwise, lever 424 will rock lever 425 counterclockwise, and lever 425 will rock escapement 40 clockwise. During the step of magazine 355 during the terminal dwell of the actuator drive, lug 361b of the first cycle shift slide 361 will be rotated beyond the arm of bell crank 376 thereby releasing the train which holds escapement 40 rocked. Escapement 40 therefore will be released and restored counterclockwise to escape pin carriage 2 one ordinal step to the left.

A single cycle of actuator racks 80 during which both of the strokes of the cycle are effective is operable for registration in response to depression of the 2 digit multiplier key 265. Therefore, it is only necessary to set the first cycle stopping slide 360 and first cycle shift slide 361.

From the foregoing and with reference to Figs. 34 and 43, it will be seen that for the 3 and 5 digit multiplier keys, control slides of magazine 355 are set to perform substantially the same control operations during the second and third cycles of operation respectively of actuator racks 80 as is described in conenction with the first cycle for the 1 digit multiplier key. There is, however, an exception, later described, in connection with carriage shift control for the 5 digit multiplier key. For the 4 multiplier key, control slides of magazine 355 are set to perform the same control operations during the second cycle as is described in connection with the first cycle for the 2 digit multiplier key.

A third cycle shift slide 361 cannot be set for the 5 digit multiplier key because such a slide would be a first slide 361 counterclockwise from nose 375a of registration control plate 375. This slide 361 is the first cycle idle stroke slide and would result in a misoperation of plate 375 and, in consequence, an incorrect registering operation. To provide for the shifting operation in this instance, a third cycle shift slide 362 is set in lieu of a slide 361. This slide is the second slide 362 counterclockwise from bell crank 376. During the terminal dwell of the second cycle, lug 362b of set slide 362 will rock and then hold crank 376 counterclockwise. This will rock escapement 40 at the end of the second cycle but pin carriage 2 will not be shifted until the escapement is released. During the mid-cycle dwell of the third cycle, magazine 355 will be rotated and slide 362 will therefore release crank 376. This will release escapement 40 which will be restored thereby escaping pin carriage 2 one ordinal position to the left. This mid-cycle shift of the carriage is effected after stop arms 84, which by engagement with the set pins of carriage 2 control the forward excursions of racks 80, have completed their control operation and have been lowered from engagement with said set pins.

REGISTERING AND CARRIAGE SHIFTING (THE 6–9 DIGIT MULTIPLIER)

Product registration in response to depression of each of the 6–9 digit multiplier keys 265 is effected by subtractive registration of the products respectively of the 4–1 complemental digits times the multiplicand, each together with the addition of a value ten times the multiplicand.

This provides, in principle, a well known method of shortcut product registration.

The subtractive registration for the 6-9 digit multiplier keys is effected by the same sequence and number of effective and idle strokes of actuator racks 80 (Fig. 1) followed by an ordinal left shift of pin carriage 2, as previously described in connection with additive product registration in response to depression of the 4-1 digit multiplier keys 265 respectively. Therefore, the same registration and shift control slides 361 (Figs. 34, 43) are set for the 6-9 digit multiplier keys respectively as for the 4-1 multiplier keys, but with sign control slides 120 and 133 (Fig. 7) initially set subtractively instead of additively. However, registration will not be terminated upon completion of the subtractive registration, as in the corresponding additive product registration. But following the carriage shift, a cycle of actuator racks 80 comprising an additive and an idle stroke is effected to register the value of ten times the multiplicand. For this reason, a cycle stopping slide 360 is set to terminate registration at the conclusion of this cycle instead of the preceding cycle. Furthermore, for each of the 6 and 8 even number digit keys, an additional slide 362 must be set, as later described, to control the additive and idle operation following the carriage shift.

The multiplying operation in response to depression of the odd number 9 digit multiplier key will first be described as best illustrative of the short cut product registration.

With reference to Figs. 34 and 43, it will be seen that, for the 9 digit multiplier key, setting clutch 337 is operable to set the first cycle idle stroke slide 361 and the first cycle shift slide 361; and that these are the same two slides which are set for the 1 digit multiplier key. Furthermore, the second cycle stopping slide 360 will be set to terminate registration at the end of the second cycle. Pin carriage 2 will not be shifted after the second cycle as there is only one shift of the carriage for product registration in response to depression of each multiplier key.

Referring now to Figs. 37 through 40, Fig. 37 shows various control elements with the machine in normal full cycle position. Fig. 38 shows the parts as adjusted, upon operation of setting clutch 337, to control the first stroke of actuator racks 80. Short-cut slide 332 (Figs. 28, 29) has been adjusted forwardly upon depression of the 9 digit multiplier key. Therefore, ram 400 has rocked rocker 406 counterclockwise thereby adjusting yoke 28 (Fig. 7) and the connected parts to subtract position. Cycle stopping control plate 372 is released by latch 373 and rocked counterclockwise. With the parts so adjusted, the first stroke of actuator racks 80 will be subtractive.

During the mid-cycle dwell of the first cycle of the actuator rack drive, the parts will be operated and adjusted to the positions shown in Fig. 39. First cycle idle stroke slide 361 of magazine 355 has rocked registration control plate 375 clockwise where it is held by toggle 420. Pin 417 is therefore held, as a fixed fulcrum for sign control lever 416, by cam slot 375b. Cam follower 366 has been rocked clockwise by cams 364—365 thereby moving pin 366a to the top of slot 416a of lever 416. Lever 416 is therefore rocked clockwise from the position shown in Fig. 38 to neutral position of Fig. 39. This will adjust crank 139 and sign control slides 120 and 133 (Fig. 7) from subtractive to neutral position. This operation is permitted by the yield of centralizers 140 while yoke 28 remains in subtractive position. With the parts so adjusted the return stroke of actuator racks 80 will be idle. Furthermore, during the mid-cycle dwell, first cycle shift slide 361 will rock and then hold shift crank 376 counterclockwise.

During the terminal dwell of the first actuator cycle, magazine 355 will be stepped and first cycle shift slide 361 will release crank 376. Pin carriage 2 therefore will be shifted one ordinal position to the left. Also during the terminal dwell, follower 366 will be restored counterclockwise to the normal position shown in Fig. 40. This will rock lever 416 clockwise from the neutral position shown in Fig. 39 to the additive position shown in Fig. 40. Sign control slides 120 and 133 (Fig. 7) will therefore be adjusted to additive position although yoke 28 remains in subtractive position. Consequently, the first stroke of the second cycle of actuator racks 80 will be additive.

During the mid-cycle dwell of the second cycle, follower 366 will again be rocked to move pin 366a to the top of slot 416a. This will rock lever 416 counterclockwise from the additive position shown in Fig. 40 to the neutral position shown in Fig. 39. Therefore, the return stroke of the second cycle of actuator racks 80 will be idle.

During the terminal dwell of the actuator rack drive, second cycle stopping slide 360 will restore cycle stopping plate 372. This will release latch 408. Therefore, yoke 28 will be restored and main clutch 18 will be disengaged at the end of the cycle. When plate 372 is restored, toggle 420 will be broken to permit plate 375 to be restored, the double stroke controls will be disabled and the carriage return means re-enabled, all as previously described.

The multiplying operations in response to depression of the odd number 7 digit multiplier key will include a first cycle of actuator racks 80 during which both strokes are subtractive. Following this first cycle, the operation will be a duplicate of that described in connection with the 9 digit multiplier key. It is therefore only necessary to set the second and third cycle control slides corresponding to the first and second cycle control slides which are set for the 9 digit multiplier key. These settings are clearly indicated in Fig. 43.

The multiplying operation in response to depression of the even number 8 digit multiplier key will include a first cycle during which both strokes of actuator racks 80 are subtractive followed by carriage shift and a second additive and idle stroke cycle. It will be recalled that the first cycle for the 9 digit multiplier key comprises a subtractive and an idle stroke. To achieve this first cycle idle stroke, a slide 361 is set to release plate 375 thereby enabling lever 416 by fixedly locating fulcrum pin 417. Lever 416 which is enabled to control the first cycle idle stroke operation remains enabled and also controls the second cycle additive and idle stroke operation for the 9 digit multiplier key. From the above it will be seen that for the 8 digit multiplier key, lever 416 must remain ineffective until the completion of the two subtractive strokes of the first cycle. For this reason, the first cycle idle stroke slide 361 cannot be utilized to provide for the subsequent second cycle additive and idle stroke operation as described in connection with the 9 digit multiplier key. Therefore, the second cycle add and idle stroke slide 362 is set to provide for the second cycle additive and idle stroke operation. The second cycle add and idle stroke slide 362 operates during the terminal dwell of the first cycle of the actuator rack drive to rock plate 375 thereby fixing fulcrum pin 417 of lever 416. Therefore, the initial actuator rack stroke of the subsequent second cycle will be additive and the return stroke will be idle.

The multiplying operation in response to depression of the even number 6 digit multiplier key will include a first and a second cycle of actuator racks during which both strokes are subtractive. Following the first cycle, the operation will be a duplicate of that described in connection with the 8 digit multiplier key. It is therefore only necessary to set the second and third cycle control slides corresponding to the first and second cycle control slides which are set for the 8 digit multiplier key. These settings are clearly indicated in Fig. 43.

REGISTERING AND CARRAIGE SHIFTING (THE 0 MULTIPLIER KEY)

With respect to product registration, the obvious function of the zero multiplier key 265 is to locate pin carriage 2 one ordinal position to the left. It would appear, therefore, that it should only be necessary to operate escapement 40 upon depression of the zero multiplier key without cycling the machine. However, during the first machine cycle, the multiplicand is printed as hereafter described. For this reason, the multiplicand would be printed out of decimal alignment with respect to the multiplier and product which are printed later, if the first multiplier key depressed is the zero key and if carriage 2 were shifted without first cycling the machine. Upon depression of the zero multiplier key, means is therefore provided to effect a single cycle of the machine with both strokes of actuator racks 80 idle.

Operation of setting clutch 337 upon depression of the zero key 265 is operable to set the same slides of magazine 355 as are set for the 1 digit multiplier key. These slides are the first cycle idle stroke slide 361, first cycle stopping slide 360 to the first cycle shift slide 361 as indicated in Fig. 43. This will provide for a first cycle idle return stroke of racks 80, disengagement of main clutch 18 at the end of the first cycle, and an ordinal left shift of pin carriage 2 at the end of the cycle. Additional control means, however, is necessary to provide for an initial idle stroke of the acutator racks. This control means comprises a first cycle idle stroke arm 374 (Figs. 5, 41, 42).

Arm 374 extends toward the rear and is pivotally connected at its front to the rear of zero multiplier key slide 331 (Figs. 28, 29). Arm 374 terminates at its rear in an upstanding hook and having a front edge 374a which is inclined rearwardly from the perpendicular with respect to the upper edge 374b of said arm forwardly thereof. Normally, arm 374 is in a rearward position and lowered to rest upon a suitable limit pin in the machine framing (Fig. 5). When arm 374 is in this normal position, its upper edge 374b is lowered from engagement with fulcrum pin 417 of lever 416 and inclined edge 374a is to the rear from engagement with said pin. Furthermore, a lug 374c, at the lower edge of arm 374 is normally to the rear and above an upstanding arm of a bell crank 427 which normally is spring held clockwise.

Upon depression of zero multiplier key 265, its stem will engage a cam edge of slide 331 (Figs. 28, 29) as well as a cam edge of common multiplier slide 330. Slide 331 and arm 374 will therefore be moved toward the front of the machine. This will bring inclined edge 374a to a position adjacent but not into engagement with fulcrum pin 417. With the parts in this position, disengaged pin 417 will remain a floating fulcrum for lever 416. However, upon subsequent operation of setting clutch 337, plate 372 will be released and rocked counterclockwise. This will raise the upstanding arm of crank 427 into engagement with lug 374c to raise arm 374. When this second adjustment of arm 374 is effected, the juncture of its edges 374a and 374b will be engaged with pin 417 thereby locating said pin in a fixed position as shown in Fig. 41. With fulcrum pin 417 in this fixed position and pin 366a of follower 366 in normal lowered position in slot 416a of arm 416, said arm will be held in neutral position. Therefore, when setting clutch 337 adjusts yokes 28 to additive position to engage main clutch 18, sign control slides 122 and 133 will remain in neutral position and the initial stroke of actuator racks 80 will be idle.

At the conclusion of the setting clutch cycle, the zero key will be retracted if it has been manually released and slide 331 and arm 374 will also be retracted. Retraction of arm 374 will release fulcrum pin 417 and slides 120 and 133 will be moved from neutral toward additive setting in accordance with the setting of yoke 28 (Fig. 7). However, when this occurs, main clutch 18 will have been engaged and the actuator rack drive will have been advanced beyond the initial dwell during which time shaft 117 (Fig. 1) is stepped to adjust accumulator 13 into engagement with actuator racks 80.

During the mid-cycle dwell of the actuator rack drive, the first cycle idle stroke slide 361 will rock plate 375 clockwise to engage the V cam recess 375b with fulcrum pin 417 (Fig. 42) to provide for an idle return stroke of the actuator racks. It will be observed that fulcrum pin 417 is fixed in one position by cam recess 375b and fixed in a different position by edges 374a—374b of arm 374. Therefore, if the zero multiplier key is held depressed, means must be provided to release fulcrum pin 417 from the restraint by arm 374. To this end, a nose 375c at the lower rear edge of plate 375 is positioned above the forwardly extending arm of bell crank 427 which holds arm 374 in raised position. When plate 375 is rocked clockwise, nose 375c will rock crank 427 counterclockwise thereby moving its upstanding arm from engagement with lug 374c at the lower edge of arm 374. Arm 374 therefore will drop downward to release pin 417 as cam recess 375b engages said pin to fix it in the other position which will provide for an idle return stroke of actuator racks 80.

SEQUENTIAL MULTIPLIER KEY DEPRESSION

As soon as setting clutch 337 (Figs. 5, 5a, 6, 30) has completed a cycle of operation in response to depression of a multiplier key 265 and the key is released, common multiplier slide 330 (Figs. 28, 29) will be restored and the multiplier key will be retracted. Immediately, therefore, a second multiplier key may be depressed to re-engage setting clutch 337. At this time, however, the calculating operations initiated in response to the first setting clutch operation will not have been completed. The second operation of setting clutch 337, therefore, will be interrupted after a step of movement and its operation held in abeyance.

Means for interrupting operation of setting clutch 337, is adjusted into operative position upon movement of cycle stopping plate 372 to operative position. This operation is fully described under the section titled "Initiation of Registration and Concurrent Setting Operations." This means comprises nose 415a of crank 415 which is engaged by lug 349c of the driven member 349 of the setting clutch thereby disengaging said clutch as shown in Fig. 5a and as indicated by the dot-dash lines (Fig. 6). Disengagement of clutch 337 by nose 415a is effected after a step of movement of about 70° of the clutch. At this time, cam 404 will have been rotated by clutch 337 a distance to engage its high dwell with roller 405 of ram 400 (Fig. 5a) thereby moving and holding said ram forwardly. However, lever 393 will be only slightly rocked because the rear of connecting link 394 will be rotated from a dead center position on disc 395 driven by clutch 337. Consequently, slide 389 (Figs. 34–36) will not be operated a distance to effect the selection and subsequent setting operation for magazine 355.

Ram 400 may be moved forwardly and held by cam 404 either in the additive setting position as shown in Fig. 5a or in a subtractive setting position for rocker 406. Furthermore, at this time, rocker 406 may be set in either its subtractive position as shown in Fig. 5a or in its additive position. If rocker 406 is set in like sign position with respect to the setting movement of ram 400, finger 400a or 400s of ram 400 will be moved immediately adjacent nose 406a or 406s respectively of rocker 406. This will prevent rocker 406 from being restored when it is released by latch 408. If rocker 406 is set in unlike sign position as shown in Fig. 5a with respect to the setting movement of ram 400, finger 400a or 400s of ram 400 will engage nose 406a or 406s respectively of rocker 406. In this instance, the spring connection, which normally holds the front portion of the ram longitudinally extended with respect to the rear portion, will yield thereby spring biasing rocker 406 in the direction opposite to its setting. This will operate to set rocker 406 to its opposite effective position immediately it is released by latch 408. With ram 400 held in one of the above operated positions, the subsequent operation will be as follows:

When cycle stopping plate 372 is restored clockwise by the cycle stopping slide 360 which was set in response to the first multiplier key depression, latch 408 will release rocker 406. This operation occurs during the terminal dwell of the actuator rack drive and normally main clutch 18 would be disengaged at the end of the current cycle as previously described. However, ram 400 will either prevent rocker 406 from being restored or the spring loaded front of the ram will immediately throw rocker 406 through neutral and to its opposite setting. In either instance, clutch 18 will not be disengaged but will continue without interruption in another cycle of operation. Also, when cycle stopping plate 372 is restored, link 412 will be moved to the rear thereby rocking crank 415 counterclockwise to remove nose 415a from engagement with lug 349c. Setting clutch 337 will thus be reengaged to complete its cycle of operation thereby performing the previously described setting operations.

PRINTING THE FACTORS AND PRODUCT

(a) Outline of printing operations

Figure 4:
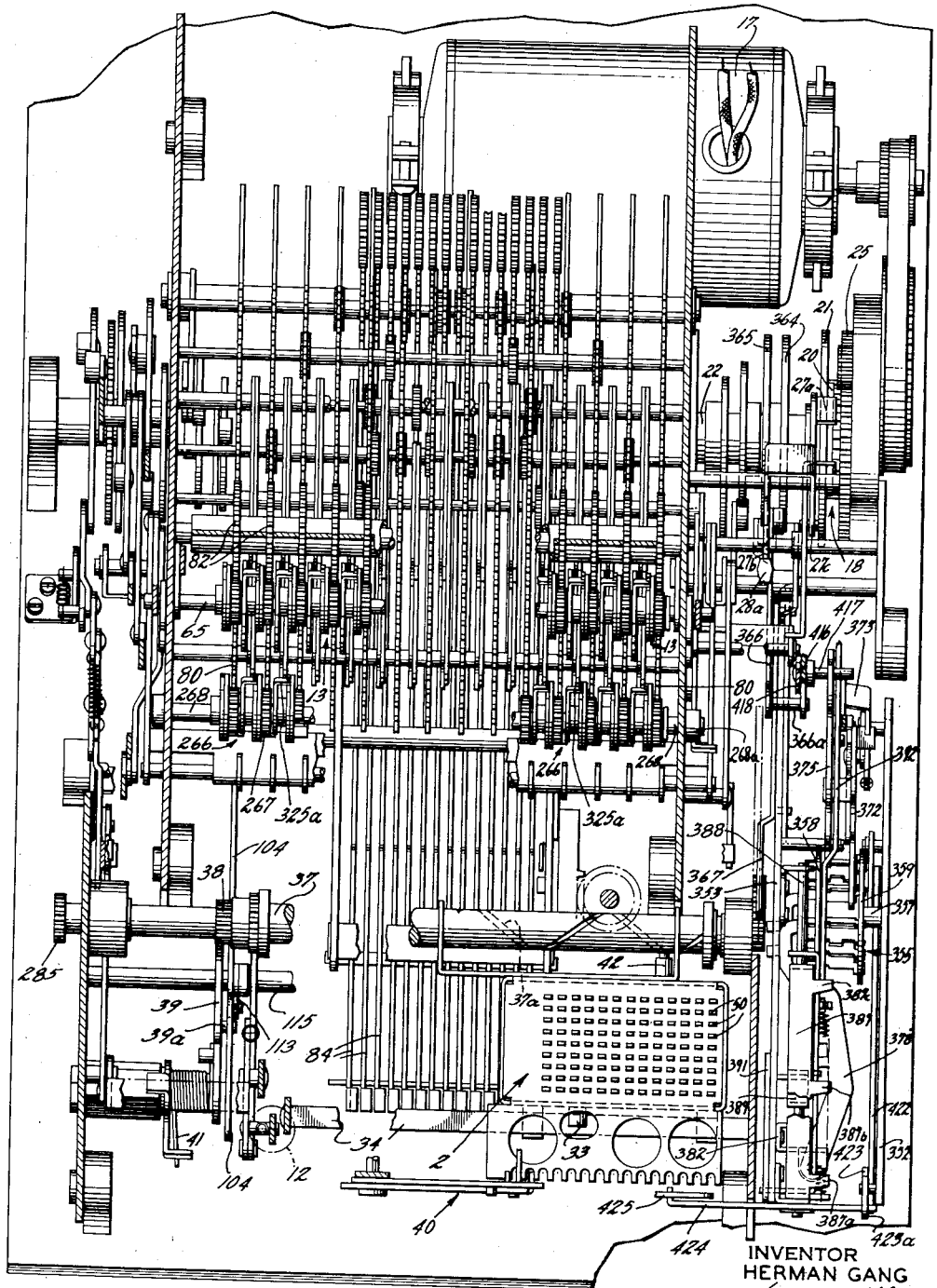
Fig. 4 is a plan view taken on the line 4—4 of Fig. 1.

During the first registering cycle of the machine in response to depression of the first of a series of multiplier keys 265 (Figs. 2, 3, 5) corresponding to the digits of a multiplier, the printing mechanism will be afforded its normal operation. This will print the multiplicand which is set in pin carriage 2 (Figs. 1, 4, 10). Upon depression of this first multiplier key, adjustments of control mechanisms are effected which will control subsequent operation of the printing mechanism. These control mechanisms operate to disable the printing mechanism after its operation during the first registering cycle. As a result, the printing mechanism will be disabled during the remaining registering cycles in response to said first multiplier depression key, and in subsequent cycles in response to depression of the remaining multiplier keys corresponding to the digits of the multiplier.

Additional adjustments are made upon depression of the first multiplier key to control a total taking operation upon depression of total key 6 (Figs. 2, 8, 22, 25) after completing the product and multiplier registration. Upon depression of the total key, two cycles of the total taking mechanism is automatically effected. The first total taking cycle will be operable to take a total from counter register 266 (Fig. 1) and the second cycle will be operable to take a total from accumulator register 13.

(b) Printing and multiplicand and disabling the printing mechanism

As previously described, symbol slide 175 is moved toward the rear (Figs. 21, 22, 23, 24) to release latch 177 which releases bail 166 thereby enabling the printing mechanim. Upon operation of the machine in response to depression of a multiplier key 265, symbol slide 175 will be controlled in its rearward movement to position pin 175b of symbol rack 175a above recess 177c of the lower arm of latch 177. Pin 175b, upon rearward movement from the engaged position of Fig. 21 with nose 177b of latch 177, permits one step of clockwise movement of said latch thereby raising lug 177a from latched position with respect to bail 166 which enables the print mechanism. However, when pin 175b is moved further rearwardly to position above recess 177c (Figs. 22, 23) latch 177 will be released for an additional clockwise step of movement. However, at the start of the machine cycle as shown in Fig. 22, latch 177 will be blocked from this additional step of movement by a nose 444a at the lower end of a lever 444 which is in the path of movement of a lug 177d on the upper arm of said latch.

With reference to Fig. 21c, lever 444 is fulcrumed on a swinging arm 445 which has pivotal mounting on the machine framing above the fulcrum of lever 444. Arm 445 extends downwardly and toward the rear inwardly of arm 174a of print hammer restoring bail 174. At its lower rear end, arm 445 is provided with a cam slot 445a including a rearwardly extending upper section and a downwardly extending lower section. Normally a pin 174b extending inwardly from arm 174a engages the front of the upper section of cam slot 445a thereby locating arm 445 in the clockwise direction shown in Fig. 21. During the forward stroke of actuator racks 80, bail 174 will be lowered clockwise to permit operation of the printing hammers. During this movement, pin 174b will be moved to the lower end of cam slot 445a as shown in Fig. 23 and thereby swing arm 445 counterclockwise. During this operation nose 444a will be moved to the rear of a lug 177d of latch 177. This movement of lever 444 is controlled by a connection thereof at its upper end with a toggle plate 446.

Plate 446 has pivotal mounting at 447 on the machine framing and is normally held in the clockwise position shown in Fig. 21 by a toggle spring 448. At the upper edge of plate 446 is a slot 446a which is engaged by a pin 444b at the upper end of lever 444. As lever 444 is rocked counterclockwise to the position shown in Fig. 23, its fulcrum point on said lever will also be moved counterclockwise. Its upper end, however, will be held in fixed pivotal position by pin 444b, in engagement with slot 446a of toggle plate 446. Therefore, lever 444 will be rocked counterclockwise about pin 444b thereby moving nose 444a to the rear of lug 177d.

When nose 444a is moved to the rear of lug 177d, latch lever 177 will be released for the second step of clockwise movement. This will bring lug 177d upwardly to the front of nose 444a of lever 444. The printing mechanism will be operated in its usual manner during the mid-cycle dwell of the actuator rack drive thereby printing the multiplicand. During the return stroke of the actuator rack drive, bail 174 will be restored counterclockwise to reset the print hammers. This will move pin 174b to its normal position at the front end of the upper section of cam slot 445a thereby restoring arm 445 clockwise. During the return clockwise movement of arm 445, lug 177d will be in the clockwise path of nose 444a of lever 444 as shown in Fig. 23. Lever 444, therefore, will be rocked counterclockwise about its fulcrum point on arm 445.

The counterclockwise movement of lever 444, about its fulcrum, will cause pin 444b at its upper end to rock toggle plate 446 counterclockwise beyond the dead center of toggle spring 448 which will complete the counterclockwise movement of said plate to the position of Fig. 24. During the counterclockwise movement of toggle plate 446 its lower cam edge 446b will engage the upper edge of lug 177a thereby rocking and holding latch lever 177 to counterclockwise effective position with respect to bail 166. It will be noted this will release nose 444a of lever 444 from the restraint of lug 177d. However, when this occurs, toggle plate 446 will have been rocked beyond the dead center of toggle spring 448 which will overcome the spring of latch 177. Therefore, when symbol rack 175 is moved toward the rear during subsequent registering operation thereby releasing latch lever 177, edge 446b of toggle plate 446 will prevent lever 177 from movement to release bail 166 and the printing mechanism will remain in disabled position.

The counterclockwise adjustment of toggle plate 446 will also disable the paper feed finger 171. A pin 171b extends inwardly from finger 171 intermediate its upper end and its fulcrum on arm 174a. A lever 450 is fulcrumed on the machine framing between toggle plate 446 and finger 171. One arm of lever 450 extends above and downwardly to the rear of pin 171b. The other arm of the lever extends forwardly and has slot and pin connection with plate 446 adjacent its lower rear edge.

Upon counterclockwise movement of plate 446 to disable the printing mechanism, the slot and pin connection with lever 450 will rock said lever clockwise to the position shown in Fig. 24. Consequently, the right arm of lever 450 will engage the rear of pin 171b. Therefore, as finger 171 is moved upwardly, the arm of lever 450 will prevent the normal clockwise movement of said arm to engage ratchet wheel 14a of platen 14.

A further adjustment of mechanism in connection with the subsequent total taking operation is effected upon counterclockwise movement of toggle plate 446 to latching position with respect to lever 177. A forwardly extending arm 449 (Figs. 21, 22, 23, 24) has pivotal mounting at its rear and on plate 446 above the pivotal mounting of said plate. The forward end of arm 449 is supported by slot and pin mounting and terminates in a nose 449a which is operable in connection with the lobes of cam wheel 320. Normally, nose 449a is inwardly of the vertical plane of cam wheel 320 and to the rear of the rotary path of movement of the lobes of said cam wheel (Figs. 21, 22, 23). However, upon counterclockwise adjustment of toggle plate 446 (Fig. 24), arm 449 will be moved forwardly and immediately adjacent the rotary path of movement of the lobes of cam 320 when the machine is in normal full cycle position. However, at this time, cam wheel 320 will be outwardly from the vertical plane of nose 449a and its lobes will therefore be moved idly with respect to said nose as shaft 117 and said cam wheel are stepped clockwise.

(c) Printing the multiplier and product

Total key 6 (Figs. 2, 3, 8, 21–25), normally upon depression, adjusts total slide 195 and plus-minus slide 144 toward the rear to initiate a total taking operation for accumulator 13. As previously described, a shaft 296 is rocked clockwise upon depression of a multiplier key 265. This shaft will not be restored until total key 6 is depressed, as later described. Consequently, a succession of multiplier keys may be depressed, after depression of a first multiplier key, during which time shaft 296 will remain rocked. When shaft 296 is rocked, an auxiliary total slide 455 is adjusted to a position for subsequent operation in conjunction with slides 144 and 195 upon depression of total key 6.

Auxiliary total slide 340 is mounted adjacent the right face of total slide 195 (Figs. 3, 21, 22) and is similarly supported adjacent its front end by an upstanding arm 456 pivotally mounted on shaft 146. At its rear end, slide 340 is mounted on an upstanding arm 457 pivotally mounted on cross shaft 448 on which crank 196 of total slide 195 is mounted. A cam edge 340b of slide 340 is adapted for engagement by the operating edge of the stem of total key 6, which operating edge is also adapted to engage a like cam edge 195a of total slide 195 to move said total slide rearwardly. Cam edge 340b, however, is normally to the rear of the operating edge of total key 6 and of cam edge 195a of slide 195, i.e., slide 340 is normally in a rearward position to which it has been adjusted by prior depression of total key 6 as shown in Fig. 25.

At the front of slide 340 is a lug 340a (Fig. 25). Lug 340a is engaged by the forked end of a depending arm 341 which is fast on shaft 296. Consequently as shaft 296 is rocked clockwise upon depression of a multiplier key 265, slide 340 will be moved forwardly. This will bring cam edge 340b into alignment with cam edge 195a and in the path of movement of the operating edge of the stem of total key 6 as shown in Fig. 22.

A trip arm 458 has common pivotal mounting with the rear of slide 340 on crank 457. Trip arm 458 extends rearwardly and is spring urged upwardly with its upper edge engaging the underside of a lug 459a at the end of an upstanding arm of a latch lever 459 which has pivotal mounting on the machine right side frame. Normally a shoulder 458a in the upper edge of latch lever 458 is positioned to the rear of the front edge of lug 459a (Fig. 21). However, when slide 340 is moved forwardly upon depression of a multiplier key, shoulder 458a will be moved forwardly and then raised in position to engage the front edge of lug 459a (Fig. 22). Latch lever 459 is spring biased counterclockwise and normally a lug 459b at the end of a rearwardly extending arm thereof is engaged by a rear shoulder 460a at the lower edge of a forwardly extending arm of a total repeat lever 460 which is fulcrumed on the machine right side frame. Lever 460 includes a rearwardly extending arm which, at its end, engages a guide slot in a suitable bracket 461. The rear arm of lever 460 is adjustable with respect to the forward arm for the purpose of accurately timing the lever operation. The two arms of the lever, however, after initial adjustment are maintained in fixed relationship. Therefore, with respect to its operation, lever 460 may be considered a unitary structure.

Lever 460 is spring biased counterclockwise and normally is restrained from such movement by its shoulder 460a in engagement with lug 459b (Figs. 21, 22). Forwardly of shoulder 460a is a second shoulder 460b which also is adapted for engagement with lug 459b of latch lever 459 as later described. Intermediate its front end and its shoulder 460b, lever 460 is provided with a locating recess 460c which normally engages a pin 196a of crank 196 of total slide 195. Forwardly of recess 460c, lever 460 turns upwardly and thereby provides a blocking edge 460d.

A cam ear 460e extends upwardly and is inclined outwardly from the rear arm of lever 460 adjacent its end. Normally the inner operating face of ear 460e is spaced below the outwardly projecting cam face of a cam plate 320b integral with cam wheels 320 as shown in Figs. 21, 22, 23, 24, 25a, 25b. Restoring devices, operable in connection with the total taking mechanism, include a forwardly extending link 212 connected at its forward end to an upstanding arm 211 which is fast on a shaft 186 (Figs. 21, 22). During the mid-cycle dwell of each cycle of actuator racks 80, link 212 is moved toward the rear and restored during the return stroke of the racks. This operation rocks arm 211 and shaft 186 clockwise from the position of Figs. 21, 22 to the position of Fig. 25 and return. The rocking movement of arm 211 is utilized to effect operation of a finger 470 which is pivotally mounted on said arm and which is operable in connection with shoulder 460a of lever 460 and with a nose 460m to the rear of the shoulder.

Finger 470 extends forwardly and is spring urged clockwise into engagement with the end of link 212 (Figs. 21, 22) which acts as a limit stop. The front operating end of finger 470 is normally located below and intermediate shoulder 460a and nose 460m. Normally, when arm 211 is rocked clockwise, the end of finger 470 will engage the underside of nose 460m adjacent its rear and will thereupon yield counterclockwise. When arm 211 is restored counterclockwise, finger 470 will engage the rear of nose 460m thereby rocking lever 460 slightly clockwise. Then upon further movement, the finger will release lever 460 as said finger is moved below nose 460m thereof.

Depression of total key 6 will be effective to restore auxiliary total slide 340 to its normal rear position (Fig. 25) concurrently with its usual operation of moving add-subtract slide 144 and total slide 195 from normal position to the rear to initiate a total taking operation. This restoring movement of slide 340 will be effective to modify operation of the total taking mechanism. It will be noted that the key slot forwardly of cam edge 195a of total slide 195 (Fig. 8) has, at its upper edge, a rearwardly extending key locking lug 195b. As slide 195 is cammed to the rear by engagement of the camming edge of the stem of total key 6 with edge 195a, lug 195b will be moved through an opening above the camming edge of the key stem. This will prevent, in well known manner, the retraction of key 6 upon manual release, if slide 195 is held in its rear operated position by other means later described.

Upon depression of total key 6 and rearward movement of auxiliary total slide 340, shoulder 458a of arm 458 will be effective to rock latch lever 459 clockwise thereby moving lug 459b from engagement with shoulder 460a of lever 460 thereby releasing said lever. Lever 460 therefore will be spring rocked counterclockwise to engage the rear of its nose 460m with a suitable limit pin as shown in Fig. 25.

The counterclockwise movement of lever 460 will effect the following operations and adjustments of the parts. Blocking edge 460d will be brought into engagement with pin 196a of crank 196 of total slide 195. At this time, slide 195 will be in rear operated position and crank 196 will be rocked clockwise. Therefore slide 195 cannot be restored until blocking edge 460d is moved from engagement with pin 196a. A lug 460f of lever 460 will be brought into engagement with and depress the end of arm 458 thereby moving shoulder 458a from engagement with lug 459a. This will release latch lever 459 which will then be spring rocked counterclockwise to engage its lug 459b with the under edge of lever 460 forwardly of shoulder 460b. During substantially the last half of the counterclockwise movement of lever 460, cam ear 460e will engage the cam faces of plate 320b (also Fig. 25b) thereby moving cam wheel 320 inwardly on shaft 117 to the vertical plane of nose 321a of lever 321 and of nose 449a of link 449.

Upon adjustment of cam wheel 320 to the plane of nose 321a to nose 449a, its engagement with shoulder 120c (Fig. 7) will adjust slide 120 from subtractive to neutral position, and therefore the ensuing machine cycle will be effective to take a total from counter register 266 in which the multiplier is registered. The total taking operation with cam wheel 320 adjusted to effective position, is fully described in the section titled "Total Taking." Provision, however, must be made to re-enable the printing and paper feed mechanism which, upon initiation of this total taking operation, will be disabled by edge 446b of toggle plate 446 in engagement with lug 177a of latch lever 177 (Fig. 24). Upon initiation of the total taking operation for counter register 266, a lobe of cam wheel 320 will be immediately adjacent the front of nose 449a of arm 449 (Fig. 24). Therefore during the first step of cam wheel 320, which occurs during the initial dwell of the actuator rack drive, nose 449a will be engaged by a lobe of cam wheel 320 and arm 449 will be restored to the rear (Fig. 25). This will rotate toggle plate 446 clockwise to a normal position of Fig. 21 thereby releasing latch lever 177 and lever 450 to enable the printing and paper feed mechanism.

Repeat lever 460 will be restored one step of movement by finger 470 during the total taking cycle for counter register 266. This will control a second machine cycle for a total taking operation for accumulator register 13 in which the product is registered. When finger 470 is rocked clockwise (Fig. 25) during the mid-cycle dwell of the actuator rack drive, its operating end will be brought into engagement with the under edge of lever 460 to the rear of shoulder 460a. As finger 470 is restored during the return stroke of the actuator racks, its operating end will engage shoulder 460a thereby rocking arm 460 clockwise to bring its shoulder 460b slightly to the front of lug 459b of latch lever 459. As finger 470 completes its counterclockwise movement, it will be moved downwardly from engagement with shoulder 460a and lug 459b will engage shoulder 460b to restrain lever 460 in an intermediate position (not shown) between its full operated and normal position.

Upon clockwise movement of lever 460 to intermediate position, cam ear 460e will be disengaged from the cam face of plate 320b thereby permitting cam wheel 320 to be restored outwardly by spring 320a from the plane of nose 321a and nose 449a. Also, cam wheel 320 will release sign control slide 120 which then will be moved to the subtract position to which it is biased by the setting of add-subtract slide 144. The movement of lever 460 to intermediate position, however, will not disengage blocking edge 460d from engagement with pin 196a of arm 196. Total slide 195 therefore will be held in rear operated position.

With slide 195 in rear position, total key 6 will be held depressed. Consequently, add subtract slide 144 will be held by depressed key 6 against the usual movement to normal position as main clutch 18 approaches full cycle position. As a result, main clutch 18 will not be disengaged at the end of the total taking cycle for counter register 266, but will continue in a second total taking cycle of operation. During this operation, the total taking mechanism will be afforded its usual operation, and therefore a total will be taken from accumulator register 13 in which the product is registered.

It will be recalled that the mechanism for restoring pin carriage 2 is re-enabled each time cycle stopping plate 372 is stored to terminate registration for a multiplier digit. The enabling operation, however, is effected near the end of the cycle in which registration is terminated whereas the carriage return mechanism is operable during the mid-cycle dwell of each cycle. Therefore, the pin carriage will remain in left shifted position at the conclusion of product registration. However, during the first total taking cycle, the carriage return mechanism will be afforded its usual operation and carriage 2 will be restored to its normal right end position.

(d) Constant factor multiplicand

Constant factor multiplicand devices are selectively operable, upon return movement of pin carriage 2 (Figs. 1, 4, 10) toward its normal right end position in the total taking operation, to arrest said carriage in the leftward position to which it was shifted upon entry of the last digit of the multplicand. The carriage will therefore be in proper position for the initiation of another multiplying operation with the multiplicand value retained in the carriage.

Figure 12:
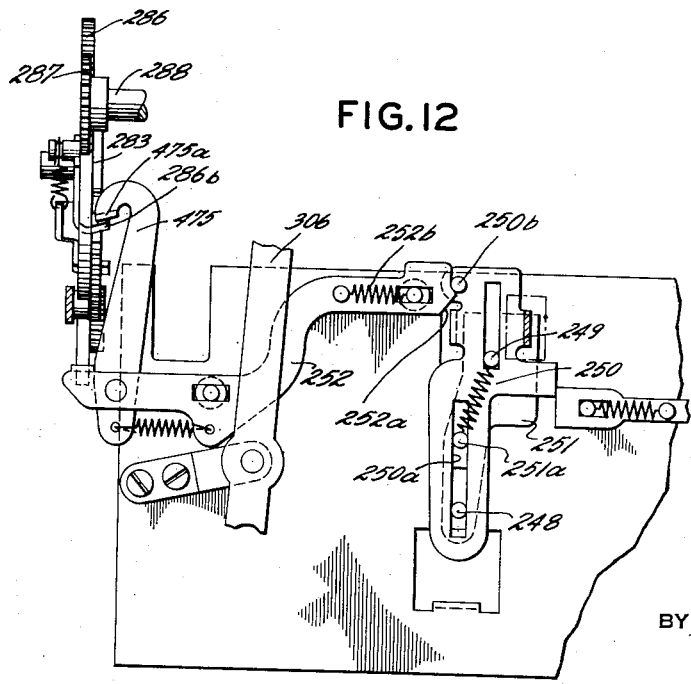
Fig. 12 is a fragmentary plan view of the constant factor multiplicand mechanism.

The constant factor multiplicand devices are set upon setting of key 11 (Fig. 2) rearwardly from the normal intermediate position of Fig. 3 to the position of Fig. 12. Key 11 is integral with a slide 250 which lies atop of a second slide 251. A fixed pin 248 extends upwardly through a pair of longitudinally aligned slots at the front of slides 250—251, and a fixed pin 249 extends upwardly through a pair of longitudinally aligned slots at their rear. A pin 251a in the upper face of slide 251 extends upwardly through the front slit 250a of slide 250. A spring between fixed pin 249 and pin 251a normally holds slide 251 rearwardly to the limit imposed by the engagement of the front end of its rear slot with pin 249. With slide 251 in its rear position, pin 251a normally engages the rear end of the front slot 250a of slide 250 and thereby holds slide 250 toward the rear in an intermediate position.

Key 11 and slide 250 integral therewith are moved forwardly from intermediate position to set the machine for repeat registering operation. Upon forward movement of slide 250, the rear of slot 250a engaging pin 251a will likewise move slide 251 forwardly against the tension of the spring connected to fixed pin 249. Latching means is operable to hold the parts in forward adjusted position and upon release, the parts will be spring restored to normal position. The repeat operation, however, is not concerned with the present invention.

Key 11 and slide 250 are moved toward the rear from intermediate position to set the constant factor devices. It will be noted that this movement is effected independently of slide 251 which is restrained in its rearmost position by the front end of its rear slot engaging pin 249. Slide 250 will therefore be manually moved to the rear from intermediate position and restored independently of spring urged slide 251.

When slide is in intermediate position, a pin 250c at its rear engages a cam edge 252a at the right end of a slide 252 which is normally spring held to the right to the limit of suitable slot and pin mounting. Pivotally mounted at the left end of slide 252 is a rearwardly extending latch arm 475. Latch arm 475 is normally spring urged counterclockwise against a suitable limit stop on slide 252 and at its rear is provided with a lug 475a. Normally positioned to the left of lug 475a and extending inwardly from gear segment 286 is a lug 286b (Figs. 3, 11, 12, 15, 16).

Key 11 is moved toward the rear to set the constant factor devices of the multiplier. Upon rearward adjustment of key 11 and slide 250, pin 250c, by engagement with cam edge 252a, will move slide 252 toward the left. As pin 250c moves to the rear of cam edge 252a, it will engage a latching shoulder and slide 252 will therefore be held to the left, and slide 250 and key 11 will be held to the rear (Fig. 12). Upon leftward movement of slide 252, the left edge of lug 475a of latch arm 475 will engage the right edge of lug 286b (not shown), and arm 475 therefore will yield clockwise against the tension of its spring.

However, upon depression of a first multiplier key 265 to initiate a program of multiplication, gear segment 286 is moved one step counterclockwise from the position shown in Fig. 15 to the position shown in Fig. 16 thereby enabling the actuating mechanism for counter register 266 and coupling said gear segment 286 with gear segment 283. Thereafter gear segments 283 and 286 will be stepped simultaneously counterclockwise as pin carriage 2 is shifted to the left in the multiplying operation. This operation is described in detail under the section titled, "Actuating Mechanism for the Counter Actuator." When gear segment 286 is given the initial counterclockwise step of movement, the right edge of lug 286b will be disengaged from the left edge of lug 475a of latch arm 475. Arm 475 will thereupon be spring moved counterclockwise (Figs. 3, 12) to position its lug 475a clockwise with respect to lug 286b (Figs. 11, 12).

When carriage 2 is moved to the right toward restored position in the total taking operation, gear segments 283 and 286 will be rotated clockwise until lug 286b is engaged with lug 475a. Gear segments 283 and 286 will therefore be arrested from further rotation and pin carriage 2 will be arrested in the position to which it was shifted upon entry of the last digit of the multiplicand. When this occurs, carriage return arm 104 (Fig. 11) which comprises a pair of spring retracted links, will yield and be extended as it is moved rearwardly in the carriage return movement after which it will be restored to the normal forward position of Fig. 11.

I claim:

1. In a motor driven calculating machine having a product register, and reciprocatory cyclically operable actuating means for said register relatively adjustable with respect thereto for idle operation, or for registering operation during one or both strokes of each cycle of operation; multiplication control mechanism including means for initiating operation of said actuating means and for terminating operation thereof at the end of predeterminted numbers of cycles of operation, and means for controlling adjustment of said actuating means for registering operation during both strokes of predetermined cycles of said predetermined numbers of cycles, and for registering operation during one stroke and idle operation during the opposed stroke of other predetermined cycles of said predetermined numbers of cycles.

2. In a motor driven calculating machine having a product register, and reciprocatory cyclically operable actuating means for said register relatively adjustable with respect thereto for idle operation, and for registering operation during one or both strokes of each cycle of operation; multiplication control mechanism including means for initiating operation of said actuating means and for terminating operation thereof at the end of predetermined numbers of cycles of operation, and means for controlling adjustment of said actuating means for registering operation during all but one stroke of each predetermined number of cycles and for idle operation during said one stroke, or for registering operation during all of the strokes of each predetermined number of cycles.

3. In a motor driven calculating machine having a product register, and reciprocatory cyclically operable actuating means for said register relatively adjustable with respect thereto for idle operation, or for additive or subtractive registration during one or both strokes of each cycle of operation; multiplication control mechanism including means for initiating operation of said actuating means and for terminating operation thereof at the end of predetermined numbers of cycles of operation, and means for controlling adjustment of said actuating means for like sign registration during both strokes of predetermined cycles of said predetermined numbers of cycles, and for registering operation during one stroke and idle operation during the opposed stroke of other predetermined cycles of said predetermined numbers of cycles.

4. In a motor driven calculating machine having a product register, and reciprocatory cyclically operable actuating means for said register relatively adjustable with respect thereto for idle operation, or for additive or subtractive registration during one or both strokes of each cycle of operation; multiplication control mechanism including means for initiating operation of said actuating means and for terminating operation thereof at the end of predetermined numbers of cycles of operation, and means for controlling adjustment of said actuating means for additive registration during one stroke, idle operation during one stroke and subtractive registration during the remainder of the strokes of each predetermined number of cycles, or additive registration during one stroke, idle operation during two strokes and subtractive registration during the remainder of the strokes of each predetermined number of cycles.

5. In a motor driven calculating machine having a product register, reciprocatory cyclically operable actuating means for said register relatively adjustable with respect thereto for idle operation or for registering operation during one or both strokes of each cycle of operation, and control devices settable to control adjustment of said register actuating means; multiplication control mechanism including means for initiating operation of said actuating means and for terminating operation thereof at the end of predetermined numbers of cycles of operation, primary setting means operable to set said registration control devices to control adjustment of said register actuating means for registering operation during both strokes of each cycle of said predetermined numbers of cycles, and secondary setting means for said registration control devices operable to supersede the setting effected by said primary setting means thereby changing the character of the operation of said actuating means during predetermined strokes of said predetermined numbers of cycles.

6. The invention according to claim 5; said primary setting means including yieldable connections with said registration control devices, and said secondary setting means superseding the setting effected by said primary setting means by setting said registration control devices against the urge of said yieldable connections.

7. In a motor driven calculating machine having a product register, reciprocatory cyclically operable actuating means for said register relatively adjustable with respect thereto for idle operation, or for additive registration during one or both strokes of each cycle of operation, and control devices settable to control adjustment of said register actuating means; multiplication control mechanism including means for initiating operation of said actuating means and for terminating operation thereof at the end of predetermined numbers of cycles of operation, primary setting means operable to set said registration control devices to control adjustment of said register actuating means for additive registration during both strokes of each cycle of said predetermined numbers of cycles, and secondary setting means for said registration control devices operable to supersede the setting effected by said primary setting means thereby setting said registration control devices to control adjustment of said register actuating means for idle operation during predetermined strokes of said predetermined numbers of cycles.

8. In a motor driven calculating machine having a product register, reciprocatory cyclically operable actuating means for said register relatively adjustable with respect thereto for idle operation, or for additive or subtractive registration during one or both strokes of each cycle of operation, and control devices settable to control adjustment of said register actuating means; multiplication control mechanism including means for initiating operation of said actuating means and for terminating operation thereof at the end of predetermined numbers of cycles of operation, primary setting means operable to set said registration control devices to control adjustment of said register actuating means for like sign registration during both strokes of each cycle of said predetermined numbers of cycles, and secondary setting means for said registration control devices operable to supersede the setting effected by said primary setting means thereby setting said registration control devices to control adjustment of said register actuating means for idle operation during predetermined strokes of said predetermined numbers of cycles and for unlike sign registration for other predetermined strokes of said predetermined numbers of cycles.

9. In a motor driven calculating machine having a product register, reciprocatory cyclically operable actuating means for said register relatively adjustable with respect thereto for idle operation, or for additive or subtractive registration during one or both strokes of each cycle of operation, and control devices settable to control adjustment of said register actuating means; multiplication control mechanism including means for initiating operation of said actuating means and for terminating operation thereof at the end of predetermined numbers of cycles of operation, primary setting means operable to set said registration control devices to control adjustment of said register actuating means for additive registration during both strokes of each cycle of one set of said predetermined numbers of cycles and subtractive registration during both strokes of a second set of said predetermined numbers of cycles, and secondary setting means for said registration control devices operable to supersede the setting effected by said primary setting means thereby setting said registration control devices to control adjustment of said register actuating means for idle operation during predetermined strokes of said first and second sets of said predetermined numbers of cycles and for additive operation during predetermined strokes of said second set of said predetermined numbers of cycles.

10. In a motor driven calculating machine having a product register, reciprocatory actuators for said register relatively adjustable with respect thereto for idle operation or for registering operation during one or both strokes of each cycle of operation, control devices settable to control adjustment of said actuators, cyclically operable drive means for said actuators, and full cycle stopping means for said drive means; multiplication control mechanism including primary setting means operable to set said registration control devices to control adjustment of said actuators for registering operation during both strokes of each cycle of operation, secondary setting means operable to supersede the setting effected by said primary setting means by setting said registration control devices to control adjustment of said actuators for idle operation during one stroke of each cycle of operation, contact members respectively engageable to initiate operation of said secondary setting means and said stopping means, a storage magazine mounted for indexing operation, a series of settable operating elements for said contact members mounted in said magazine, means selectively operable to set given combinations of said operating elements, and means driven in time with said actuator drive means to index said magazine thereby bringing set operating elements step by step toward positions respectively to engage said contact members.

11. The invention according to claim 10; said storage magazine comprising a rotatably mounted drum and the indexing operation thereof comprising step by step rotation.

12. The invention according to claim 11; said settable operating elements comprising slides.

13. The invention according to claim 10; said reciprocatory actuators being adjustable for additive or subtractive operation during one or both strokes of each cycle of operation, said primary setting means being selectively operable to set said registration control devices to control adjustment of said actuators for either additive or subtractive registration during both strokes of each cycle of operation, and said secondary setting means being operable to supersede the setting effected by said primary setting means by setting said registration control devices to control adjustment of said actuators for idle operation during one stroke and additive operation during the opposed stroke of each cycle of operation.

14. The invention according to claim 13; said primary setting means including yieldable connections with said registration control devices, said secondary setting means being operable to set said registration control devices against the urge of said yieldable connections, and including a latch for holding said secondary setting means in operated position.

15. In a motor driven calculating machine having a product register, reciprocatory actuators for said register relatively adjustable with respect thereto for idle operation or for registering operation during one or both strokes of each cycle of operation, control devices settable to control adjustment of said actuators, cyclically operable drive means for said actuators, and full cycle stopping means for said drive means; multiplication control mechanism including primary setting means operable to set said registration control devices to control adjustment of said actuators for registering operation during both strokes of each cycle of operation, secondary setting means operable to supersede the setting effected by said primary setting means by setting said registration control devices to control adjustment of said actuators for idle operation during one stroke of each cycle of operation, digit multiplier keys, means operable in response to manipulation of any one of said keys to initiate operation of said actuator drive means and to operate said primary setting means, storage devices driven in time with said actuator drive means and settable to initiate operation of said secondary setting means after given numbers of strokes of said actuators and to initiate operation of said stopping means to terminate operation of said actuator drive means at the end of given numbers of cycles, and selection means operable in response to manipulation of said keys respectively to effect given settings of said storage devices.

16. The invention according to claim 15; said means operable in response to manipulation of any one of said digit multiplier keys to initiate operation of said actuator drive means and to operate said primary setting means comprising motor operated means, and said selection means being operable by said motor operated means to effect given settings of said storage devices under control of said keys respectively.

17. The invention according to claim 16; said motor operated means comprising a cyclically operable setting clutch engageable for a single cycle of operation in response to depression of any one of said digit multiplier keys.

18. The invention according to claim 17; including latching means operable upon depression of any one of said digit multiplier keys to hold said key in depressed position and to latch the undepressed keys against depression, means operable to hold said latching means in operated position during operation of said setting clutch and operable to release said latching means upon movement of said clutch to full cycle position, means operable in response to initiation of said actuator drive means to disengage said setting clutch after a part cycle of operation, and means operable in response to operation of said stopping means of said actuator drive means to reengage said setting clutch.

19. In a motor driven calculating machine having a product register, reciprocatory actuators for said register relatively adjustable with respect thereto for idle operation or for registering operation during one or both strokes of each cycle of operation, control devices settable to control adjustment of said actuators, cyclically operable drive means for said actuators, and full cycle stopping means for said drive means; multiplication control mechanism including primary setting means operable to set said registration control devices to control adjustment of said actuators for registering operation during both strokes of each cycle of operation, secondary setting means operable to supersede the setting effected by said primary setting means by setting said registration control devices to control adjustment of said actuators for idle operation during one stroke of each cycle of operation, a contact member engageable to initiate operation of said secondary setting means, a contact member engageable to initiate operation of said stopping means, a rotatably mounted storage magazine, a series of settable idle stroke slides and a series of settable stopping slides mounted in said magazine, means driven in time with said actuator drive means to index said magazine step by step thereby bringing said idle stroke slides successively to a position wherein an idle stroke slide if set will engage said contact member of said secondary setting means and bringing said stopping slides successively to a position wherein a stopping slide if set will engage said contact member of said stopping means, digit multiplier keys, a setting clutch engaged for a cycle of operation upon depression of any one of said keys, a train driven by said setting clutch to initiate operation of said actuator drive means and to operate said primary setting means, and selection means operable by said setting clutch to set given combinations respectively of said idle stroke and stopping slides under control of said multiplier keys.

20. In a motor driven calculating machine having a register, an ordinal series of reciprocatory actuators for said register relatively adjustable with respect thereto for idle operation or for registering operation during one or both strokes of each cycle of operation, control devices settable to control adjustment of said actuators, cyclically operable drive means for said actuators, full cycle stopping means for said drive means, digital value selection means for controlling the excursions of said actuators including a carriage ordinally shiftable with respect thereto, and mechanism for shifting said carriage; multiplication control mechanism including primary setting means operable to set said registration control devices to control adjustment of said actuators for registering operation during both strokes of each cycle of operation, secondary setting means operable to supersede the setting effected by said primary setting means by setting said registration control devices to control adjustment of said actuators for idle operation during one stroke of each cycle of operation, contact members respectively engageable to initiate operation of said secondary setting means, said stopping means and said carriage shifting means, a storage magazine mounted for indexing operation, a series of settable operating elements for said contact members mounted in said magazine, means selectively operable to set given combinations of said operating elements, and means driven in time with said actuator drive means to index said magazine thereby bringing set operating elements step by step toward positions respectively to engage said contact elements.

21. In a motor driven calculating machine having an accumulator register, reciprocatory actuators for said register relatively adjustable with respect thereto for idle operation or for registering operation during one or both strokes of each cycle of operation, and control devices settable to control adjustment of said actuators; a counter register, a counter actuator adjustable for idle or for operation to register a count of one for one stroke of said reciprocatory actuators, and an adjusting train operable upon setting of said devices to adjust said counter actuator for registering or for idle operation in accordance with the adjustments respectively of said reciprocatory actuators for registering or for idle operation.

22. The invention according to claim 21; said reciprocatory actuators being adjustable for additive or for subtractive registration during one or both strokes of each cycle of operation.

23. The invention according to claim 21; wherein said counter actuator is reciprocatory and is operable during each stroke of a cycle of operation to effect a count of one in said counter register.

24. In a motor driven calculating machine having an accumulator register, reciprocatory actuators for said register relatively adjustable with respect thereto for idle operation or for registering operation during one or both strokes of each cycle of operation, and control devices settable to control adjustment of said actuators; a counter register, a normally disabled counter actuator adjustable to enabled position and thereupon adjustable for idle or for operation to register a count of one for one stroke of said reciprocatory actuators, multiplication control mechanism including means for setting said control devices and for enabling said counter actuator, and an adjusting train operable upon setting of said control devices to adjust said enabled counter actuator for registering or for idle operation in accordance with the adjustments respectively of said reciprocatory actuators for idle or for registering operation.

25. The invention according to claim 24; said multiplication control mechanism including successively depressible multiplier digit keys and said means for enabling said counter actuator being operable in response to depression of the first of a series of said keys.

26. The invention according to claim 24; said reciprocatory actuators being adjustable for additive or subtractive operation during one or both strokes of each cycle of operation, and said counter actuator when adjusted to enabled position being adjustable for additive or subtractive registering operation.

27. In a calculating machine having an accumulator register and a counter register each including an ordinal series of numeral wheel gears adapted for additive or subtractive rotation; total taking means for said registers comprising, reciprocatory racks alternatively operable to rotate said accumulator gears or said counter gears subtractively to zero registering position during the initial stroke of a cycle of operation and idly operable during the return stroke of said cycle, a total key, primary control means normally operable in response to depression of said key to initiate a cycle of operation of said racks and to control the operation thereof to zeroize said accumulator register, normally disabled auxiliary control means operable in conjunction with said primary control means in response to depression of said total key to initiate two successive cycles of operation of said racks and to control one of said cycles to zeroize said accumulator register and the other of said cycles to zeroize said counter register, and means for enabling said auxiliary control means.

28. A calculating machine according to claim 27; including multiplication control mechanism and wherein said multiplication control mechanism is operable to enable said auxiliary control means.

29. The invention according to claim 28; wherein said multiplication control mechanism includes successively depressible digit multiplier keys and said auxiliary control means is enabled in response to depression of the first of a series of said multiplier keys.

30. In a motor driven calculating machine having a product register, an ordinal series of reciprocatory actuators for said register relatively adjustable with respect thereto for idle operation or for additive or subtractive registration during one or both strokes of each cycle of operation, digital value selection means for controlling the excursions of said actuators including a carriage ordinally shiftable with respect thereto, a counter register including an ordinal series of register wheel gears, and actuating means ordinally adjustable to driving relation successively with said wheel gears; multiplication control mechanism including, means for initiating operation of said actuators and for terminating operation thereof at the end of predetermined numbers of cycles of operation, means for controlling adjustment of said actuators for like sign registration during both strokes of predetermined cycles of said predetermined numbers of cycles and for registering operation during one stroke and idle operation during the opposed stroke of other predetermined cycles of said predetermined numbers of cycles, and means for ordinally shifting said carriage and concurrently adjusting said counter register actuating means.

31. In a calculating machine having a product register, a counter register, reciprocatory cyclically operable actuating means adjustable with respect to said product register for idle operation or for additive or subtractive registration during one or both strokes of each cycle of operation, and alternatively adjustable with respect to said counter register for subtractive registration during the initial stroke and idle operation during the return stroke of a cycle of operation; the combination with multiplication control means comprising, means for initiating operation of said actuating means and for terminating operation thereof at the end of predetermined numbers of cycles of operation, and means for controlling adjustment of said actuating means with respect to said product register for like sign registration during both strokes of predetermined cycles of said predetermined numbers of cycles and for registering operation during one stroke and idle operation during the opposed stroke of other predetermined cycles of said predetermined numbers of cycles; of total taking means for said registers comprising, a total key, primary control means normally operable in response to depression of said key to initiate a cycle of operation of said actuating means and to control the adjustment thereof for subtractive registration with respect to said product register during the initial stroke of said cycle thereby zeroizing said product register and for idle operation during the return stroke of said cycle, normally disabled auxiliary control means operable in conjunction with said primary control means in response to depression of said total key to initiate two successive cycles of operation of said actuating means and to control the adjustment thereof for subtractive registration with respect to said product register during the initial stroke of one of said cycles thereby zeroizing said product register and for idle operation during the return stroke of said one cycle and to control the adjustment thereof for subtractive registration with respect to said counter register during the initial stroke of the other of said cycles thereby zeroizing said counter register and for idle operation during the return stroke of said other cycle, and means for enabling said auxiliary control means.

References Cited in the file of this patent

UNITED STATES PATENTS

| | | |
|---|---|---|
| 1,930,475 | Gustafsson et al. | Oct. 17, 1933 |
| 2,374,333 | Crosman | Apr. 24, 1945 |
| 2,397,745 | Kiel | Apr. 2, 1946 |
| 2,681,765 | Hopkins | June 22, 1954 |
| 2,715,496 | Hellgren | Aug. 16, 1955 |
| 2,756,926 | Dodsworth | July 31, 1956 |
| 2,773,646 | Mathi | Dec. 11, 1956 |

UNITED STATES PATENT OFFICE
CERTIFICATION OF CORRECTION

Patent No. 2,970,754                              February 7, 1961

Herman Gang

It is hereby certified that error appears in the above numbered patent requiring correction and that the said Letters Patent should read as corrected below.

Column 2, line 37, for "is" read -- in --; column 5, line 67, for "Patent No. 1,829,180" read -- Patent No. 1,828,180 --; column 6, line 22, for "sequencies" read -- sequences --; column 8, line 49, strike out "a", first occurrence; column 13, line 43, for "is" read -- to --; column 22, line 50, for "adle" read -- idle --; column 24, line 24, for "evtending" read -- extending --; column 26, line 56, for "operations" read -- operation --; column 27, line 25, for "approximately" read -- appropriately --; line 45, for "sldably" read -- slidably --; column 23, line 36, for "406a" read -- 406s --; column 32, line 27, for "conenction" read -- connection --; column 35, line 62, for "yoks" read -- yoke --; column 37, line 61, for "mechanim" read -- mechanism --; column 42, line 58, for "slit" read -- slot --.

Signed and sealed this 5th day of June 1962.

(SEAL)
Attest:

ERNEST W. SWIDER                                           DAVID L. LADD

Attesting Officer                                              Commissioner of Patents